United States Patent
Hirano et al.

(10) Patent No.: US 11,233,629 B2
(45) Date of Patent: Jan. 25, 2022

(54) REGISTRATION APPARATUS, SEARCH OPERATION APPARATUS, DATA MANAGEMENT APPARATUS

(71) Applicant: MITSUBISHI ELECTRIC CORPORATION, Tokyo (JP)

(72) Inventors: Takato Hirano, Tokyo (JP); Yutaka Kawai, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 18 days.

(21) Appl. No.: 16/961,365

(22) PCT Filed: Dec. 28, 2018

(86) PCT No.: PCT/JP2018/048547
§ 371 (c)(1),
(2) Date: Jul. 10, 2020

(87) PCT Pub. No.: WO2019/142651
PCT Pub. Date: Jul. 25, 2019

(65) Prior Publication Data
US 2020/0351081 A1    Nov. 5, 2020

(30) Foreign Application Priority Data

Jan. 17, 2018 (WO) .................. PCT/JP2018/001233

(51) Int. Cl.
*H04L 9/06* (2006.01)
*G06F 16/9035* (2019.01)
(Continued)

(52) U.S. Cl.
CPC ........ *H04L 9/0662* (2013.01); *G06F 9/30098* (2013.01); *G06F 16/9035* (2019.01); *H04L 9/0869* (2013.01)

(58) Field of Classification Search
CPC ....... H04L 9/0662; H04L 9/0869; H04L 9/06; H04L 63/0428; G06F 16/9035; G06F 9/30098; G06F 21/6227
See application file for complete search history.

(56) References Cited

U.S. PATENT DOCUMENTS

| | | | |
|---|---|---|---|
| 8,233,619 B2 * | 7/2012 | Bertoni | H04L 9/0631 380/37 |
| 2007/0017428 A1 * | 1/2007 | Oossanen | B63B 1/24 114/274 |

(Continued)

FOREIGN PATENT DOCUMENTS

| | | |
|---|---|---|
| JP | 2003-186725 A | 7/2003 |
| JP | 2005-242740 A | 9/2005 |

(Continued)

OTHER PUBLICATIONS

D. Boneh, G. D. Crescenzo, R. Ostrovsky, G. Persiano, "Public Key Encryption with Keyword Search", EUROCRYPT 2004, Lecture Notes in Computer Science, vol. 3027, 2004 (Year: 2004).*

(Continued)

*Primary Examiner* — Farid Homayounmehr
*Assistant Examiner* — Sanchit K Sarker
(74) *Attorney, Agent, or Firm* — Birch, Stewart, Kolasch & Birch, LLP.

(57) ABSTRACT

A registration apparatus generates a data random number tuple R that is a tuple of random numbers whose quantity is the same as a level quantity L of a hierarchy that a user attribute forms, and that is also a tuple of uniformly random numbers. Also, the registration apparatus accepts a plaintext M and attribute information B. The registration apparatus executes a function $F\_2$ by taking as input a concatenated value of an attribute value of each level j in the attribute information B and a number of each level j, executes a function $F\_3$ by taking as input a function value of the (Continued)

function F_2, calculates an attribute element $C_{\{j, 0, 0\}}$ that is an exclusive-or of a function value of the function F_3 and a jth random number of the data random number tuple R, executes a function F_4 by taking as input the plaintext M and an exclusive-or of the data random number tuple R, and generates encrypted data C that includes the attribute element $C_{\{j, 0, 0\}}$ and a ciphertext $C_{\{L+1\}}$ which is a function value of the function F_4. Then, the registration apparatus registers the encrypted data C in a data management apparatus.

11 Claims, 27 Drawing Sheets

(51) Int. Cl.
    *G06F 9/30* (2018.01)
    *H04L 9/08* (2006.01)

(56) References Cited

U.S. PATENT DOCUMENTS

| | | | | |
|---|---|---|---|---|
| 2007/0286416 | A1* | 12/2007 | Bertoni | H04L 9/3242 380/37 |
| 2012/0297201 | A1* | 11/2012 | Matsuda | H04L 9/3263 713/189 |
| 2013/0262863 | A1* | 10/2013 | Yoshino | H04L 9/008 713/165 |
| 2013/0287210 | A1* | 10/2013 | Matsuda | G06F 21/62 380/44 |
| 2014/0129567 | A1* | 5/2014 | Araki | H04L 9/30 707/742 |
| 2014/0298009 | A1* | 10/2014 | Hattori | H04L 9/3073 713/155 |
| 2016/0299924 | A1 | 10/2016 | Fujimoto et al. | |
| 2018/0365433 | A1* | 12/2018 | Hayasaka | G06F 21/602 |
| 2019/0036679 | A1* | 1/2019 | Hirano | H04L 9/0631 |
| 2020/0351081 | A1* | 11/2020 | Hirano | H04L 9/06 |
| 2021/0067317 | A1* | 3/2021 | Hayasaka | G06F 21/645 |
| 2021/0081562 | A1* | 3/2021 | Hirano | G06F 21/6227 |

FOREIGN PATENT DOCUMENTS

| | | |
|---|---|---|
| JP | 2012-123614 A | 6/2012 |
| JP | 2012-150764 A | 8/2012 |
| JP | 2015-170057 A | 9/2015 |
| JP | 2016-200938 A | 12/2016 |
| JP | 6038427 B1 | 12/2016 |
| WO | WO 2011/086687 A1 | 7/2011 |
| WO | WO 2012/004880 A1 | 1/2012 |
| WO | WO 2013/018683 A1 | 2/2013 |
| WO | WO 2017/122352 A1 | 7/2017 |
| WO | WO 2018/131129 A1 | 7/2018 |

OTHER PUBLICATIONS

Hirano et al, "Multi-user Searchable Symmetric Encrypion from Symmetric-Key Encryption Primitives", Lecture proceedings of the 2018 Symposium on Cryptoqraphy and Information Security; Jan. 23, 2018, pp. 1-8.

International Search Report (PCT/ISA/210) issued in PCT/JP2018/001233 dated Apr. 24, 2018.

International Search Report (PCT/ISA/210) issued in PCT/JP2018/048547 dated Apr. 2, 2019.

Menezes et al., "Handbook of Applied Cryptography", CRC Press, 1997, pp. 234-235.

Patranabis et al., "Lightweight Symmetric-Key Hidden Vector Encryption without Pairings", IACR Cryptology ePrint Archive:Report 2017/796, Total 21 pages.

Popa et al., "Muit-Key Searchable Encryption",IACR Cryptology ePrint Archive:Report 2013/508, pp. 1-18.

* cited by examiner

Fig. 15

| NUMBER | ATTRIBUTE INFORMATION | | | |
|---|---|---|---|---|
| | FIRST ATTRIBUTE (DIVISION) | SECOND ATTRIBUTE (DEPARTMENT) | THIRD ATTRIBUTE (SECTION) | FOURTH ATTRIBUTE (NAME) |
| 1 | Di | De | Sc | Ne |
| 2 | Di | De | Sd | Nf |
| 3 | Di | De | Sc | * |
| 4 | Di | De | * | * |
| : | : | : | : | : |

792:REGISTRATION DATA BASE

| IDENTIFICATION NUMBER | FILE NAME | ENCRYPTED DATA | ENCRYPTED TAG GROUP CT_W ||
|---|---|---|---|---|
| | | | ENCRYPTED TAG 1 | ... |
| 1 | File $(M_1)$ | $C_1$ | $CT\_\{W_1\_1\}$ | ... |
| 2 | File $(M_2)$ | $C_2$ | $CT\_\{W_2\_1\}$ | ... |
| ⋮ | ⋮ | ⋮ | ⋮ | ... |

REGISTRATION APPARATUS, SEARCH OPERATION APPARATUS, DATA MANAGEMENT APPARATUS

TECHNICAL FIELD

The present invention relates to a searchable encryption technology.

BACKGROUND ART

Searchable encryption is a technology of searching for encrypted data while the data remains encrypted.

In other words, the searchable encryption is a technology of searching for encrypted data without decrypting the encrypted data.

Recently, the searchable encryption has attracted attention as a security technology to protect confidential information from being eavesdropped by server administrators in cloud services. In other words, the searchable encryption has attracted attention as a security technology applicable when data is managed on the Internet.

Explanations will be given on processes with a registrant, a searcher, and a datacenter apparatus, as processes in the searchable encryption.

The registrant is a user who registers encrypted data, and the searcher is a user who searches for encrypted data.

A basic flow of a process by the registrant is as below:

First, the registrant generates encrypted data by encrypting data.

Next, the registrant encrypts a keyword to search for the encrypted data. The encrypted keyword is called an encrypted tag. A keyword does not leak from the encrypted tag.

Next, the registrant associates the encrypted tag with the encrypted data. A quantity of the encrypted tags does not need to be one, and a plurality of encrypted tags can be associated with the encrypted data.

Then, the registrant registers the encrypted data and the encrypted tag in a datacenter apparatus.

A basic flow of a process by the searcher is as below:

First, the searcher selects a keyword which the searcher wants to search for.

Next, the searcher randomizes the keyword using his/her secret key. A randomized keyword is called a search query. It is difficult to analogize the secret key from the search query.

Next, the searcher transmits the search query to the datacenter apparatus, and thereby requests the datacenter apparatus to perform a search.

Then, the searcher accepts encrypted data corresponding to the search query from the datacenter apparatus.

A basic flow of a process by the datacenter apparatus is as below:

In the datacenter apparatus, a plurality of tuples each consisting of encrypted data and an encrypted tag are registered.

First, the datacenter apparatus accepts a search query.

Next, the datacenter apparatus selects an encrypted tag corresponding to the search query by a special computation. In the special computation, a keyword of the search query can be compared with a keyword of each encrypted tag without the encrypted tag being decrypted.

Then, the datacenter apparatus transmits encrypted data associated with the selected encrypted tag.

There are two types of searchable encryption schemes: a common key scheme and a public key scheme.

The common key scheme uses a common key encryption technology, and limits who to be a registrant and a searcher.

The public key scheme uses a public key encryption technology, and limits searchers but not registrants.

Under the common key scheme, usually, a registrant and a searcher share the same secret information among them.

Non-Patent Literature 1 discloses a common key scheme under which a registrant and a searcher do not share the same secret information among them, in order to lower a sharing cost of the secret information and a degree of influence that arises if the secret information is leaked.

Further, Non-Patent Literature 1 discloses a multi-user common key scheme.

Under the multi-user common key scheme, settings can be made for a user who is allowed to perform a search and a user who is not allowed to perform the search. In other words, under the multi-user common key scheme, it is possible to generate encrypted data that hits a search by one user, but does not hit a search by another user, when a plurality of users, each of whom having different secret information, search with the same keyword.

CITATION LIST

Patent Literature

Patent Literature 1: JP 6038427
Patent Literature 2: International Publication WO 2011/086687

Non-Patent Literature

Non-Patent Literature 1: R. A. Popa, N. Zeldovich, "Multi-Key Searchable Encryption", IACR Cryptology ePrint Archive: Report 2013/508.
Non-Patent Literature 2: S. Patranabis, D. Mukhopadhyay, "Lightweight Symmetric—Key Hidden Vector Encryption without Pairings", IACR Cryptology ePrint Archive: Report 2017/796.
Non-Patent Literature 3: MENEZES, A. J., VAN OORSCHOT, P. C. and VANSTONE, S. A., HANDBOOK of APPLIED CRYPTOGRAPHY, CRC Press, 1997, p. 234, 235

SUMMARY OF INVENTION

Technical Problem

Non-Patent Literature 1 notes a fact that a well-known multi-user settings increase a size of the search query, and discloses a scheme to hold down a size of a search query using a proxy re-encryption technology.

The proxy re-encryption technology is a technology of converting encrypted data of one user into encrypted data that can be decrypted by another user, without decrypting the encrypted data of the one user.

However, the scheme in Non-Patent Literature 1 has a problem regarding a search speed since the proxy re-encryption technology uses a public key encryption technology.

The scheme in Non-Patent Literature 1 is available for an exact match search, but not for a partial match search. In other words, it is possible to determine whether a keyword used for a search exactly matches a keyword used for registration, but not whether the keyword used for the search is included in the keyword used for the registration as a partial character string.

Further, the scheme in Non-Patent Literature 1 is not available for a range search. In other words, if a keyword used for registration is a numerical value and a keyword used for a search is a numerical interval, it is impossible to determine whether the numerical value used for the registration is within the numerical interval used for the search.

Patent Literature 1 discloses a searchable encryption scheme available for a partial match. According to this scheme, it is possible to determine whether a keyword used for a search is included in a keyword used for registration as a partial character string, in an encrypted state.

However, this scheme is not available for multiple users. Therefore, it is difficult to expand this scheme to a multi-user common key scheme.

Non-Patent Literature 2 is not a searchable encryption technology, however, discloses an encryption scheme with an access control function.

This scheme allows generation of encrypted data that can be decrypted by one user, but not by another user, based on attribute information of each user.

This scheme uses a common key encryption technology. Therefore, although registrants and searchers are limited, this scheme delivers a high efficiency.

However, it is difficult to expand this scheme to the multi-user common key scheme.

An objective of the present invention is to enable searchable encryption under a multi-user common key encryption scheme.

Solution to Problem

A registration apparatus according to the present invention includes:

a random number generation unit to generate a data random number tuple R that is a tuple of random numbers whose quantity is the same as a level quantity L of a hierarchy that a user attribute forms, and that is also a tuple of uniformly random numbers;

an acceptance unit to accept a plaintext M and attribute information B that indicates an attribute value by level of a user who is allowed to refer to the plaintext M;

an encrypted data generation unit to execute a function F_2 by taking as input a concatenated value of an attribute value of each level j in the attribute information B and a number of each level j, to execute a function F_3 by taking as input a function value of the function F_2, to calculate an attribute element C_{j, 0, 0} that is an exclusive-or of a function value of the function F_3 and a jth random number of the data random number tuple R, to execute a function F_4 by taking as input the plaintext M and an exclusive-or of the data random number tuple R, and to generate encrypted data C that includes the attribute element C_{j, 0, 0} and a ciphertext C_{L+1} which is a function value of the function F_4; and a registration unit to register the encrypted data C in a data management apparatus.

Advantageous Effects of Invention

According to the present invention, encrypted data C that is generated using multiple functions is registered. This enables searchable encryption under a multi-user common key encryption scheme.

BRIEF DESCRIPTION OF DRAWINGS

FIG. 15 is a diagram illustrating an example of attribute information according to Embodiment 1.

DESCRIPTION OF EMBODIMENTS

In embodiments and drawings, the same components and corresponding components are denoted by the same reference signs. An explanation on a component denoted by the same reference number is omitted or simplified according to circumstances. An arrow in a drawing mainly indicates a data flow or a process flow.

Embodiment 1

Based on FIG. 1 to FIG. 20, an explanation will be given on an embodiment to perform searchable encryption under a multi-user common key encryption scheme.

Description of Configuration

Figure 1:
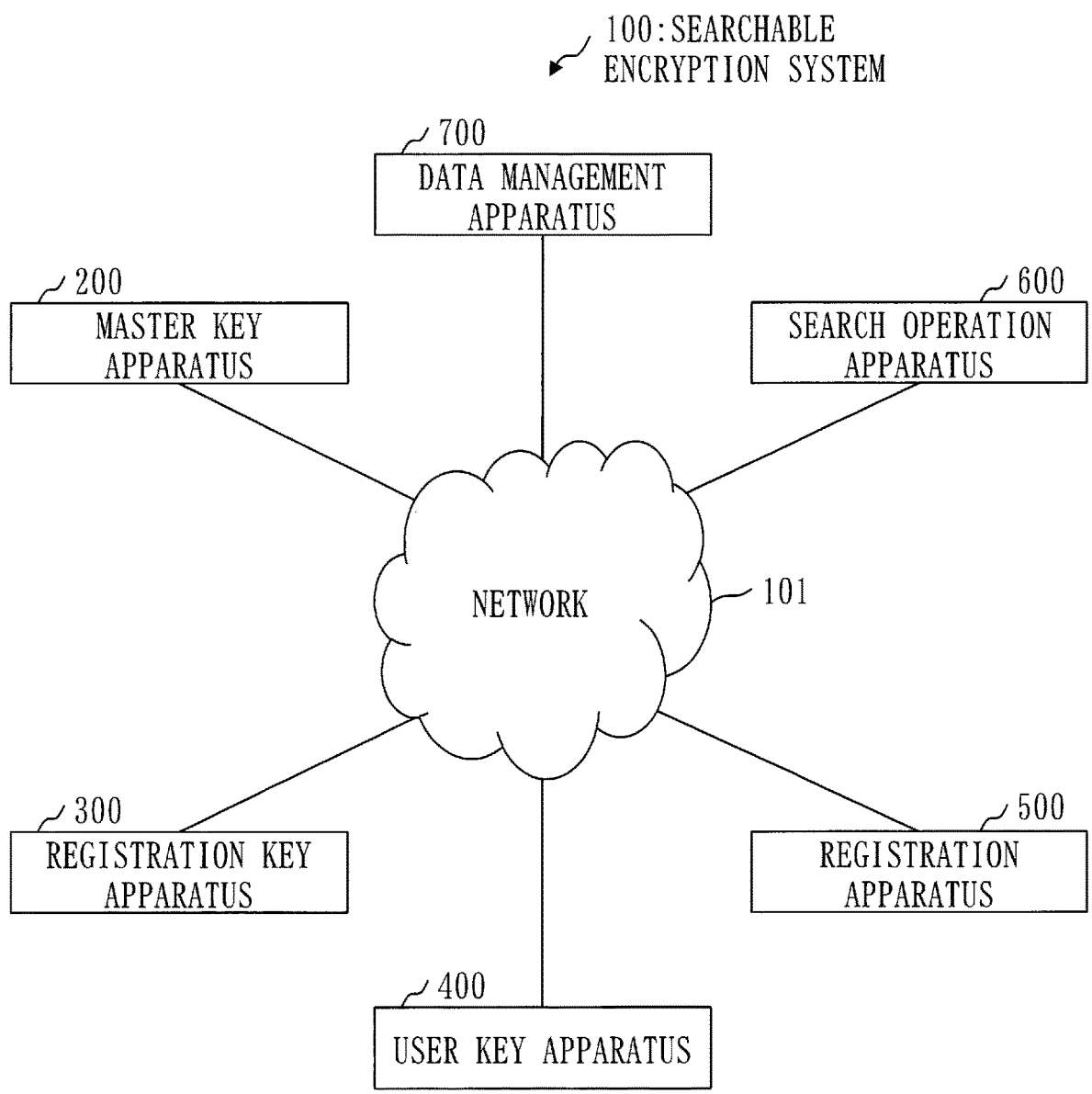
FIG. 1 is a configuration diagram of a searchable encryption system 100 according to Embodiment 1.

Based on FIG. 1, an explanation will be given on a configuration of a searchable encryption system 100.

The searchable encryption system 100 is provided with a master key apparatus 200, a registration key apparatus 300, a user key apparatus 400, a registration apparatus 500, a search operation apparatus 600, and a data management apparatus 700.

The apparatuses of the searchable encryption system 100 communicate with each other via a network 101.

Figure 2:
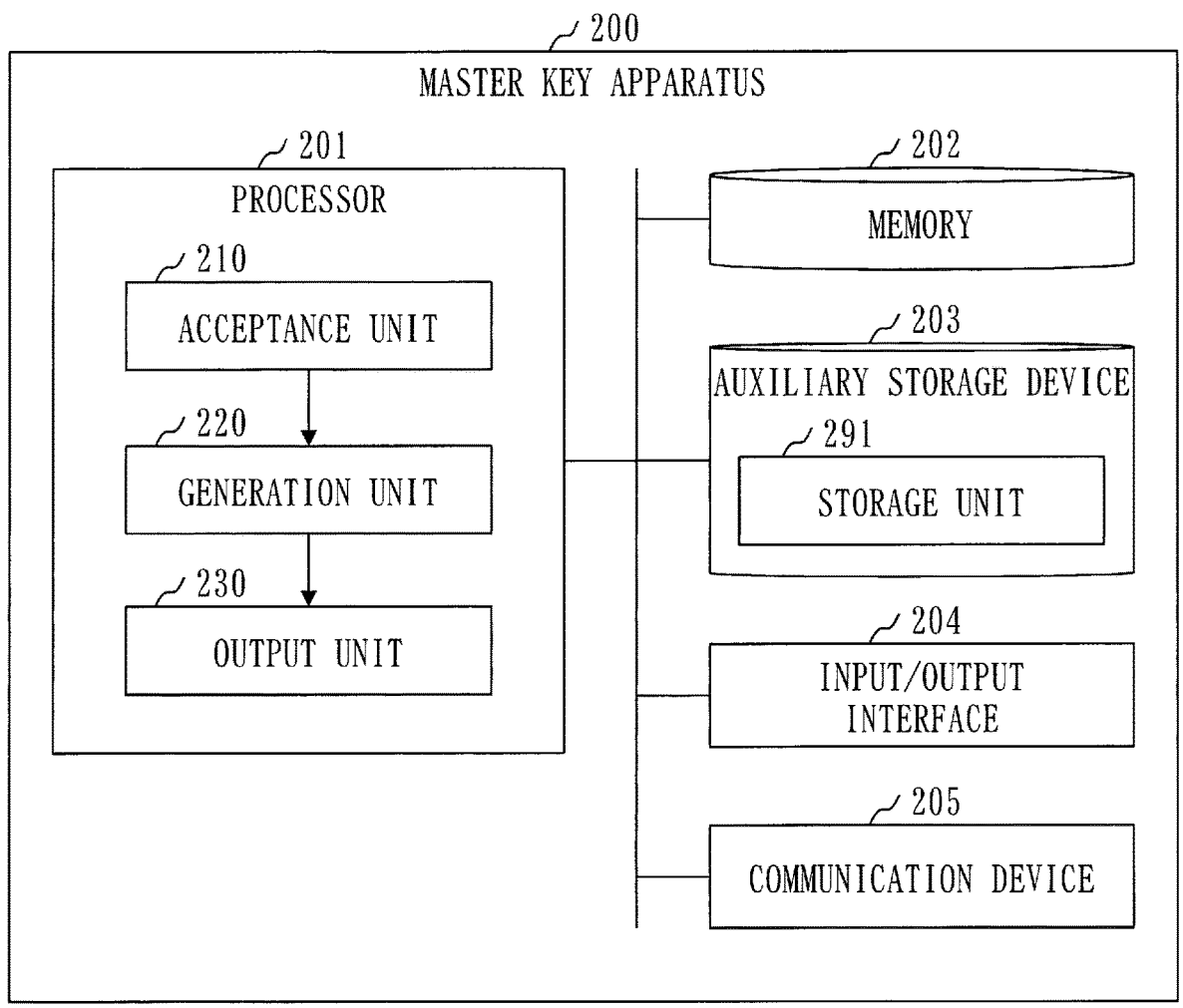
FIG. 2 is a configuration diagram of a master key apparatus 200 according to Embodiment 1.

Based on FIG. 2, an explanation will be given on a configuration of the master key apparatus 200.

The master key apparatus 200 is a computer provided with hardware devices such as a processor 201, a memory 202, an auxiliary storage device 203, an input/output interface 204, and a communication device 205. These pieces of hardware are connected with each other via a signal line.

The processor 201 is an integrated circuit (IC) that performs a computation processing, and controls the other hardware devices. For example, a processor 201 is a central processing unit (CPU), a digital signal processor (DSP), or a graphics processing unit (GPU).

The memory 202 is a volatile storage device. The memory 202 is called also a main storage device or a main memory. For example, the memory 202 is a random-access memory (RAM). Data stored in the memory 202 is saved, as necessary, in the auxiliary storage device 203.

The auxiliary storage device 203 is a nonvolatile storage device. For example, the auxiliary storage device 203 is a read-only memory (ROM), a hard disk chive (HDD), or a flash memory. Data stored in the auxiliary storage device 203 is loaded, as necessary, into the memory 202.

The input/output interface 204 is a port to which an input device(s) and an output device are connected. For example, the input/output interface 204 is a USB terminal, the input devices are a keyboard and a mouse, and the output device is a display. USB is an abbreviation for Universal Serial Bus.

The communication device 205 is a receiver/transmitter. For example, the communication device 205 is a communication chip or a network interface card (NIC).

The master key apparatus 200 is provided with components such as an acceptance unit 210, a generation unit 220, and an output unit 230. These components are implemented by software.

In the auxiliary storage device 203, a master key program to cause the computer to function as the acceptance unit 210, the generation unit 220, the output unit 230, and a storage unit 291 is stored. The master key program is loaded into the memory 202, and executed by the processor 201.

Further, in the auxiliary storage device 203, an operating system (OS) is stored. At least part of the OS is loaded into the memory 202, and executed by the processor 201.

In other words, the processor 201 executes the master key program while executing the OS.

Data obtained by executing the master key program is stored in a storage device such as the memory 202, the auxiliary storage device 203, and a register or cache memory in the processor 201.

The auxiliary storage device 203 functions as the storage unit 291. However, another storage device may function as the storage unit 291, instead of the auxiliary storage device 203 or together with the auxiliary storage device 203.

The master key apparatus 200 may be provided with a plurality of processors that substitute for the processor 201. The plurality of processors divide a role of the processor 201 among themselves.

The master key program can be recorded (stored) in a computer-readable way in a nonvolatile recording medium such as an optical disc and a flash memory.

Figure 3:
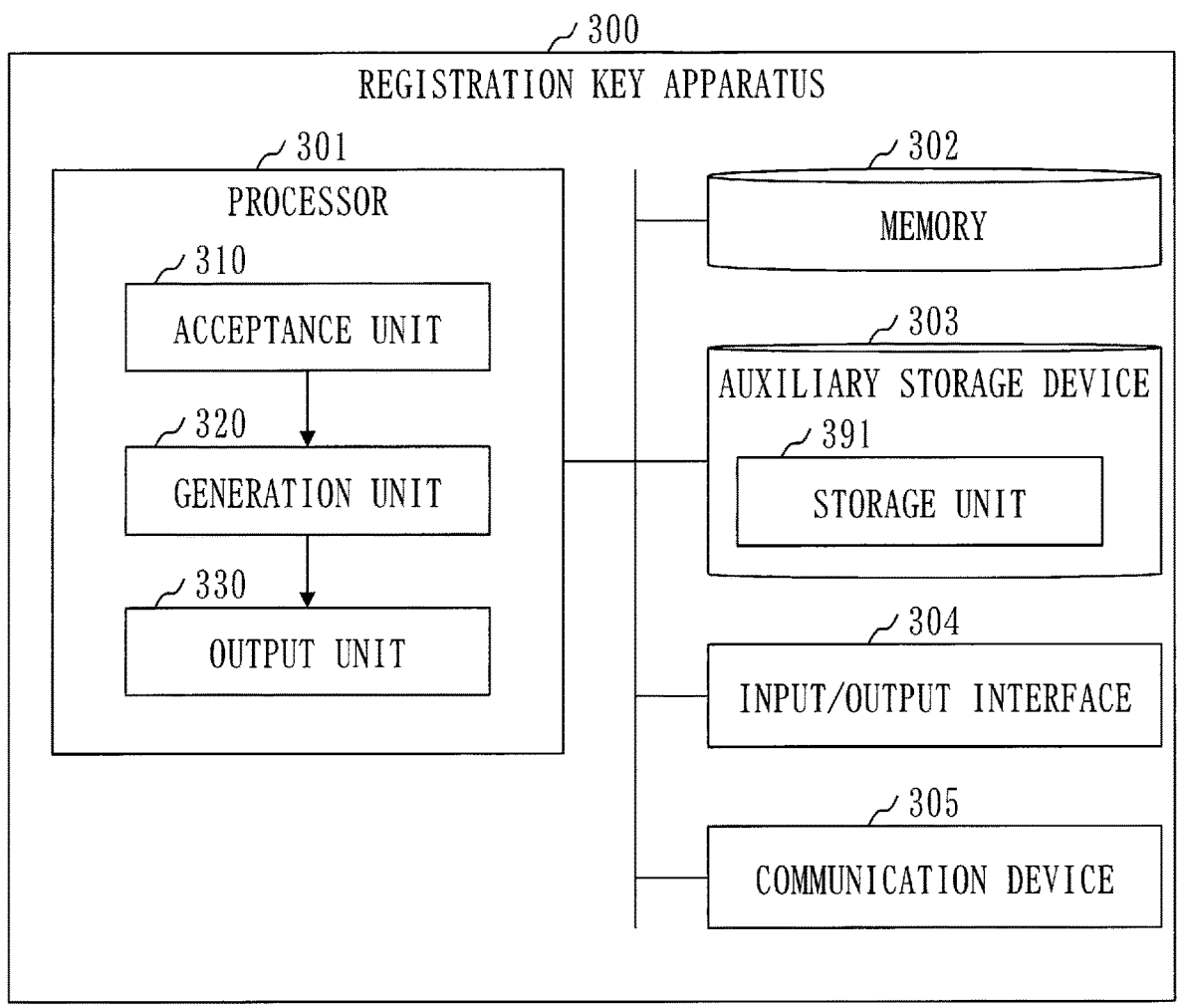
FIG. 3 is a configuration diagram of a registration key apparatus 300 according to Embodiment 1.

Based on FIG. 3, an explanation will be given on a configuration of the registration key apparatus 300.

The registration key apparatus 300 is a computer provided with hardware devices such as an acceptance unit 310, a generation unit 320, and an output unit 330. These hardware devices are connected to each other via a signal line.

A processor 301 is an IC that performs a computation processing, and controls the other hardware devices. For example, the processor 301 is a CPU, a DSP, or a GPU.

A memory 302 is a volatile storage device. The memory 302 is called also a main storage device or a main memory. For example, the memory 302 is a RAM. Data stored in the memory 302 is saved, as necessary, in an auxiliary storage device 303.

The auxiliary storage device 303 is a nonvolatile storage device. For example, the auxiliary storage device 303 is a ROM, an HDD, or a flash memory. Data stored in the auxiliary storage device 303 is loaded, as necessary, into the memory 302.

An input/output interface 304 is a port to which an input device(s) and an output device are connected. For example, the input/output interface 304 is a USB terminal, the input devices are a keyboard and a mouse, and the output device is a display.

A communication device 305 includes a receiver and a transmitter. For example, the communication device 305 is a communication chip or a NIC.

The registration key apparatus 300 is provide with components such as the acceptance unit 310, the generation unit 320, and the output unit 330. These components are implemented by software.

In the auxiliary storage device 303, a registration key program to cause the computer to function as the acceptance unit 310, the generation unit 320, the output unit 330, and a storage unit 391 is stored. The registration key program is loaded into the memory 302, and executed by the processor 301.

Further, in the auxiliary storage device 303, an OS is stored. At least part of the OS is loaded into the memory 302, and executed by the processor 301.

In other words, the processor 301 executes the registration key program while executing the OS.

Data obtained by executing the registration key program is stored in a storage device such as the memory 302, the auxiliary storage device 303, and a register or cache memory in the processor 301.

The auxiliary storage device 303 functions as the storage unit 391. However, another storage device may function as the storage unit 391, instead of the auxiliary storage device 303 or together with the auxiliary storage device 303.

The registration key apparatus 300 may be provided with a plurality of processors that substitute for the processor 301. The plurality of processors divide a role of the processor 301 among themselves.

The registration key program can be recorded (stored) in a computer-readable way in a nonvolatile recording medium such as an optical disc or a flash memory.

Figure 4:
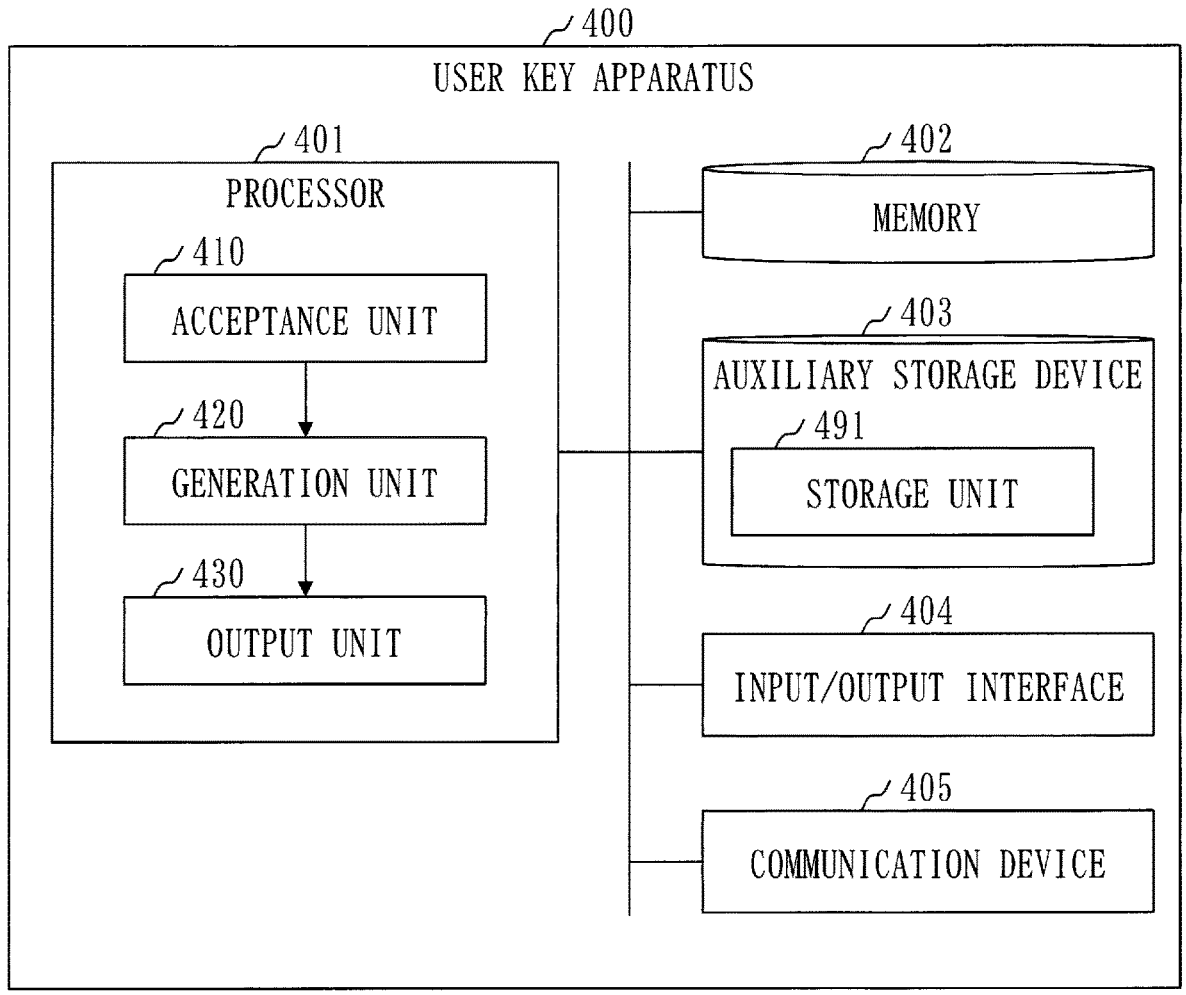
FIG. 4 is a configuration diagram of a user key apparatus 400 according to Embodiment 1.

Based on FIG. 4, an explanation will be given on a configuration of the user key apparatus 400.

The user key apparatus 400 is a computer provided with hardware devices such as a processor 401, a memory 402, an auxiliary storage device 403, an input/output interface 404, and a communication device 405. These pieces of hardware are connected to each other via a signal line.

The processor 401 is an IC that performs a computation processing, and controls the other hardware devices. For example, the processor 401 is a CPU, a DSP, or a GPU.

The memory 402 is a volatile storage device. The memory 402 is called also a main storage device or a main memory. For example, the memory 402 is a RAM. Data stored in the memory 402 is saved, as necessary, in the auxiliary storage device 403.

The auxiliary storage device 403 is a nonvolatile storage device. For example, the auxiliary storage device 403 is a ROM, an HDD, or a flash memory. Data stored in the auxiliary storage device 403 is loaded, as necessary, into the memory 402.

The input/output interface 404 is a port to which an input device(s) and an output device are connected. For example, the input/output interface 404 is a USB terminal, the input devices are a keyboard and a mouse, and the output device is a display.

The communication device 405 is a receiver/transmitter. For example, the communication device 405 is a communication chip or a NIC.

The user key apparatus 400 is provided with components such as an acceptance unit 410, a generation unit 420, and an output unit 430. These components are implemented by software.

In the auxiliary storage device 403, a user key program to cause the computer to function as the acceptance unit 410, the generation unit 420, the output unit 430, and a storage unit 491 is stored. The user key program is loaded into the memory 402, and executed by the processor 401.

Further, in the auxiliary storage device 403, an OS is stored. At least part of the OS is loaded into the memory 402, and executed by the processor 401.

In other words, the processor 401 executes the user key program while executing the OS.

Data obtained by executing the user key program is stored in a storage device such as the memory 402, the auxiliary storage device 403, and a register or cache memory in the processor 401.

The auxiliary storage device 403 functions as the storage unit 491. However, another storage device may function as the storage unit 491, instead of the auxiliary storage device 403 or together with the auxiliary storage device 403.

The user key apparatus 400 may be provided with a plurality of processors that substitute for the processor 401. The plurality of processors divide a role of the processor 401 among themselves.

The user key program can be recorded (stored) in a computer-readable way in a nonvolatile recording medium such as an optical disc and a flash memory.

Figure 5:
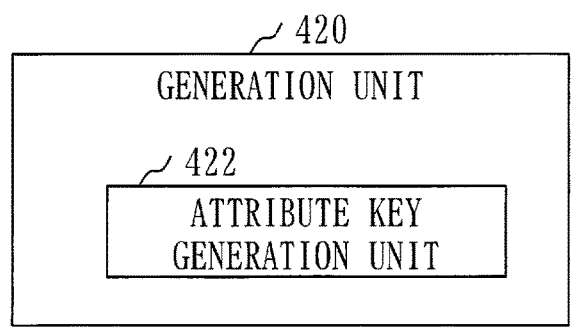
FIG. 5 is a configuration diagram of a generation unit 420 according to Embodiment 1.

Based on FIG. 5, an explanation will be given on a configuration of the generation unit 420.

The generation unit 420 is provided with an attribute key generation unit 422.

Figure 6:
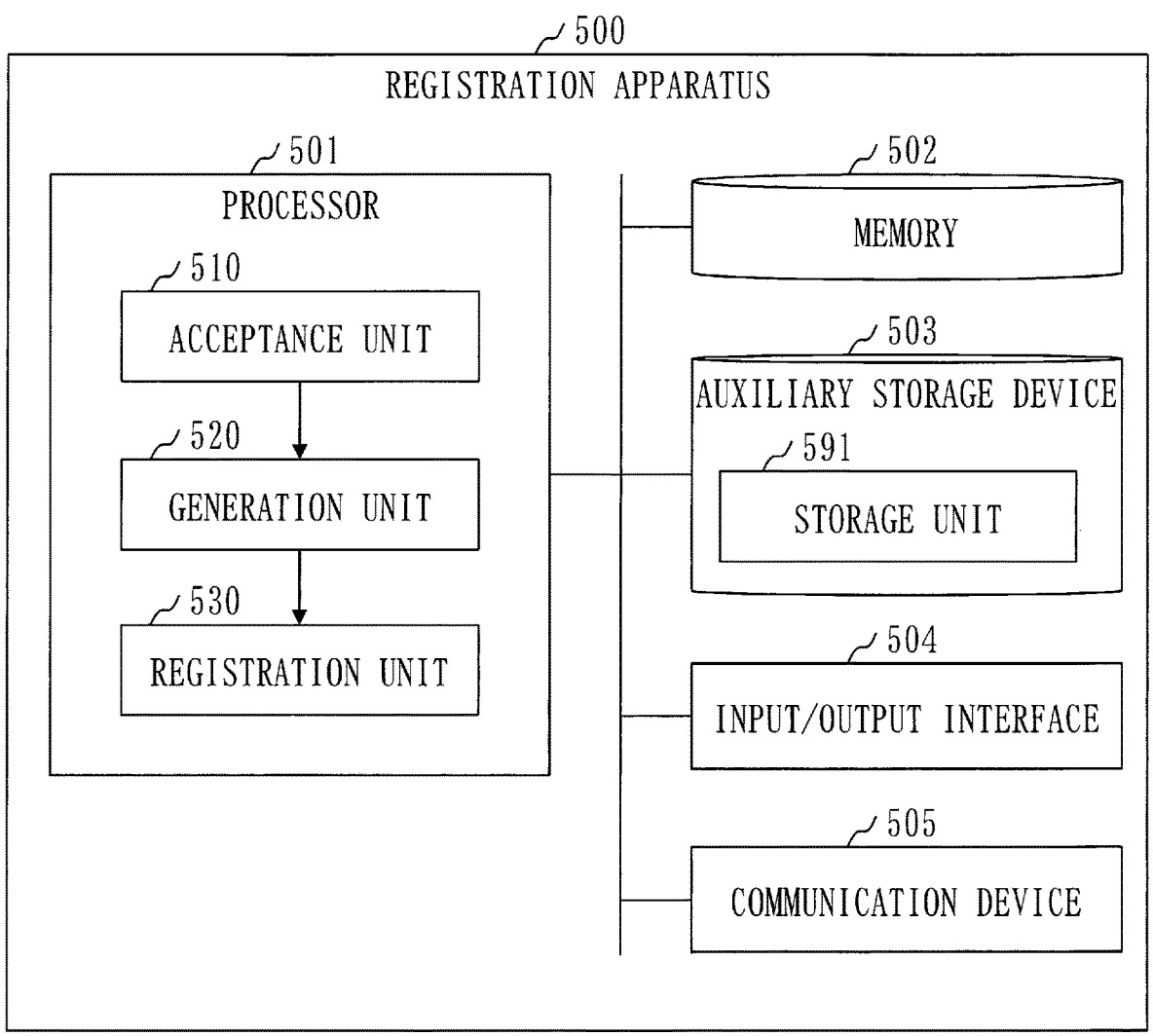
FIG. 6 is a configuration diagram of a registration apparatus 500 according to Embodiment 1.

Based on FIG. 6, an explanation will be given on a configuration of the registration apparatus 500.

The registration apparatus 500 is a computer provided with hardware devices such as a processor 501, a memory 502, an auxiliary storage device 503, an input/output interface 504, and a communication device 505. These hardware devices are connected to each other via a signal line.

The processor 501 is an IC that performs a computation processing, and controls the other hardware devices. For example, the processor 501 is a CPU, a DSP, or a GPU.

The memory 502 is a volatile storage device. The memory 502 is called also a main storage device or a main memory. For example, the memory 502 is a RAM. Data stored in the memory 502 is saved, as necessary, in the auxiliary storage device 503.

The auxiliary storage device 503 is a nonvolatile storage device. For example, the auxiliary storage device 503 is a ROM, an HDD, or a flash memory. Data stored in the auxiliary storage device 503 is loaded, as necessary, into the memory 502.

The input/output interface 504 is a port to which an input device(s) and an output device are connected. For example, the input/output interface 504 is a USB terminal, the input devices are a keyboard and a mouse, and the output device is a display.

The communication device 505 is a receiver/transmitter. For example, the communication device 505 is a communication chip or a NIC.

The registration apparatus 500 is provided with components such as an acceptance unit 510, a generation unit 520, and a registration unit 530. These components are implemented by software.

In the auxiliary storage device 503, a registration program to cause the computer to function as the acceptance unit 510, the generation unit 520, the registration unit 530, and a storage unit 591 is stored. The registration program is loaded into the memory 502, and executed by the processor 501.

Further, in the auxiliary storage device 503, an OS is stored. At least part of the OS is loaded into the memory 502, and executed by the processor 501.

In other words, the processor 501 executes the registration program while executing the OS.

Data obtained by executing the registration program is stored in a storage device, such as the memory 502, the auxiliary storage device 503, and a register or cache memory in the processor 501.

The auxiliary storage device 503 functions as the storage unit 591. However, another storage device may function as the storage unit 591, instead of the auxiliary storage device 503 or together with the auxiliary storage device 503.

The registration apparatus 500 is provided with a plurality of processors that substitute for the processor 501. The plurality of processors divide a role of the processor 501 among themselves.

The registration program can be recorded (stored) in a computer-readable way in a nonvolatile recording medium such as an optical disc and a flash memory.

Figure 7:
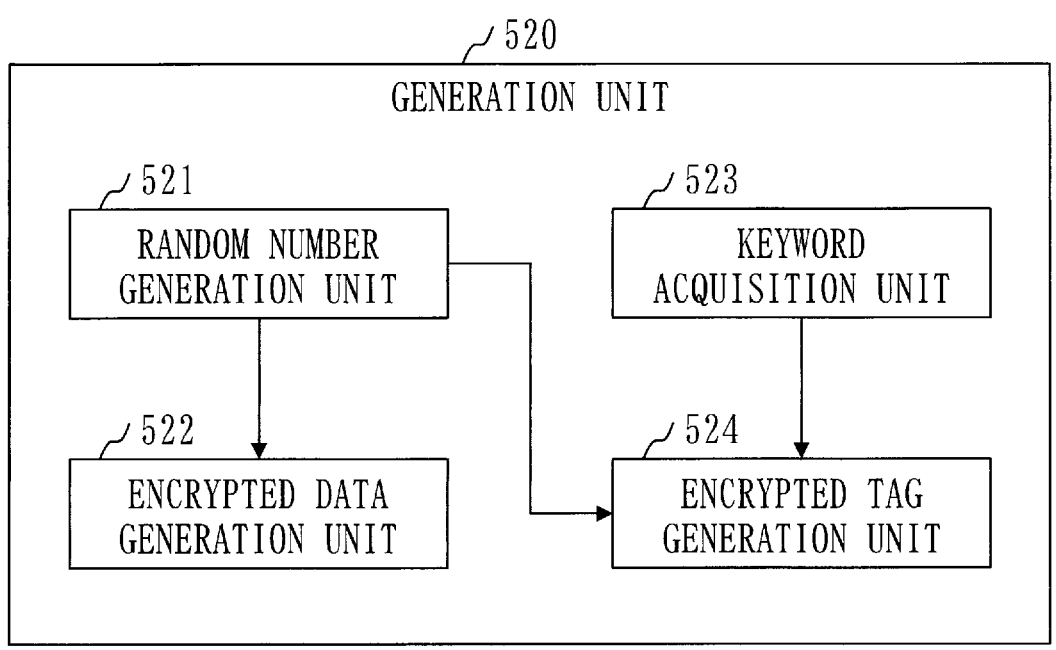
FIG. 7 is a configuration diagram of a generation unit 520 according to Embodiment 1.

Based on FIG. 7, an explanation will be given on a configuration of the generation unit 520.

The generation unit 520 is provided with a random number generation unit 521, an encrypted data generation unit 522, a keyword acquisition unit 523, and an encrypted tag generation unit 524.

Figure 8:
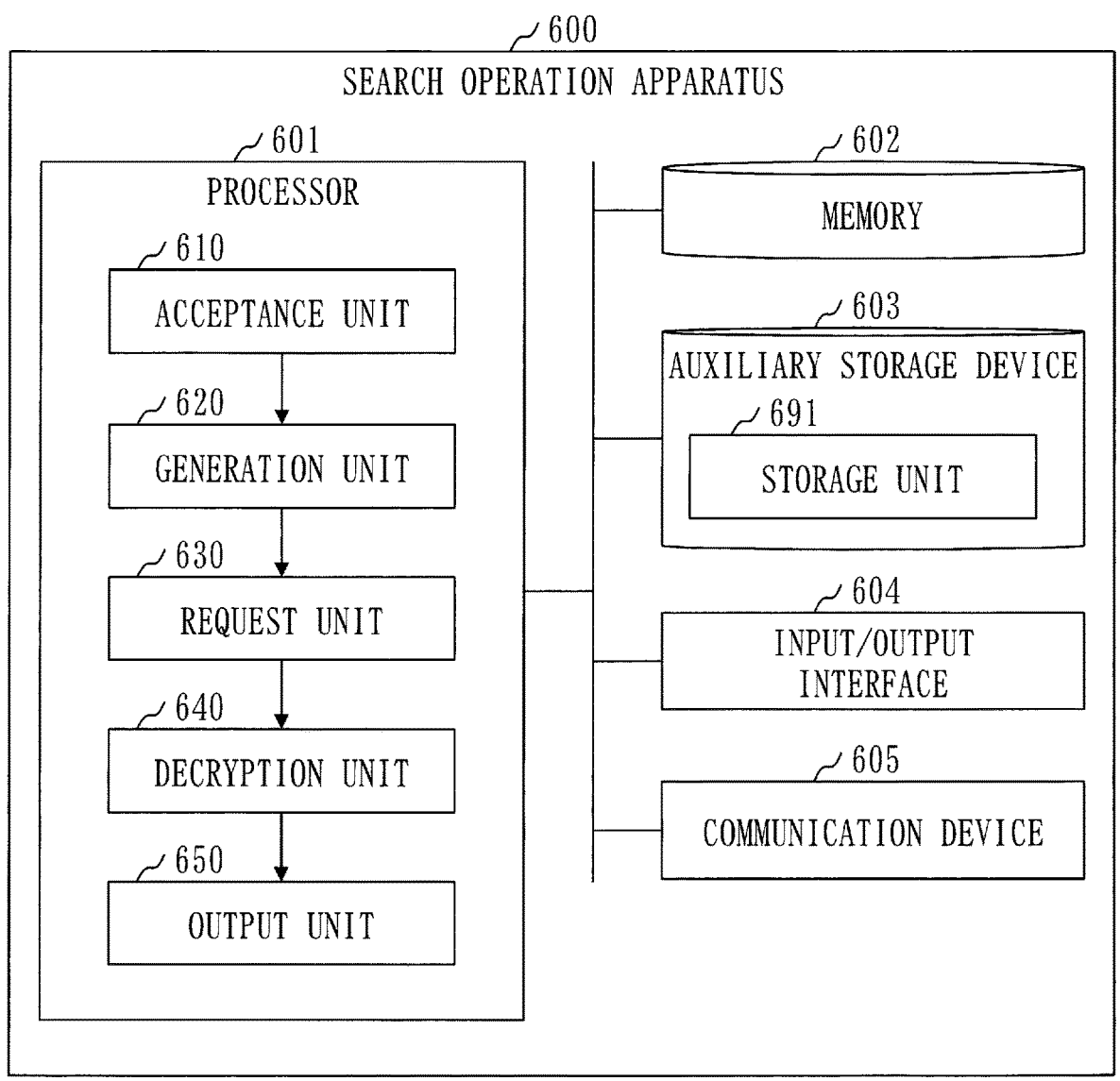
FIG. 8 is a configuration diagram of a search operation apparatus 600 according to Embodiment 1.

Based on FIG. 8, an explanation will be given on a configuration of the search operation apparatus 600.

The search operation apparatus 600 is a computer is provided with hardware devices such as a processor 601, a memory 602, an auxiliary storage device 603, an input/output interface 604, and a communication device 605. These hardware devices are connected to each other via a signal line.

The processor 601 is an IC that performs a computation processing, and controls the other hardware devices. For example, the processor 601 is a CPU, a DSP, or a GPU.

The memory 602 is a volatile storage device. The memory 602 is called also a main storage device or a main memory. For example, the memory 602 is a RAM. Data stored in the memory 602 is saved, as necessary, in the auxiliary storage device 603.

The auxiliary storage device 603 is a nonvolatile storage device. For example, the auxiliary storage device 603 is a ROM, an HDD, or a flash memory. Data stored in the auxiliary storage device 603 is loaded, as necessary, into the memory 602.

The input/output interface 604 is a port to which an input device(s) and an output device are connected. For example, the input/output interface 604 is a USB terminal, the input devices are a keyboard and a mouse, and the output device is a display.

The communication device 605 is a receiver/transmitter. For example, the communication device 605 is a communication chip or a NIC.

The search operation apparatus 600 is provided with components such as an acceptance unit 610, a generation unit 620, a request unit 630, a decryption unit 640, and an output unit 650. These components are implemented by software.

In the auxiliary storage device 603, a search operation program to cause the computer to function as the acceptance unit 610, the generation unit 620, a request unit 630, a decryption unit 640, the output unit 650, and a storage unit 691 is stored. The search operation program is loaded into the memory 602, and executed by the processor 601.

Further, in the auxiliary storage device 603, an OS is stored. At least part of the OS is loaded into the memory 602, and executed by the processor 601.

In other words, the processor 601 executes the search operation program while executing the OS.

Data obtained by executing the search operation program is stored in a storage device such as the memory 602, the auxiliary storage device 603, and a register or cache memory in the processor 601.

The auxiliary storage device 603 functions as the storage unit 691. However, another storage device may function as the storage unit 691, instead of the auxiliary storage device 603 or together with the auxiliary storage device 603.

The search operation apparatus 600 may include a plurality of processors that substitute for the processor 601. The plurality of processors divide a role of the processor 601 among themselves.

The search operation program can be recorded (stored) in a computer-readable way in a nonvolatile recording medium such as an optical disc or a flash memory.

Figure 9:
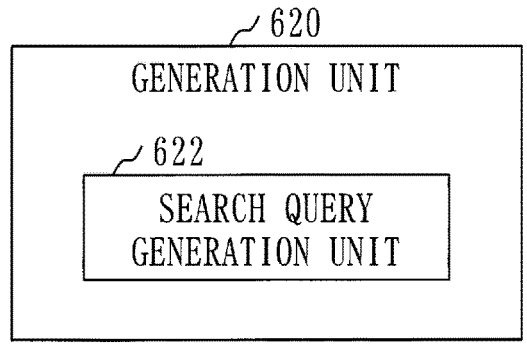
FIG. 9 is a configuration diagram of a generation unit 620 according to Embodiment 1.

Based on FIG. 9, an explanation will be given on a configuration of the generation unit 620.

The generation unit 620 provided with a search query generation unit 622.

Figure 10:
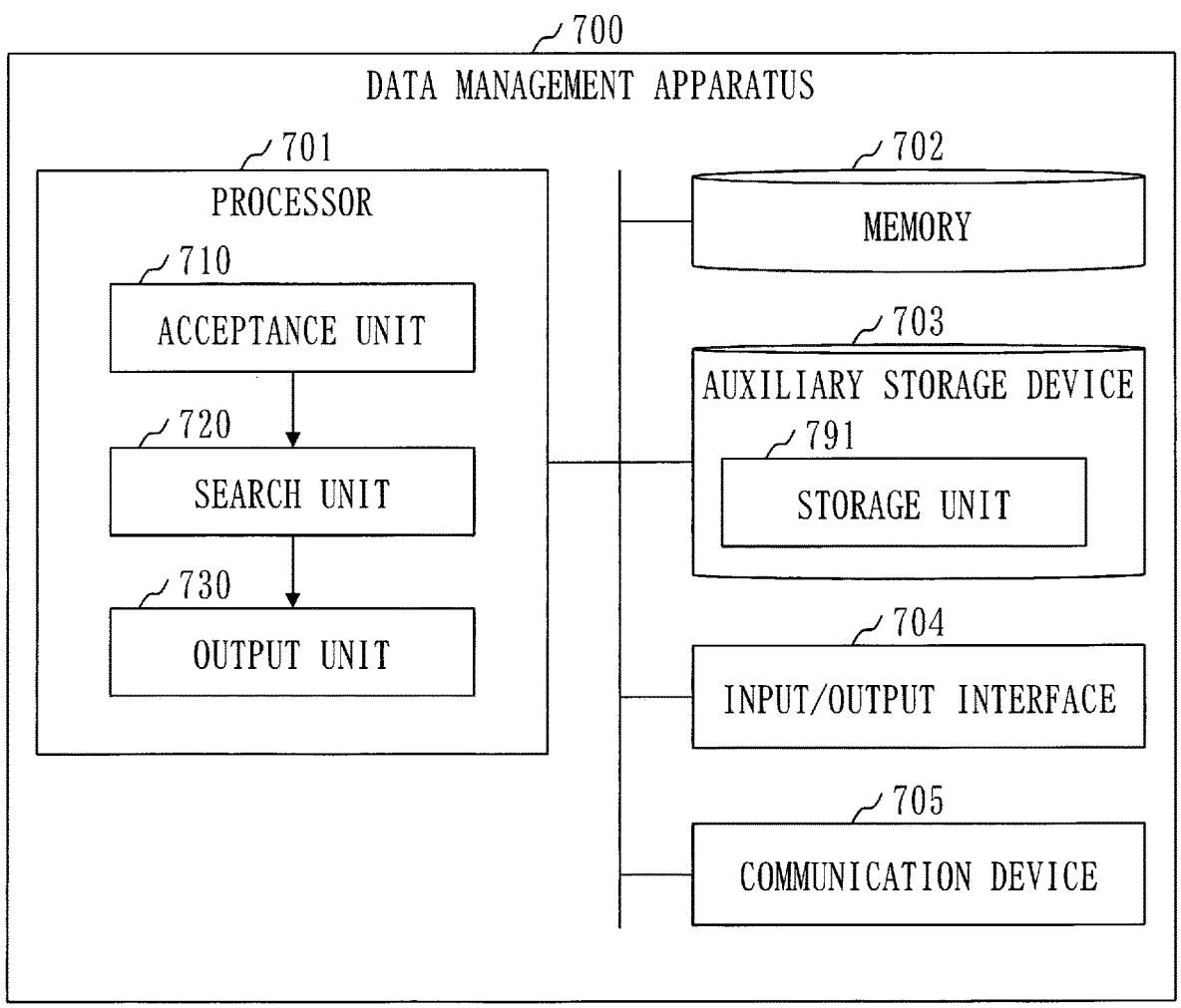
FIG. 10 is a configuration diagram of a data management apparatus 700 according to Embodiment 1.
Figure 11:
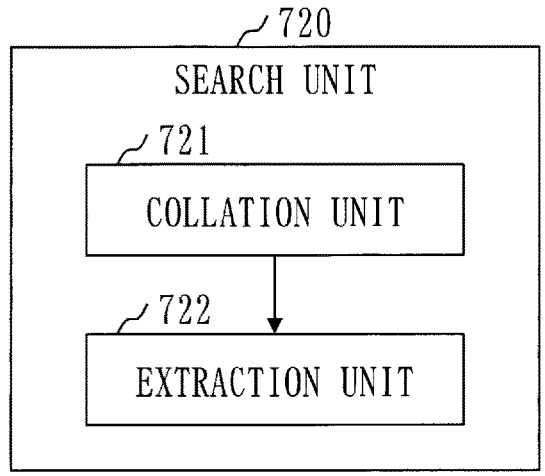
FIG. 11 is a configuration diagram of a search unit 720 according to Embodiment 1.

Based on FIG. 10, an explanation will be given on a configuration of the data management apparatus 700.

The data management apparatus 700 is a computer provided with hardware devices such as a processor 701, a memory 702, an auxiliary storage device 703, an input/output interface 704, and a communication device 705. These hardware devices are connected to each other via a signal line.

The processor 701 is an IC that performs a computation processing, and controls the other hardware devices. For example, the processor 701 is a CPU, a DSP, or a GPU.

The memory 702 is a volatile storage device. The memory 702 is called also a main storage device or a main memory. For example, the memory 702 is a RAM. Data stored in the memory 702 is saved, as necessary, in the auxiliary storage device 703.

The auxiliary storage device 703 is a nonvolatile storage device. For example, the auxiliary storage device 703 is a ROM, an HDD, or a flash memory. Data stored in the auxiliary storage device 703 is loaded, as necessary, into the memory 702.

The input/output interface 704 is a port to which an input device(s) and an output device are connected. For example, the input/output interface 704 is a USB terminal, the input devices are a keyboard and a mouse, and the output device is a display.

The communication device 705 is a receiver/transmitter. For example, the communication device 705 is a communication chip or a NIC.

The data management apparatus 700 is provided with components such as an acceptance unit 710, a collation unit 721, and an output unit 730. These components are implemented by software.

In the auxiliary storage device 703, a data management program to cause the computer to function as the acceptance unit 710, the collation unit 721, the output unit 730, and a storage unit 791 is stored. The data management program is loaded into the memory 702, and executed by the processor 701.

Further, in the auxiliary storage device 703, an OS is stored. At least part of the OS is loaded into the memory 702, and executed by the processor 701.

In other words, the processor 701 executes the data management program while executing the OS.

Data obtained by executing the data management program is stored in a storage device such as the memory 702, the auxiliary storage device 703, and a register or cache memory in the processor 701.

The auxiliary storage device 703 functions as the storage unit 791. However, another other storage device may function as the storage unit 791, instead of the auxiliary storage device 703 or together with the auxiliary storage device 703.

The data management apparatus 700 may be provided with a plurality of processors that substitute for the processor 701. The plurality of processors divide a role of the processor 701 among themselves.

The data management program can be recorded (stored) in a computer-readable way in a nonvolatile storing medium such as an optical disc or a flash memory.

Description of Operation

Operation of the searchable encryption system 100 is equivalent to a searchable encryption method.

As the searchable encryption method, an explanation will be given on processes of devices of the searchable encryption system 100.

Based on FIG. 12, an explanation will be given on master key generation (S110).

Master key generation (S110) is a process to be executed by the master key apparatus 200.

In step S111, the acceptance unit 210 accepts key size BIT(i) and a generation number i.

Specifically, the acceptance unit 210 accepts via the input/output interface 204, key size BIT(i) and a generation number i inputted to the master key apparatus 200. The acceptance unit 210 may accept the key size BIT(i) and the generation number i from an application program.

The key size BIT(i) is a bit length of a master key MK(i).

The generation number i is a generation number of the master key MK(i), and does not overlap with any of past generation numbers.

For example, the generation number i is a serial number or time and date.

The master key MK(i) is a master key MK of a generation number i.

In step S112, the generation unit 220 generates the master key MK(i).

Specifically, the generation unit 220 generates a random bit string of the same length as the key size BIT(i). The generated bit string is the master key MK(i).

For example, if the key size BIT(i) is 256 bits, the generation unit 220 generates a random bit string of 256 bits. In this way, a master key MK(i) of 256 bits can be obtained.

In step S113, the generation unit 220 stores the master key data MSK(i) in the storage unit 291. Then, the master key data MSK(i) is saved in the storage unit 291.

The master key data MSK(i) is a tuple of a master key MK(i) and a generation number i, and called master key data MSK of the generation number i.

The master key data MSK(i) can be expressed as below:

$$MSK(i)=(i,MK(i))$$

In step S114, the output unit 230 outputs the master key data MSK(i).

For example, the output unit 230 transmits the master key data MSK(i) to the registration key apparatus 300, using the communication device 205.

Based on FIG. 13, an explanation will be given on registration key generation (S120).

Registration key generation (S120) is a process to be executed by the registration key apparatus 300.

In step S121, the acceptance unit 310 accepts the master key data MSK(i).

For example, the acceptance unit 310 accepts the master key data MSK(i) from the master key apparatus 200, using the communication device 305. The acceptance unit 310 may accept via the input/output interface 304, master key data MSK(i) inputted to the registration key apparatus 300.

In step S122, the generation unit 320, using the master key MK(i) included in the master key data MSK(i), generates a data key DK(i) and a tag key TK(i).

Specifically, the generation unit 320 generates two random numbers by executing a function F_1 by taking as input the master key MK(i). Each of the random numbers is a random bit string.

An example of the function F_1 is a pseudo random function. The pseudo random function is a cryptographic function, and deterministically returns a random number in response to an input value once a key is determined. Alternatively, a cryptographic hash function such as SHA-1, or a function under a common key encryption scheme such as AES, may be used as the function F_1.

One of the random numbers is the data key DK(i). The data key DK(i) can be expressed as below:

$$DK(i)=F\_1(MK(i),1)$$

The other of the random numbers is the tag key TK(i). The tag key TK(i) can be expressed as below:

$$TK(i)=F\_1(MK(i),2)$$

In step S123, the generation unit 320 stores a registration key EK(i) in the storage unit 391. Then the registration key EK(i) is saved in the storage unit 391.

The registration key EK(i) is a tuple of a generation number i, a data key DK(i), and a tag key TK(i), and is called a registration key EK of the generation number i.

The registration key EK(i) can be expressed as below:

$$EK(i)=(i,DK(i),TK(i))$$

In step S124, the output unit 330 outputs the registration key EK(i).

For example, the output unit 330 transmits a registration key EK(i) to each of the user key apparatus 400 and the registration apparatus 500, using the communication device 305.

Based on FIG. 14, an explanation will be given on user key generation (S130).

User key generation (S130) is a process to be executed by the user key apparatus 400.

In step S131, the acceptance unit 410 accepts a registration key EK(i).

For example, the acceptance unit 410 accepts a registration key EK(i) from the registration key apparatus 300, using the communication device 405. The acceptance unit 410 may accept via the input/output interface 404, a registration key EK(i) inputted to the user key apparatus 400.

Further, the acceptance unit 410 stores the registration key EK(i) in the storage unit 491. Then the registration key EK(i) is saved in the storage unit 491.

If a registration key EK(i) is already saved in the storage unit 491, step S131 is not necessary.

The registration key EK(i) includes a generation number i, a data key DK(i), and a tag key TK(i).

In step S132, the acceptance unit 410 accepts attribute information A.

Specifically, the acceptance unit 410 accepts via the input/output interface 404, attribute information A inputted to the user key apparatus 400. The acceptance unit 410 may accept the attribute information A from an application program.

The attribute information A is attribute information of the searcher. The attribute information A relates to an authorization control for search and decryption.

The searcher is a user who performs a search. In other words, the searcher is a user of the search operation apparatus 600.

A user attribute forms a hierarchy.

Attribute information indicates attribute values by level of the user. In other words, the attribute information A indicates an attribute value by level of the hierarchy of the searcher.

Based on FIG. 15, an explanation will be given on an example of the attribute information.

A user attribute forms a hierarchy. In FIG. 15, a user attribute is composed of a four-level hierarchy.

First level of the attribute (first attribute) represents a division.

Second level of the attribute (second attribute) represents a department.

Third level of the attribute (third attribute) represents a section.

Fourth level of the attribute (fourth attribute) represents a name.

First attribute information is Ne's attribute information. Ne belongs to section Sc of department De of division Di.

Second attribute information is Nf's attribute information. Nf belongs to section Sd of department De of division Di.

Third attribute information is attribute information of a member of section Sc. The member of section Sc belongs to section Sc of department De of division Di. Since the fourth attribute is a wildcard "*", the name is not limited.

Fourth attribute information is attribute information of a member of department De. The member of department De belongs to department De of division Di. Since the third and fourth attributes are both wildcards "*", the section and the name are not limited.

In Embodiment 1, a user attribute is composed of L levels, and attribute information includes L of attribute values, where L is an integer of 2 or more.

The attribute information A can be expressed as below:

$$A=(A\_1, \ldots, A\_L)$$

Figure 14:
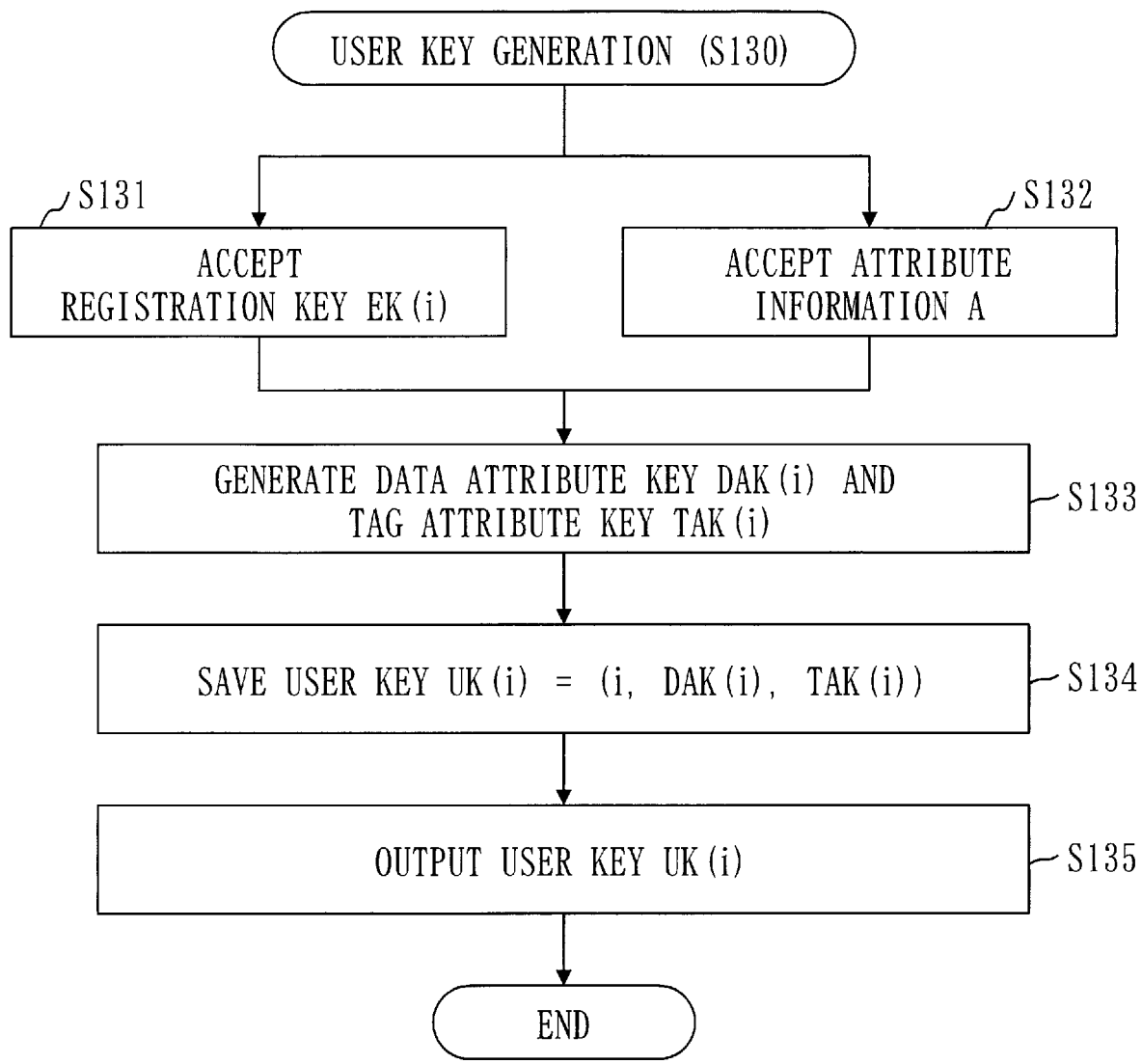
FIG. 14 is a flowchart of user key generation (S130) according to Embodiment 1.

Back to FIG. 14, an explanation will be continued from step S133.

In step S133, the attribute key generation unit 422, using the data key DK(i) and the attribute information A, generates data attribute key data DAK(i). The data attribute key data DAK(i) is data attribute key data DAK of a generation number i.

The data attribute key data DAK(i) involves a data attribute key DAK_j and a flag value Db_j where j is an integer of 1 or more and L or less.

The attribute key generation unit 422 calculates the data attribute key DAK_j as below:

First, the attribute key generation unit 422 concatenates an attribute value A_j and a number j. A value represented by an obtained bit string is called a concatenated value (A_j).

Next, the attribute key generation unit 422 executes a function F_2 by taking as input the data key DK(i) and the concatenated value (A_j). An obtained value is the data attribute key DAK_j.

The function F_2 is a pseudorandom function, a hash function, or a function under a common key encryption scheme, as the function F_1 is.

The attribute key generation unit 422 calculates the flag value Db_j as below:

The attribute key generation unit 422 determines whether the attribute value A_j is a wildcard "*".

If the attribute value A_j is a wildcard "*", the flag value Db_j is 1.

If the attribute value A_j is not a wildcard "*", the flag value Db_j is 0.

The data attribute key data DAK(i) can be expressed as below:

$$DAK(i)=((Db\_1, DAK\_1), \ldots, (Db\_L, DAK\_L))$$

If A_j=*, then Db_j=1
If Aj≠*, then Db_j=0

$$DAK\_j=F\_2(DK(i), A\_j \| j)$$

where "x∥y" means concatenation of data x and data y.

Further, the attribute key generation unit 422, using the tag key TK(i) and the attribute information A, generates tag attribute key data TAK(i). The tag attribute key data TAK(i) is tag attribute key data TAK of a generation number i.

The tag attribute key data TAK(i) involves a tag attribute key TAK_j and a flag value Tb_j.

The attribute key generation unit 422 calculates the tag attribute key TAK_j as below:

First, the attribute key generation unit 422 concatenates an attribute value A_j and a number j. A value represented by an obtained bit string is called a concatenated value (A_j).

Next, the attribute key generation unit 422 executes the function F_2 by taking as input the tag key TK(i) and the concatenated value (A_j). An obtained value is the tag attribute key TAK_j.

The flag value Tb_j indicates whether or not an attribute value A_j is a wildcard "*".

If the attribute value A_j is a wildcard "*", the flag value Tb_j is 1.

If the attribute value A_j is not a wildcard "*", the flag value Tb_j is 0.

The tag attribute key data TAK(i) can be expressed as below:

$$TAK(i)=((Tb\_1, TAK\_1), \ldots, (Tb\_L, TAK\_L))$$

If A_j=*, then Tb_j=1
If A_j≠*, then Tb_j=0

$$TAK\_j=F\_2(TK(i), A\_j \| j)$$

In step S134, the generation unit 420 stores a user key UK(i) in the storage unit 491. Then, the user key UK(i) is saved in the storage unit 491.

The user key UK(i) is a tuple of a generation number i, data attribute key data DAK(i), and tag attribute key data TAK(i).

The user key UK(i) is a user key UK of a generation number i corresponding to attribute information A.

The user key UK(i) can be expressed as below:

$$UK(i)=(i, DAK(i), TAK(i))$$

In step S135, the output unit 430 outputs the user key UK(i).

For example, the output unit 430 transmits a user key UK(i) to the search operation apparatus 600, using the communication device 405.

Based of FIG. 16, an explanation will be given on data registration (S140).

Data registration (S140) is a process to be executed by the registration apparatus 500.

In step S141, the acceptance unit 510 accepts a registration key EK(i).

For example, the acceptance unit 510 accepts a registration key EK(i) from the registration key apparatus 300, using the communication device 505. The acceptance unit 510 may accept via the input/output interface 504, a registration key EK(i) inputted to the registration apparatus 500.

Further, the acceptance unit 510 stores the registration key EK(i) in the storage unit 591. Then the registration key EK(i) is saved in the storage unit 591.

If a registration key EK(i) is already saved in the storage unit 591, step S141 is not necessary.

The registration key EK(i) includes a generation number i, a data key DK(i), and a tag key TK(i).

Further, the acceptance unit 510 stores the registration key EK(i) in the storage unit 591. Then the registration key EK(i) is saved in the storage unit 591.

In step S142, the acceptance unit 510 accepts a plaintext M and attribute information B.

Specifically, the acceptance unit 510 accepts via the input/output interface 504, a plaintext M and attribute information B inputted to the registration apparatus 500. The acceptance unit 510 may accept the plaintext M and the attribute information B from an application program.

The plaintext M is data that has not been encrypted.

The plaintext M includes a file name File(M) as metadata.

The attribute information B is attribute information of an authorized person, and indicates an attribute value by level of the authorized person. The attribute information B relates to an authorization control for search and decryption, as attribute information A does.

The authorized person is a user who is authorized to refer to the plaintext M. In other words, the authorized person is part of users of the search operation apparatus 600.

The attribute information B can be expressed as below:

$$B=(B\_1, \ldots, B\_L)$$

In step S143, the random number generation unit 521 generates three data random number tuples (R, s, S) and three tag random number tuples (R', s', S').

Each data random number tuple (R, s, S) is a tuple of random numbers whose quantity is the same as a level quantity L of a hierarchy of an attribute. In other words, each of a data random number tuple R, a data random number tuple s, and a data random number tuple S is a tuple of L of random numbers. The L of random numbers of each of the data random number tuples are generated uniform-randomly.

The three data random number tuples (R, s, S) can be expressed as below:

$$R=(R\_1, \ldots, R\_L)$$

$$s=(s\_1, \ldots, s\_L)$$

$$S=(S\_1, \ldots, S\_L)$$

Each tag random number tuple (R', s', S') consists of random numbers whose quantity is the same as the level quantity L of the hierarchy of the attribute. In other words, each of a tag random number tuple R', a tag random number tuple s', and a tag random number tuple S' is a tuple of L of random numbers. The L of random numbers of each of the tag random number tuples are generated uniform-randomly.

The three tag random number tuples (R', s', S') can be expressed as below:

$$R'=(R'\_1, \ldots, R'\_L)$$

$$s'=(s'\_1, \ldots, s'\_L)$$

$$S'=(S'\_1, \ldots, S'\_L)$$

In step S144, the encrypted data generation unit 522, using the data key DK(i), the plaintext M, the attribute information B, and the three data random number tuples (R, s, S), generates encrypted data C.

The encrypted data C includes an attribute element C_{j, 0, 0}, an attribute element C_{j, 0, 1}, a wildcard element C_{j, 1, 0}, and a wildcard element C_{j, 1, 1}.

Note that j is an integer of 1 or more and L or less, and represents a level number.

The encrypted data C further includes a ciphertext C_{L+1}.

The encrypted data C includes the file name File(M) as metadata of the plaintext M. The file name File(M) may be encrypted.

The encrypted data generation unit 522 calculates the attribute element C_{j, 0, 0} as below:

First, the encrypted data generation unit 522 concatenates an attribute value B_j and a number j. A value represented by an obtained bit string is called a concatenated value (B_j).

Next, the encrypted data generation unit 522 executes the function F_2 by taking as input the data key DK(i) and the concatenated value (B_j). An obtained value is called a function value (B_j').

Further, the encrypted data generation unit 522 executes a function F_3 by taking as input the function value (B_j') and a random number s_j. An obtained value is called a function value (B_j").

Then, the encrypted data generation unit 522 calculates an exclusive-or of the function value (B_j") and a random number R_j. An obtained value is the attribute element C_{j, 0, 0}.

The function F_3 is a pseudo random function, a hash function, or a function under a common key encryption scheme, as the function F_1 and the function F_2 are.

The encrypted data generation unit 522 sets the random number s_j to the attribute element C_{j, 0, 1}.

The encrypted data generation unit 522 calculates the wildcard element C_{j, 1, 0} as below:

First, the encrypted data generation unit 522 concatenates a wildcard "*" and a number j. A value represented by an obtained bit string is called a concatenated value (*_j).

Next, the encrypted data generation unit 522 executes the function F_2 by taking as input the data key DK(i) and the concatenated value (*_j). An obtained value is called a function value (*_j').

Further, the encrypted data generation unit 522 executes the function F_3 by taking as input the function value (*_j') and a random number S_j. An obtained value is called a function value (*_j").

Then, the encrypted data generation unit 522 calculates an exclusive-or of the function value (*_j") and a random number R_j. An obtained value is the wildcard element C_{j, 1, 0}.

The encrypted data generation unit 522 sets the random number S_j to the wildcard element C_{j, 1, 1}.

The encrypted data generation unit 522 calculates the ciphertext C_{L+1} as below:

First, the encrypted data generation unit 522 calculates an exclusive-or of L of random numbers of the data random number tuple R. An obtained value is called a computation value (R+).

Then, the encrypted data generation unit 522 executes a function F_4 by taking as input the computation value (R+) and the plaintext M. An obtained value is the ciphertext C_{L+1}.

An example of the function F_4 is a function under a common key encryption scheme, such as AES.

The encrypted data C can be expressed as below. Note that in Embodiment 1, "+" means an exclusive-or (XOR):

$$C=((C\{1,0,0\}, C\_\{1,0,1\}, C\_\{1,1,0\}, C\_\{1,1,1\}), \ldots, (C\_\{L,0,0\}, C\_\{L,0,1\}, C\_\{L,1,0\}, C\_\{L,1,1\}), C\_\{L+1\})$$

$$C\_\{j,0,0\}=F\_3(F\_2(DK(i), B\_j\|j), s\_j)+R\_j$$

$$C\_\{j,0,1\}=s\_j$$

$$C\_\{j,1,0\}=F\_3(F\_2(DK(i), *\|j), S\_j)+R\_j$$

$$C\_\{j,1,1\}=S\_j$$

$$C\_\{L+1\}=F\_4(R+,M)$$

$$R+=R\_1+\ldots+R\_L$$

In step S145, the keyword acquisition unit 523 acquires a keyword group regarding the plaintext M. The keyword group consists of 1 or more keywords.

Specifically, the keyword acquisition unit 523 extracts the keyword group from the plaintext M by performing a morphological analysis, natural language processing, or the like on the plaintext M.

The keyword acquisition unit 523 may accept via the input/output interface 504, a keyword group inputted to the registration apparatus 500. Alternatively, the keyword acquisition unit 523 may accept the keyword group from an application program.

A keyword group acquired is called a registered keyword group W.

In Embodiment 1, it is assumed that the registered keyword group W is N of registered keywords.

N is an integer of 2 or more.

The registered keyword group W can be expressed as below:

$$W=(W\_1,\ldots,W\_N)$$

In step S146, the encrypted tag generation unit 524, using the tag key TK(i), the attribute information B, the tag random number tuple S', and the registered keyword group W, generates an encrypted tag group CT_W.

The encrypted tag group CT_W is a plurality of encrypted tags CT_{W_n} corresponding to a plurality of registered keywords W_n.

Note that n is an integer of 1 or more and N or less, and represents a number of a registered keyword.

The encrypted tag CT_{W_n} includes an attribute element CT_{j, 0, 0, W_n}, an attribute element CT_{j, 0, 1, W_n}, a wildcard element CT_{j, 1, 0, W_n}, and a wildcard element CT_{j, 1, 1, W_n}.

Further, the encrypted tag CT_{W_n} includes a determination element CT_{L+1, W_n}.

The encrypted tag generation unit 524 calculates the attribute element CT_{j, 0, 0, W_n} as below:

First, the encrypted tag generation unit 524 concatenates an attribute value B_j and a number j. A value represented by an obtained bit string is called a concatenated value (B_j).

Next, the encrypted tag generation unit 524 executes the function F_2 by taking as input the tag key TK(i) and the concatenated value (B_j). An obtained value is called a function value (B_j^).

Further, the encrypted tag generation unit 524 executes a function F_5 by taking as input the function value (B_j^) and a registered keyword W_n. An obtained value is called a function value (B_jW_n^^).

Further, the encrypted tag generation unit 524 executes a function F_6 by taking as input the function value (B_jW_n^^) and a random number s'_j. An obtained value is called a function value (B_jW_n^^^).

Then, the encrypted tag generation unit 524 calculates an exclusive-or of the function value (B_jW_n^^^) and a random number R'_j. An obtained value is the attribute element CT_{j, 0, 0, W_n}.

Each of the function F_5 and the function F_6 is a pseudorandom function, a hash function, or a function under a common key encryption scheme, as the function F_1, the function F_2, and the function F_3 are.

The encrypted tag generation unit 524 sets the random number s'_j to the attribute element CT_{j, 0, 1, W_n}.

The encrypted tag generation unit 524 calculates the wildcard element CT_{j, 1, 0, W_n} as below:

First, the encrypted tag generation unit 524 concatenates a wildcard "*" and a number j. A value represented by an obtained bit string is called a concatenated value (*_j).

Next, the encrypted tag generation unit 524 executes the function F_2 by taking as input the tag key TK(i) and the concatenated value (*_j). An obtained value is called a function value (*_j^).

Further, the encrypted tag generation unit 524 executes the function F_5 by taking as input the function value (*_j^) and the registered keyword W_n. An obtained value is called a function value (*_jW_n^^).

Further, the encrypted tag generation unit 524 executes the function F_6 by taking as input the function value (*_jW_n^^) and a random number S'_j. An obtained value is called a function value (*_jW_n^^^).

Then, the encrypted tag generation unit 524 calculates an exclusive-or of the function value (*_jW_n^^^) and the random number R'_j. An obtained value is the wildcard element CT_{j, 1, 0, W_n}.

The encrypted tag generation unit 524 regards the wildcard element CT_{j, 1, 1, W_n} as the random number S'_j.

The encrypted tag generation unit 524 calculates the determination element CT_{L+1, W_n} as below:

First, the encrypted tag generation unit 524 calculates an exclusive-or of L of random numbers of the tag random number tuple R'. An obtained value is called a computation value (R'+).

Then, the encrypted tag generation unit 524 executes a function F_7 by taking as input the computation value (R'+). An obtained value is the determination element CT_{L+1, W_n}.

An example of the function F_7 is a hash function such as SHA-1.

The encrypted tag group CT_W can be expressed as below:

$$CT\_W=\{CT\_\{W\_1\},\ldots,CT\_\{W\_N\}\}$$

$$\begin{aligned}CT\_\{W\_n\}=&((CT\_\{1,0,0,W\_n\},CT\_\{1,0,1,W\_n\},\\&CT\_\{1,1,0,W\_n\},CT\_\{1,1,1,\\&W\_n\}),\ldots,(CT\_\{L,0,0,W\_n\},CT\_\{L,0,1,Wn\},\\&CT\_\{L,1,0,W\_n\},CT\_\{L,1,1,W\_n\}),CT\_\{L+1,\\&W\_n\})\end{aligned}$$

where n is an integer of 1 or more and N or less.

$$CT\_\{j,0,0,W\_n\}=F\_6(F\_5(F\_2(TK(i),B\_j\|j),W\_n),\\s\_j)+R'\_j$$

$$CT\_\{j,0,1,W\_n\}=s'\_j$$

$$CT\_\{j,1,0,W\_n\}=F\_6(F\_5(F\_2(TK(i),*\|j),W\_n),\\S'\_j)+R'\_j$$

$$CT\_\{j,1,1,W\_n\}=S'\_j$$

where j is an integer of 1 or more and L or less.

$$R'+=R'\_1+\ldots+R'\_L$$

$$CT\_\{L+1,W\_n\}=F\_7(R'+)$$

If a registered keyword W_n is not specified, "W_n" is omitted.

For example, an encrypted tag CT_{W_n} is shortened to be an encrypted tag CT.

In step S147, the registration unit 530 registers a tuple of the encrypted data C and the encrypted tag group CT_W in the data management apparatus 700.

Specifically, the registration unit 530 transmits the tuple of the encrypted data C and the encrypted tag group CT_W to the data management apparatus 700. In the data management apparatus 700, the acceptance unit 710 receives the tuple of the encrypted data C and the encrypted tag group CT_W, and stores the received tuple in the storage unit 791. In other words, the acceptance unit 710 stores in the storage unit 791 the encrypted data C and the encrypted tag group CT_W being associated with each other. Then, the tuple of the encrypted data C and the encrypted tag group CT_W is saved in the storage unit 791.

Figure 17:
FIG. 17 is a diagram illustrating a registration database 792 according to Embodiment 1.

Based on FIG. 17, an explanation will be given on a registration database 792.

The data management apparatus 700 registers in the registration database 792 an identification number, a file name, encrypted data C, and encrypted tag group CT_W being associated with each other.

The registration database 792 is stored in the storage unit 791.

Based on FIG. 18, an explanation will be given on search operation (S150).

Search operation (S150) is a process to be executed by the search operation apparatus 600.

In step S151, the acceptance unit 610 accepts a user key UK(i).

For example, the acceptance unit 610 accepts a user key UK(i) from the user key apparatus 400, using the communication device 605. The acceptance unit 610 may accept via the input/output interface 604, a user key UK(i) inputted to the search operation apparatus 600.

Further, the acceptance unit 610 stores the user key UK(i) in the storage unit 691. Then, the user key UK(i) is saved in the storage unit 691.

If a user key UK(i) is already saved in the storage unit 691, step S151 is not necessary.

The user key UK(i) includes a generation number i, data attribute key data DAK(i), tag attribute key data TAK(i), and a search key SK(i).

In step S152, the acceptance unit 610 accepts a search keyword w.

Specifically, the acceptance unit 610 accepts via the input/output interface 604, a search keyword w inputted to the search operation apparatus 600. The acceptance unit 610 may accept the search keyword w from an application program.

In step S153, the search query generation unit 622, using the tag attribute key data TAK(i) and the search keyword w, generates a search query Q.

The search query Q includes a flag element Qb_j and an attribute keyword element Q_j.

The search query generation unit 622 calculates the flag element Qb_j as below:

The search query generation unit 622 extracts a flag value Tb_j from the tag attribute key data TAK(i). The flag element Qb_j is of the same value as the flag value Tb_j.

The search query generation unit 622 calculates the attribute keyword element Q_j as below:

First, the search query generation unit 622 extracts a tag attribute key TAK_j from the tag attribute key data TAK(i).

Then, the search query generation unit 622 executes the function F_5 by taking as input the tag attribute key TAK_j and the search keyword w. An obtained value is the attribute keyword element Q_j.

The search query Q can be expressed as below:

$$Q=((Qb\_1,Q\_1), \ldots ,(Qb\_L,Q\_L))$$

$$Qb\_j=Tb\_j$$

$$Q\_j=F\_5(TAK\_j,w)$$

In step S154, the request unit 630 transmits the search query Q to the data management apparatus 700, using the communication device 605.

In step S155, the request unit 630 receives a search result {C} from the data management apparatus 700, using the communication device 605.

The search result {C} is a set of encrypted data C having hit a search.

In step S156, the decryption unit 640 decrypts each of the encrypted data C into a plaintext M using the data attribute key data DAK(i).

Specifically, the decryption unit 640 decrypts the encrypted data C into the plaintext M as below:

First, the decryption unit 640 calculates a computation value U. The computation value U will be described later.

Next, the decryption unit 640 extracts a ciphertext C_{L+1} from the encrypted data C.

Then, the decryption unit 640 executes a decryption function F_4{−1} by taking as input the computation value U and the ciphertext C_{L+1}. An obtained value is the plaintext M.

The decryption function F_4{−1} is a decryption function of the function F_4.

The decryption unit 640 calculates the computation value U as below:

First, the decryption unit 640 extracts a flag value Db_j from the data attribute key data DAK(i).

Next, the decryption unit 640, based on the extracted flag value Db_j, selects a tuple (C_{j, 0, 0}, C_{j, 0, 1}) of attribute elements or a tuple (C_{j, 1, 0}, C_{j, 1, 1}) of wildcard elements from the encrypted data C. A selected tuple is called a tuple of selected elements (Cj0, Cj1).

Next, the decryption unit 640 extracts a data attribute key DAK_j from the data attribute key data DAK(i).

Next, the decryption unit 640 executes the function F_3 by taking as input the data attribute key DAK_j and a selected element Cj1. An obtained value is called a function value (Cj^).

Next, the decryption unit 640 calculates an exclusive-or of the function value (Cj^) and a selected element Cj0. An obtained value is called an extracted random number (Rj^).

Then, the decryption unit 640 calculates an exclusive-or of the extracted random numbers (Rj^) of all levels. An obtained value is the computation value U.

The plaintext M can be expressed as below:

$$M=F\_4\{-1\}(U,C\_\{L+1\})$$

$$U=(F\_3(DAK\_1,C\_\{1,Db\_1,1\})+C\_\{1,Db\_1,0\})+ \ldots +(F\_3(DAK\_L,C\_\{L,Db\_L,1\})+C\_\{L,Db\_L,0\})$$

For all levels j (1≤j≤L), if an attribute value B_j matches an attribute value A_j, or if the attribute value A_j is a wildcard "*", this is described as "B≥A".

If B≥A is satisfied, the computation value U can be expanded as below:

$$U=R\_1+ \ldots +R\_L$$

Accordingly, if B≥A is satisfied, a plaintext M can be obtained by calculating F_4{−1}(U, C_{L+1}).

If B≥A is not satisfied, neither of the following two equations is held for a level j:

$$F\_2(DK(i),B\_j\|j)=F\_2(DK(i),A\_j\|j)$$

$$F\_2(DK(i),*\|j)=F\_2(DK(i),A\_j\|j)$$

In this case, one of the random numbers R_j cannot be decrypted in calculating the computation value U, and thereby encrypted data C cannot be decrypted into the plaintext M.

If the search result {C} does not include encrypted data C, in other words, if there is no encrypted data C having hit a search, step S156 is not necessary.

A set of plaintexts M obtained in step S156 is called a search result {M}.

In step S157, the output unit 650 outputs a search result {M}.

Specifically, the output unit 650 displays the search result {M} on a display via the input/output interface 604.

If the search result {M} cannot be obtained, in other words, if there is no encrypted data C having hit the search, the output unit 650 displays a message informing that there is no plaintext M having hit the search.

Based on FIG. 19, an explanation will be given on data search (S160).

Data search (S160) is a process to be executed by the data management apparatus 700.

In step S161, the acceptance unit 710 receives a search query Q from the search operation apparatus 600, using the communication device 705.

In step S162, the collation unit 721 selects an encrypted tag CT that agrees with the search query Q by collating the search query Q with each encrypted tag CT.

Regarding the encrypted tag CT, a symbol {W_n} of a registered keyword is omitted.

Specifically, the collation unit 721 collates the search query Q with each encrypted tag CT as below:

First, the collation unit 721 calculates a computation value V_1. The computation value V_1 will be described later.

The collation unit 721 executes the function F_7 by taking as input the computation value V_1. An obtained value is called a collation value V_2.

Then, the collation unit 721 compares the collation value V_2 with a determination element CT_{L+1}.

If the collation value V_2 matches the determination element CT_{L+1}, the encrypted tag CT agrees with the search query Q.

The collation unit 721 calculates the computation value V_1 as below:

First, the collation unit 721 extracts a flag element Qb_j from the search query Q.

Next, the collation unit 721, based on the extracted flag element Qb_j, selects a tuple (CT_{j, 0, 0}, CT_{j, 0, 1}) of attribute elements or a triple (CT_{j, 1, 0}, CT_{j, 1, 1}) of wildcard elements from the encrypted tags CT. A selected tuple is called a tuple of selected elements (CTj0, CTj1).

Next, the collation unit 721 extracts an attribute keyword element Q_j from the search query Q.

Next, the collation unit 721 executes the function F_6 by taking as input the attribute keyword element Q_j and a selected element (CTj1). An obtained value is called a function value (CTj^).

Next, the collation unit 721 calculates an exclusive-or of the function value (CTj^) and a selected element (CTj0). An obtained value is called an extracted random number (R'j^).

Then, the collation unit 721 calculates an exclusive-or of the extracted random numbers (R'j^) of all levels. An obtained value is the computation value V_1.

The collation value V_2 can be expressed as below:

$$V\_1 = (F\_6(Q\_1, CT\_\{1, Qb\_1, 1\}) + CT\_\{1, Qb\_1, 0\}) + \ldots + (F\_6(Q\_L, CT\_\{L, Qb\_L, 1\}) + CT\_\{L, Qb\_L, 0\})$$

$$V\_2 = F\_7(V\_1)$$

If B≥A and W_n=w are satisfied, the computation value V_1 can be expanded as below:

$$V\_1 = R\_1 + \ldots + R'\_L$$

As a result, the following equation is held:

$$V\_2 = F\_7(V\_1) = F\_7(R'\_1 + \ldots + R'\_L) = CT\_\{L+1\}$$

If B≥A is satisfied but W_n=w' is not satisfied, or if W_n=w is satisfied but B≥A is not satisfied, one of random numbers R'_j cannot be decrypted correctly, and thereby R'_1 + . . . +R'_L cannot be calculated.

Therefore, usually, a probability that a collation value V_2 (=F_7(V_1)) and a determination element C_{L+1} (=F_7(R'_1 + . . . +R'_L)) matches is very low.

The encrypted tag CT selected in step S162, in other words, an encrypted tag CT that agrees with the search query Q is called a relevant encrypted tag CT.

In step S163, an extraction unit 722 extracts encrypted data C corresponding to the relevant encrypted tag CT. Extracted encrypted data C is called relevant encrypted data C.

In step S164, the output unit 730 transmits an encryption result {C} to the search operation apparatus 600, using the communication device 705.

The encryption result {C} is a set of the relevant encrypted data C.

Based on FIG. 20, an explanation will be given on data deletion (S170).

Data deletion (S170) is a process to be executed by the search operation apparatus 600 and the data management apparatus 700.

In step S171, the acceptance unit 610 of the search operation apparatus 600 accepts a name of file to be deleted.

Specifically, the acceptance unit 610 accepts via the input/output interface 604, a name of file to be deleted which is inputted to the search operation apparatus 600. The acceptance unit 610 may accept the name of file to be deleted, from an application program.

For example, a name of file to be deleted is acquired by the search operation (S150).

In step S172, the output unit 650 of the search operation apparatus 600 transmits the name of file to be deleted to the data management apparatus 700, using the communication device 605.

In step S173, the acceptance unit 710 of the data management apparatus 700 receives the name of file to be deleted from the search operation apparatus 600, using the communication device 705.

In step S174, the acceptance unit 710 of the data management apparatus 700 deletes from the storage unit 791, encrypted data C and an encrypted tag CT_W corresponding to the name of file to be deleted.

Effect of Embodiment 1

Multi-user searchable encryption can be realized using a common key encryption technology, without using a public key encryption technology. Since the public key encryption technology is not used, it is possible to perform data registration and search at a high speed.

In searchable encryption, if a search keyword is an exact match to a registered keyword, a search is hit.

Embodiment 2

Based on FIG. 21 to FIG. 24, as to a multi-user common key scheme that allows a partial match search, an explanation will be given mainly on differences from Embodiment 1.

Description of Configuration

Figure 21:
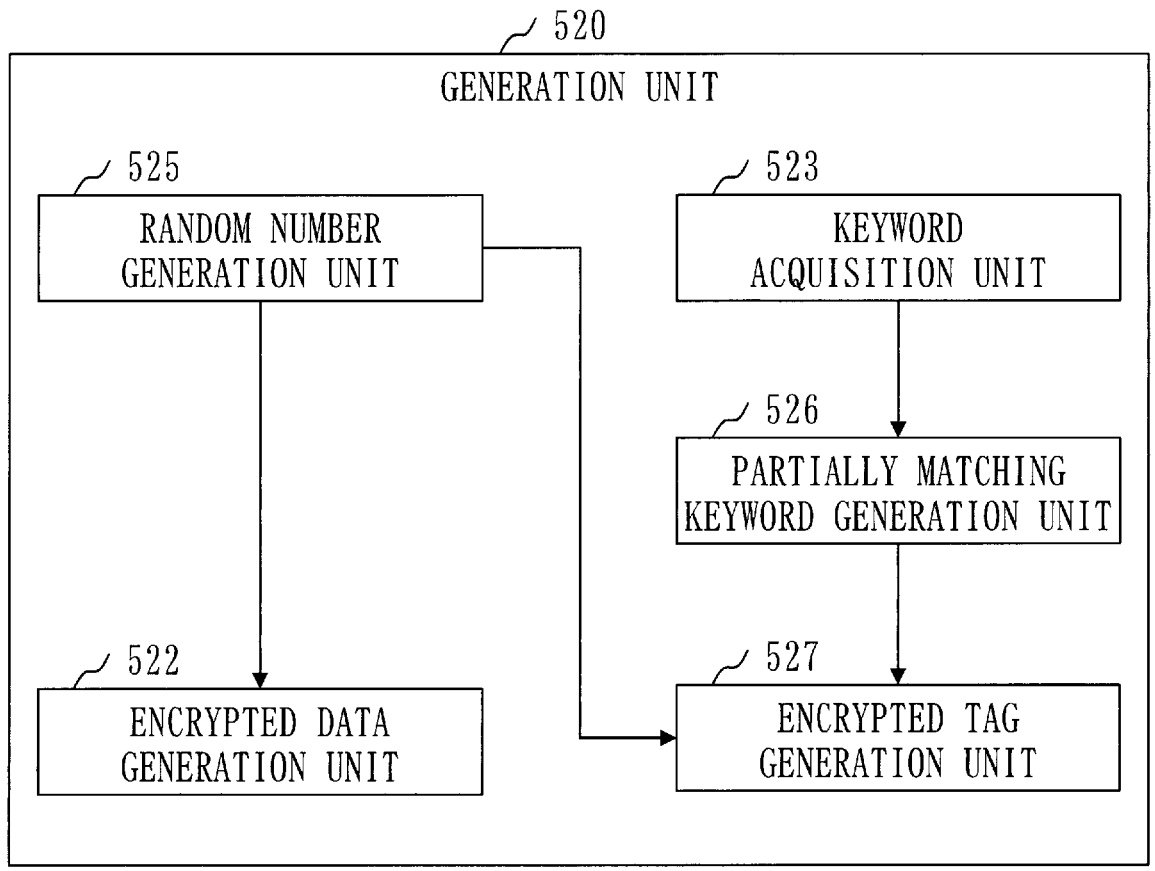
FIG. 21 is a configuration diagram of a generation unit 520 according to Embodiment 2.

Based on FIG. 21, an explanation will be given on a configuration of a generation unit 520.

The generation unit 520 includes a random number generation unit 525, an encrypted data generation unit 522, a keyword acquisition unit 523, a partially matching keyword generation unit 526, and an encrypted tag generation unit 527.

Figure 22:
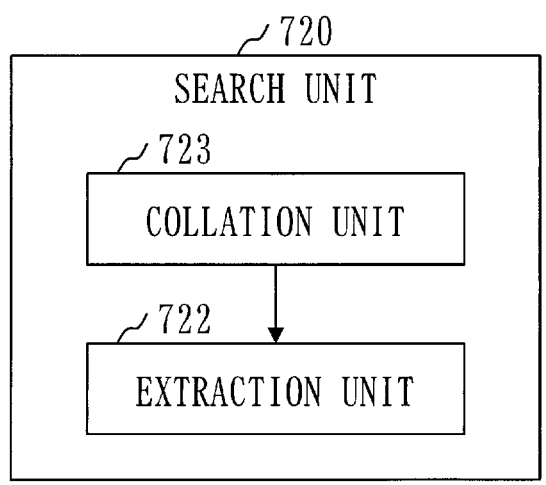
FIG. 22 is a configuration diagram of a search unit 720 according to Embodiment 2.

Based on FIG. 22, an explanation will be given on a configuration of a search unit 720.

The search unit 720 includes a collation unit 723 and an extraction unit 722.

Description of Operation

Figure 12:
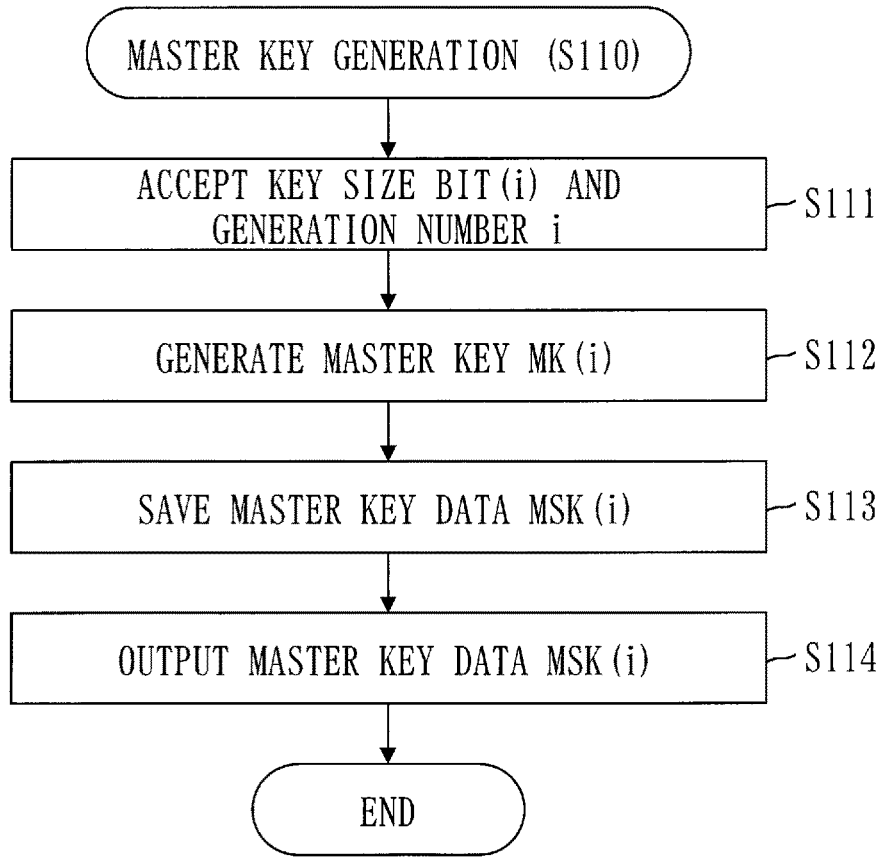
FIG. 12 is a flowchart of master key generation (S110) according to Embodiment 1.

Master key generation (S110) is as explained in Embodiment 1 (see FIG. 12).

In master key generation (S110), a master key apparatus 200 generates master key data MSK(i).

The master key data MSK(i) is a tuple of a master key MK(i) and a generation number i.

Figure 13:
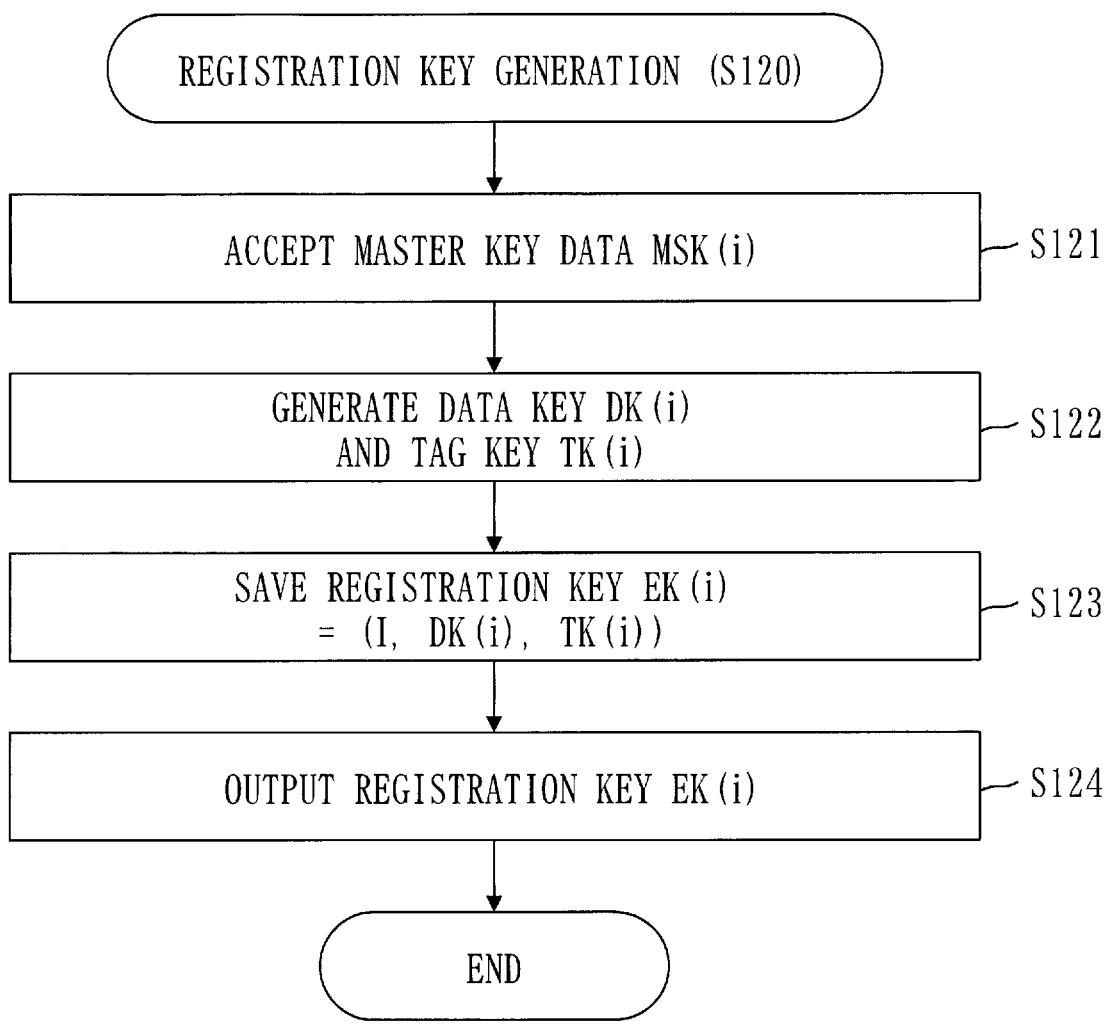
FIG. 13 is a flowchart of registration key generation (S120) according to Embodiment 1.

Registration key generation (S120) is as explained in Embodiment 1 (see FIG. 13).

In registration key generation (S120), a registration key apparatus 300 generates a registration key EK(i).

The registration key EK(i) is a tuple of a generation number i, a data key DK(i), and a tag key TK(i).

The data key DK(i) is generated with using a master key MK(i) included in the master key data MSK(i).

The tag key TK(i) is generated with using the master key MK(i) included in the master key data MSK(i)

User key generation (S130) is as explained in Embodiment 1 (see FIG. 14).

In user key generation (S130), a user key apparatus 400 generates a user key UK(i).

The user key UK(i) is a tuple of a generation number i, data attribute key data DAK(i), and tag attribute key data TAK(i).

The data attribute key data DAK(i) is generated with using attribute information A and the data key DK(i) which is included in the registration key EK(i).

The tag attribute key data TAK(i) is generated with using the attribute information A and the tag key TK(i) which is included in the registration key EK(i).

Based on FIG. 23, an explanation will be given on data registration (S240).

In data registration (S240), a registration apparatus 500 registers a tuple of a ciphertext C and an encrypted tag group CT_PMW in a data management apparatus 700.

In step S241, an acceptance unit 510 accepts a registration key EK(i).

Figure 16:
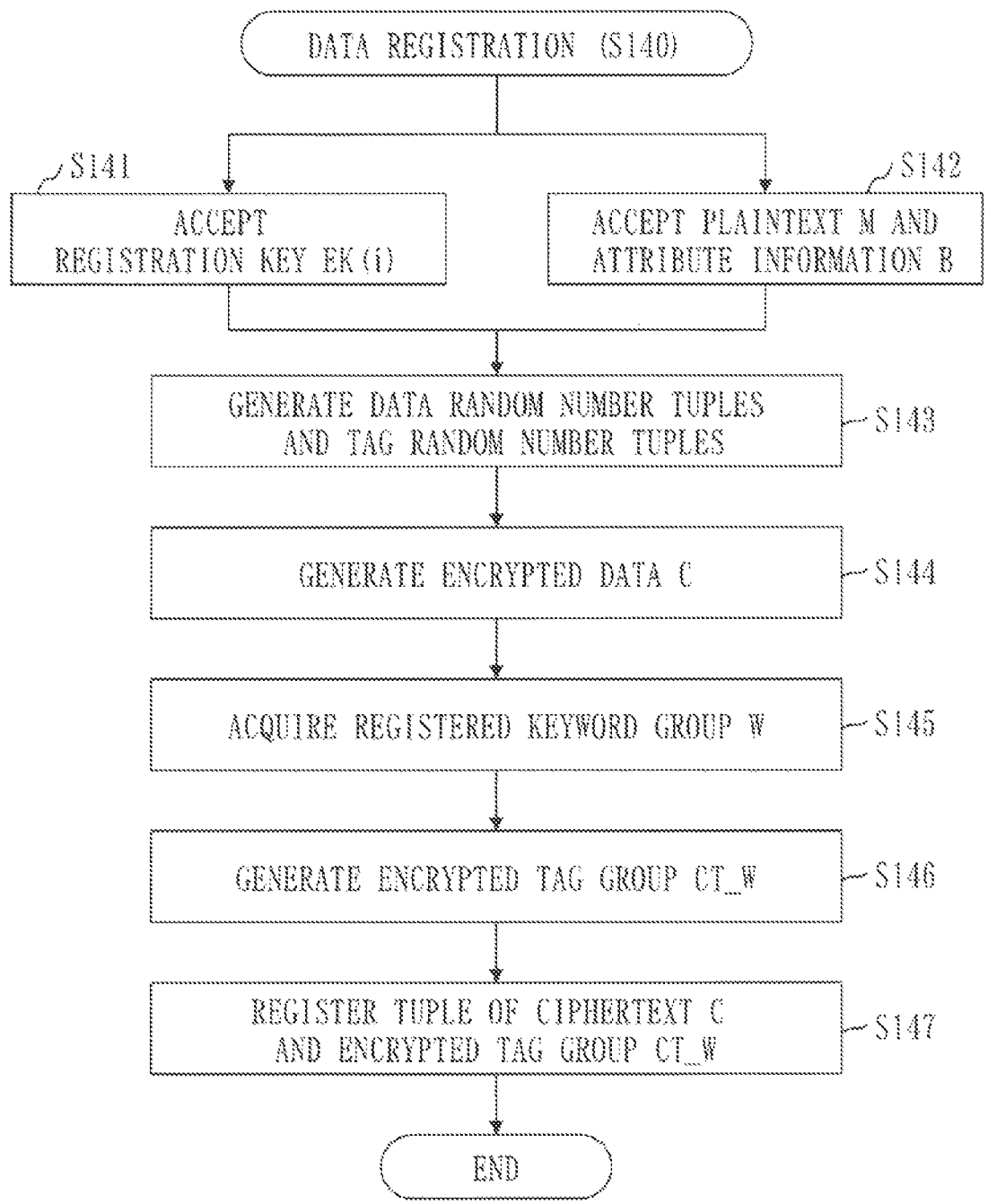
FIG. 16 is a flowchart of data registration (S140) according to Embodiment 1.

Step S241 is the same as step S141 in Embodiment 1 (see FIG. 16).

In step S242, the acceptance unit 510 accepts a plaintext M and attribute information B.

Step S242 is the same as step S142 in Embodiment 1 (see FIG. 16).

In step S243, the random number generation unit 525 generates three data random number tuples (R, s, S), one tag random number tuple R', and one tag random number S'.

The three data random number tuples (R, s, S) are as explained in Embodiment 1 (see step S143 in FIG. 16).

The tag random number tuple R' consists of random numbers whose quantity is the same as a level quantity L of an attribute. In other words, the tag random number tuple R' consists of L of random numbers. Each of the random numbers is generated uniform-randomly.

The tag random number tuple R' can be expressed as below:

$$R'=(R'\_1,\ldots,R'\_L)$$

The tag random number S' is one random number that is generated uniform-randomly.

In step S244, the encrypted data generation unit 522 generates encrypted data C using a data key DK(i), the plaintext M, the attribute information B, and the three data random number tuples (R, s, S).

Step S244 is the same as step S144 in Embodiment 1 (see FIG. 16).

In step S245, the keyword acquisition unit 523 acquires a registered keyword group W.

Step S245 is the same as step S145 in Embodiment 1 (see FIG. 16).

The registered keyword group W consists of N of registered keyword(s) W_n. Note that N is an integer of 1 or more, and n is an integer of 1 or more and N or less.

In step S246, the partially matching keyword generation unit 526, by generating a partially matching keyword group PM(W_n) for each of the registered keywords W_n, generates a partially matching keyword group PMW corresponding to the registered keyword group W.

The partially matching keyword group PMW can be expressed as below:

$$PMW=(PM(W\_1),\ldots,PM(W\_N))$$

The partially matching keyword group PM(W_n) consists of K of partially matching keyword(s) PM(W_n[k]). Note that K is an integer of 1 or more, and k is an integer of 1 or more and K or less.

The partially matching keyword group PM(W_n) can be expressed as below:

$$PM(W\_n)=(PM(W\_n)[1],\ldots,PM(W\_n)[K])$$

The partially matching keyword PM(W_n[k]) is a tuple of a partially matching keyword and a starting position number. The starting position number indicates a position of a character from which the partially matching keyword starts in a registered keyword.

The partially matching keyword PM(W_n)[k] can be expressed as below:

PM(W_n)[k]=(partially matching keyword,starting position number)

PM(W_n)[k][0]=partially matching keyword

PM(W_n)[k][1]=starting position number

The partially matching keyword generation unit 526 generates a partially matching keyword group PM(W_n) corresponding to a registered keyword W_n as below:

First, the partially matching keyword generation unit 526 divides the registered keyword W_n into characters. Each of divided characters (a partial keyword) is a first character in a partially matching keyword. For example, a registered keyword W_n "tokyoto" (Roman characters corresponding to three Chinese characters) is divided into "to", "kyo", and "to". Each of "to", "kyo", and "to" is the first character of a partially matching keyword.

Next, the partially matching keyword generation unit 526 lists all character strings starting with each of the divided characters in the registered keyword W_n. Each of the listed character strings forms a partially matching keyword. For example, "to", "tokyo", and "tokyoto" starting with the first character "to" in the registered keyword W_n "tokyoto" are listed. Note that "to" is a character string from the first character to the first character, "tokyo" is a character string from the first character to the second character, and "tokyoto" is a character string from the first character to the third character. Further, "kyo" and "kyoto" starting with the second character "kyo" in the registered keyword W_n "tokyoto" are listed. Note that "kyo" is a character string from the second character to the second character, and "kyoto" is a character string from the second character to the third character. Further, "to" starting with the third character "to" in the registered keyword W_n "tokyoto" is listed. Note that "to" is a character string from the third character to the third character. Each of "to", "tokyo", "tokyoto", "kyo", "kyoto", and "to" forms a partially matching keyword.

Then, the partially matching keyword generation unit 526 generates a partially matching keyword PW(W_n[k]) for each of the listed character strings.

For example, six partially matching keywords PW(W_n[k]) corresponding to the registered keyword W_n "tokyoto" are generated:

$PW(W\_n)[1]=(to,1)$ $PW(W\_n)[2]=(tokyo,1)$ $PW(W\_n)[3]=(tokyoto,1)$ $PW(W\_n)[4]=(kyo,2)$ $PW(W\_n)[5]=(kyoto,2)$ $PW(W\_n)[6]=(to,3)$ In general, if a quantity of partial keywords obtained by dividing a registered keyword W_n is "X", a length "K" of a partially matching keyword group PW(W_n), in other words, a quantity "K" of partially matching keywords PW(W_n[k]) can be expressed as below:

$K=X(X+1)/2$

The partially matching keyword generation unit 526 may divide the registered keyword W_n into phrases.

For example, the registered keyword W_n "tokyoto" is divided into "tokyo" and "to". In such case, "tokyo" and "tokyoto" starting with the first phrase "tokyo" in the registered keyword W_n "tokyoto" are listed. Note that "tokyo" is a character string from the first phrase to the first phrase, and "tokyoto" is a character string from the first phrase to the second phrase. Further, "to" starting with the second phrase "to" in the registered keyword W_n "tokyoto" is listed. Note that "to" is a character string from the second phrase to the second phrase. Then, three partially matching keywords PW(W_n[k]) are generated:

$PW(W\_n)[1]=(tokyo,1)$ $PW(W\_n)[2]=(tokyoto,1)$ $PW(W\_n)[3]=(to,3)$

Also, the partially matching keyword generation unit 526 may divide the registered keyword W_n into units other than characters or phrases.

The partially matching keyword generation unit 526 may change a dividing unit depending on a registered keyword W_n.

Also, depending on a registered keyword Wn, the partially matching keyword generation unit 526 does not need to perform division. If a registered keyword W_n is not divided, the registered keyword W_n will subject to an exact match search, but not to a partial match search.

In step S247, the encrypted tag generation unit 527 generates an encrypted tag group CT_PMW using a tag key TK(i), the attribute information B, the tag random number tuple R', the tag random number S', and the partially matching keyword group PMW.

The encrypted tag group CT_PMW consists of a plurality of encrypted tags CT_{PM(W_n)} corresponding to a plurality of registered keywords W_n. Note that n is an integer of 1 or more and N or less, and represents a number of a registered keyword W_n.

The encrypted tag CT_{PM(W_n)} includes a random number element CT_{0, PM(W_n)}.

The encrypted tag generation unit 527 sets the tag random number S' to the random number element CT_{0, PM(W_n)}.

The random number element CT_{0, PM(W_n)} can be expressed as below:

$CT\_\{0,PM(W\_n)\}=S'$

The encrypted tag CT_{PM(W_n)} further includes an attribute element CT{j, 0, PM(W_n)}. Note that j is an integer of 1 or more and L or less, and represents a number of an attribute value B_j.

The attribute element CT_{j, 0, PM(W_n)} can be expressed as below:

$CT\_\{j,0,PM(W\_n)\}=(CT\{j,0,PM(W\_n)[1]\},\ldots,CT\_\{j,0,PM(W\_n)[K]\})$

The encrypted tag generation unit 527 calculates the attribute element CT_{j, 0, PM(W_n)[k]} as below. Note that k is an integer of 1 or more and K or less:

First, the encrypted tag generation unit 527 concatenates the attribute value B_j and a number j. A value represented by an obtained bit string is called a concatenated value (B_j).

Next, the encrypted tag generation unit 527 executes the function F_2 by taking as input a value of the tag key TK(i) and the concatenated value (B_j). An obtained value is called a function value (B_j^).

Next, the encrypted tag generation unit 527 executes the function F_5 by taking as input the function value (B_j^) and a partially matching keyword PM(W_n)[k][0]. An obtained value is called a function value (B_jPM(W_n)[k]^^).

Next, the encrypted tag generation unit 527 executes the function F_6 by taking as input the function value (B_jPM(W_n)[k]^^), a starting position number PM(W_n)[k][0], and the random number element CT_{0, PM(W_n)}. An obtained value is called a function value (B_jPM(W_n)[k]^^^).

Then, the encrypted tag generation unit 527 calculates an exclusive-or of the function value (B_jPM(W_n)[k]^^^) and a tag random number R'_j. An obtained value is the attribute element CT_{j, 0, PM(W_n)[k]}.

Each of the function F_5 and the function F_6 is a pseudo random function, a hash function, or a function under a common key encryption scheme, as the function F_1, the function F_2, and the function F_3 are.

The encrypted tag CT_{PM(W_n)} further includes a wildcard element CT_{j, 1, PM(W_n)}. Note that j is an integer of 1 or more and L or less, and represents a number of the attribute value B_j.

The attribute element CT_{j, 0, PM(W_n)} can be expressed as below:

$$CT\_\{j,0,PM(W\_n)\}=(CT\_\{j,0,PM(W\_n)[1]\},\ldots,CT\_\{j,0,PM(W\_n)[K]\})$$

The wildcard element CT_{j, 1, PM(W_n)} can be expressed as below:

$$CT\_\{j,1,PM(W\_n)\}=(CT\_\{j,1,PM(W\_n)[l]\},\ldots,CT\_\{,1,PM(W\_n)[K]\})$$

The encrypted tag generation unit 527 calculates a wildcard element CT_{j, 1, PM(W_n)[k]} as below. Note that k is an integer of 1 or more and K or less.

First, the encrypted tag generation unit 527 concatenates a wildcard "*" and a number j. A value represented by an obtained bit string is called a concatenated value (*_j).

Next, the encrypted tag generation unit 527 executes the function. F_2 by taking as input the value of the tag key TK(i) and the concatenated value (*_j). An Obtained value is called a function value (*_j^)

Next, the encrypted tag generation unit 527 executes the function F_5 by taking as input the function value (*_j^) and the partially matching keyword PM(W_n)[k][0]. An obtained value is called a function value (*_jPM(W_n)[k]^^).

Next, the encrypted tag generation unit 527 executes the function F_6 by taking as input the function value (*_jPM(W_n)[k]^^), a starting position number PM(W_n)[k][1], and the random number element CT_{0, PM(W_n)}. An obtained value is called a function value (*_jPM(W_n)[k]^^^).

Then, the encrypted tag generation unit 527 calculates an exclusive-or of the function value (*_jPM(W_n)[k]^^^) and a random number R'_j. An Obtained value is the wildcard element CT_{j, 1, PM(W_n)[k]}.

The encrypted tag CT_{PM(W_n)} further includes a determination element CT_{L+1. PM(W_n)}.

The encrypted tag generation unit 527 calculates the determination element CT_{L+1, PM(W_n)} as below:

First, the encrypted tag generation unit 527 calculates an exclusive-or of L of random numbers of the tag random number tuple R'. An obtained value is called a computation value (R'+).

Then, the encrypted tag generation unit 527 executes the function F_7 by taking as input the computation value (R'+). An obtained value is the determination element CT_{L+1, PM(W_n)}.

An example of the function F_7 is a hash function such as SHA-1.

The encrypted tag group CT_PMW can be expressed as below:

$$CT\_PMW=\{CT\_\{PM(W\_1)\},\ldots,CT\_\{PM(W\_N)\}\}$$

$$CT\_\{PM(W\_n)\}=(CT\_\{0,PM(W\_n)\},CT\_\{1,0,PM(W\_n)[1]\},\ldots,CT\_\{L,0,PM(W\_n)[1]\},\ldots,CT\_\{1,0,PM(W\_n)[K]\},\ldots,CT\_\{L,0,PM(W\_n)[K]\},CT\_\{1,1,PM(W\_n)[1]\},\ldots,CT\_\{L,1,PM(W\_n)[1]\},\ldots,CT\_\{1,1,PM(W\_n)[K]\},\ldots,CT\_\{L,1,PM(W\_n)[K]\},CT\_\{L+1,PM(W\_n)\}$$

where n is an integer of 1 or more and N or less.

$$CT\_\{0,PM(W\_n)\}=S'$$

$$CT\_\{j,0,PM(W\_n)[k]\}=F\_6(F\_5(F\_2(TK(i),B\_j\|j),PM(W\_n)[k][0]),PM(W\_n)[k][1],S')+R'\_j$$

$$CT\_\{j,1,PM(W\_n)[k]\}=F\_6(F\_5(F\_2(TK(i),*1),PM(W\_n)[k][0]),PM(W\_n)[k][1]),S')+R'\_j$$

where j is an integer of 1 or more and L or less, and k is an integer of 1 or more and K or less.

$$R'+=R'\_1+\ldots+R'\_L$$

$$CT\_\{(L+1PM(W\_n)\}=F\_7(R'+)$$

If a registered keyword W_n is not specified, "PM(W_n)" is omitted. In such case, an encrypted tag CT_{PM(W_n)} is described as an encrypted tag CT.

The encrypted tag CT can be expressed as below. Note that n is an integer of 1 or more and N or less:

$$CT=(CT\_0,CT\{1,0,[1]\},\ldots,CT\_\{L,0,[1]\},\ldots,CT\_\{1,0,[K]\},\ldots,CT\_\{L,0,[K]\},CT\_\{1,1,[1]\},\ldots,CT\_\{L,1,[1]\},\ldots,CT\_\{1,1,[K]\},\ldots,CT\_\{L,1,[K]\},CT\_\{L+1\})$$

In step S248, a registration unit 530 registers a tuple of encrypted data C and the encrypted tag group CT_PMW in the data management apparatus 700.

Specifically, the registration unit 530 transmits the tuple of the encrypted data C and the encrypted tag group CT_PMW to the data management apparatus 700. In the data management apparatus 700, the acceptance unit 710 receives the tuple of the encrypted data C and the encrypted tag group CT_PMW, and stores the received tuple in the storage unit 791. In other words, the acceptance unit 710 stores in the storage unit 791 the encrypted data C and the encrypted tag group CT_PMW being associated with each other. Then, the tuple of the encrypted data C and the encrypted tag group CT_PMW is saved in the storage unit 791.

In data registration (S240), if a registered keyword group W includes N of registered keywords in the same manner as that of Embodiment 1, the registration apparatus 500 operates as below:

In step S243, the random number generation unit 525 generates N of tag random number tuples R' and N of tag random numbers S'.

In step S247, the encrypted tag generation unit 527, using the tag random number tuple R' and the tag random number S' which are different for each registered keyword W_n, generates an encrypted tag CT_{PM(W_n)} corresponding to a registered keyword W_n.

Figure 18:
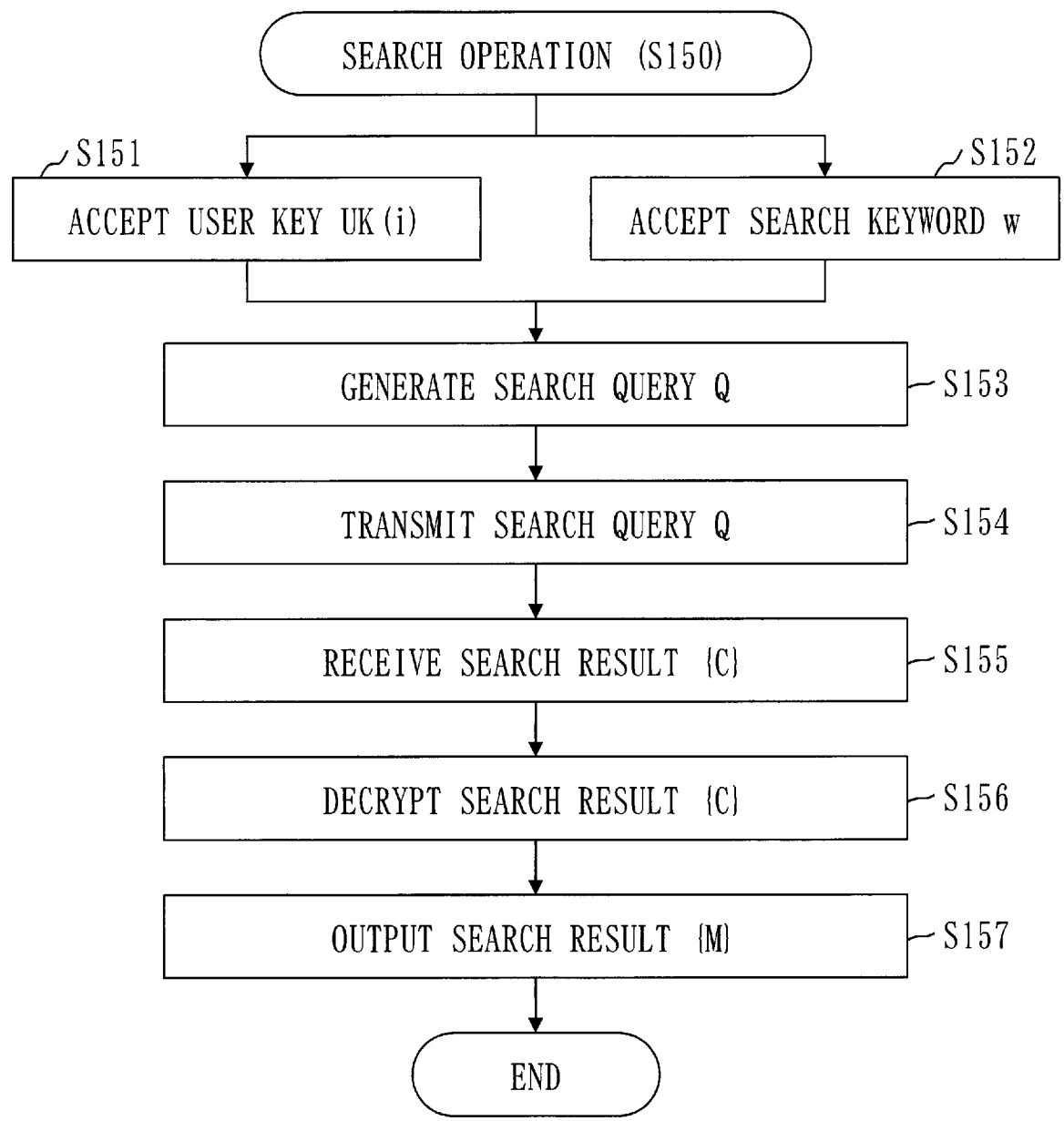
FIG. 18 is a flowchart of search operation (S150) according to Embodiment 1.

Search operation (S150) is as explained in Embodiment 1 (see FIG. 18).

In search operation (S150), a search operation apparatus 600 accepts a user key UK(i) and a search keyword W, and outputs a search result {M}.

Figure 24:
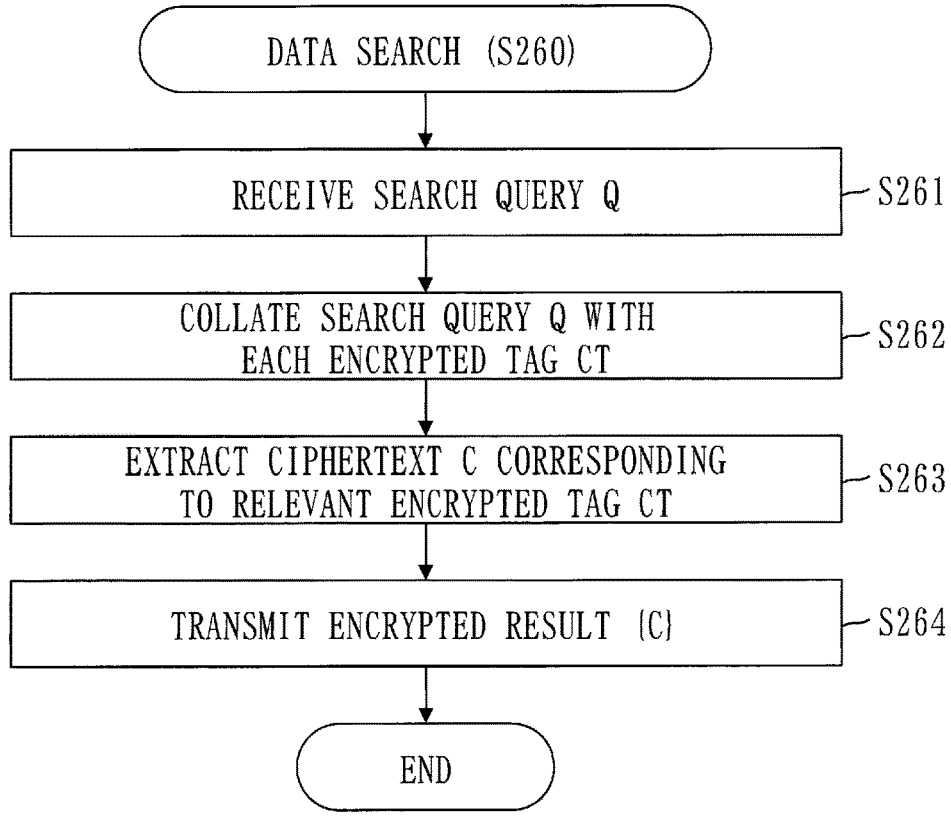
FIG. 24 is a flowchart of data search (S260) according to Embodiment 2.

Based on FIG. 24, an explanation will be given on data search (S260).

In data search (S260), the data management apparatus 700 receives a search query Q, and transmits an encryption result {C}.

In step S261, the acceptance unit 710 receives a search query Q from the search operation apparatus 600.

Figure 19:
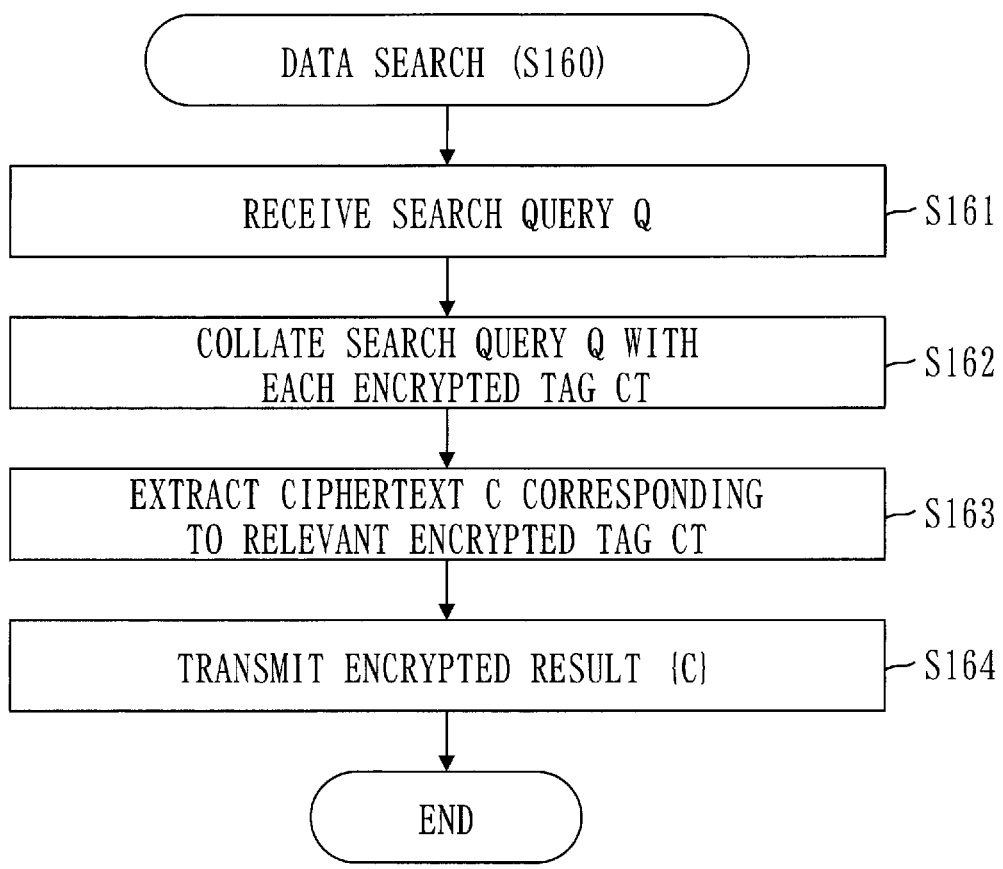
FIG. 19 is a flowchart of data search (S160) according to Embodiment 1.

Step S261 is the same as step S161 in Embodiment 1 (see FIG. 19).

In step S262, the collation unit 723 selects an encrypted tag CT that agrees with the search query Q by collating the search query Q with each encrypted tag CT.

Specifically, the collation unit 723 collates the search query Q with each encrypted tag CT as below. Regarding the encrypted tag CT, a symbol {PM(W_n)} of a registered keyword is omitted:

First, the collation unit 723, based on a quantity of elements of the encrypted tag CT, calculates a quantity K of partially matching keywords, and based on the quantity K of the partially matching keywords, calculates a quantity X of characters of a keyword used for registration. If the keyword used for the registration is "tokyoto", the quantity of elements of the encrypted tag CT is "14". If the quantity of elements of the encrypted tag CT is "14", the quantity K of the partially matching keyword is "6". By calculating K=X (X+1)/2, the collation unit 723 calculates the quantity X of characters of "tokyoto" used for the registration as "3".

Next, the collation unit 723 calculates a computation value V_1[x, k]. Note that x is an integer of 1 or more and X or less, and k is an integer of 1 or more and K or less. The computation value V_1[x, k] will be described later.

Next, the collation unit 723 executes the function F_7 by taking as input the computation value V_1[x, k]. An obtained value is called a collation value V_2[x, k].

Then, the collation unit 723 compares the collation value V_2[x, k] with a determination element CT_{L+1} of the encrypted tag CT.

If the collation value V_2[x, k] matches the determination element CT_{L+1}, the encrypted tag CT agrees with the search query Q.

The collation unit 723 calculates the computation value V_1' [x, k] as below:

First, the collation unit 723 extracts a flag element Qb_j from the search query Q. Note that j is an integer of 1 or more and L or less.

Next, the collation unit 723, based on the extracted flag element Qb_j, selects a tuple CTj0 of attribute elements or a tuple CTj1 of wildcard elements from the encrypted tag CT. The tuple CTj0 of attribute elements and the tuple CTj1 of wildcard elements can be expressed as below:

$$CTj0=(CT\_\{j,0,[1]\}, \ldots ,CT\_\{j,0,[K]\})$$

$$CTj1=(CT\_\{j,1,[1]\},CT\_\{j,1,[K]\})$$

The collation unit 723 selects the tuple CTj0 of attribute elements or the tuple CTj1 of wildcard elements as below:

If the flag element Qb_j is "0", the collation unit 723 selects a tuple CTj0 of attribute elements. If the flag element Qb_j is "1", the collation unit 723 selects a tuple CTj1 of wildcard elements.

A selected tuple is called a selected element CTj.

Next, the collation unit 723 extracts an attribute keyword element Q_j from the search query Q.

Next, the collation unit 723 executes the function F_6 by taking as input the attribute keyword element Q_j, a value x, and a random number element CT_0. An obtained value is called a function value (CTj[x]^). Note that x is an integer of 1 or more and X or less.

Next, the collation unit 723 calculates an exclusive-or of each function value (CTj[x]^) and the selected element (CTj[k]). An Obtained value is called an extracted random number (R'j[x, k]^).

Then, the collation unit 723 calculates an exclusive-or of the extracted random numbers (R'j[x, k]^) of all levels. An obtained value is the computation value V_1[x, k].

The computation value V_1[x, k] and the collation value V_2[x, k] can be expressed as below:

$$V\_1[x,k]=(F\_6(Q\_1,x,CT\_\{0\})+CT\_\{1,Qb\_1,[k]\})+ \ldots +(F\_6(Q\_L,x,CT\_\{0\})+CT\_\{L,Qb\_L,[k]\})$$

$$V\_2[x,k]=F\_7(V\_1[x,k])$$

If B≥A is satisfied, and also a search keyword w is included as a partially matching keyword in a registered keyword W_n, there exists a tuple (x, k) of integers that satisfies the following computation value V_1[x, k]:

$$V\_1[x,k]=R\_1+ \ldots +R'\_L$$

As a result, the following equation is held for the tuple (x, k) of integers:

$$V\_2[x,k]=F\_7(V\_1[x,k])=F\_7(R'\_1+ \ldots + R'\_L)=CT\_\{L+1\}$$

If a keyword used for registration is "tokyoto" and a keyword used for a search is "tokyo", an integer x is "1", and an integer k is "2".

If the keyword used for the registration is "tokyoto" and the keyword used for the search is "to", the integer x is "3", and the integer k is "6".

If B≥A is satisfied, and the search keyword w is not included as the partially matching keyword in the registered keyword W_n, a random number R'_j is not decrypted correctly, and thereby the computation value V_1[x, k] cannot be obtained.

If B≥A is not satisfied, and the search keyword w is included as the partially matching keyword in the registered keyword W_n, the random number R'_j is not decrypted correctly, and thereby the computation value V_1[x, k] cannot be obtained.

Therefore, with any tuple (x, k) of integers, a probability that a collation value V_2[x, k] (=F_7(V_1[x, k])) matches a determination element C_{L+1} (=F_7(R'_1+ ... +R'_L)) is very low.

An encrypted tag CT selected in step S262, in other words, an encrypted tag CT that agrees with a search query Q is called a relevant encrypted tag CT.

In step S263, the extraction unit 722 extracts encrypted data C corresponding to the relevant encrypted tag CT. The extracted encrypted data C is called relevant encrypted data C.

Step S263 is the same as step S163 in Embodiment 1 (see FIG. 19).

In step S264, an output unit 730 transmits an encryption result {C} to the search operation apparatus 600. The encryption result {C} is a set of the relevant encrypted data C.

Step S264 is the same as step S164 in Embodiment 1 (see FIG. 19).

Figure 20:
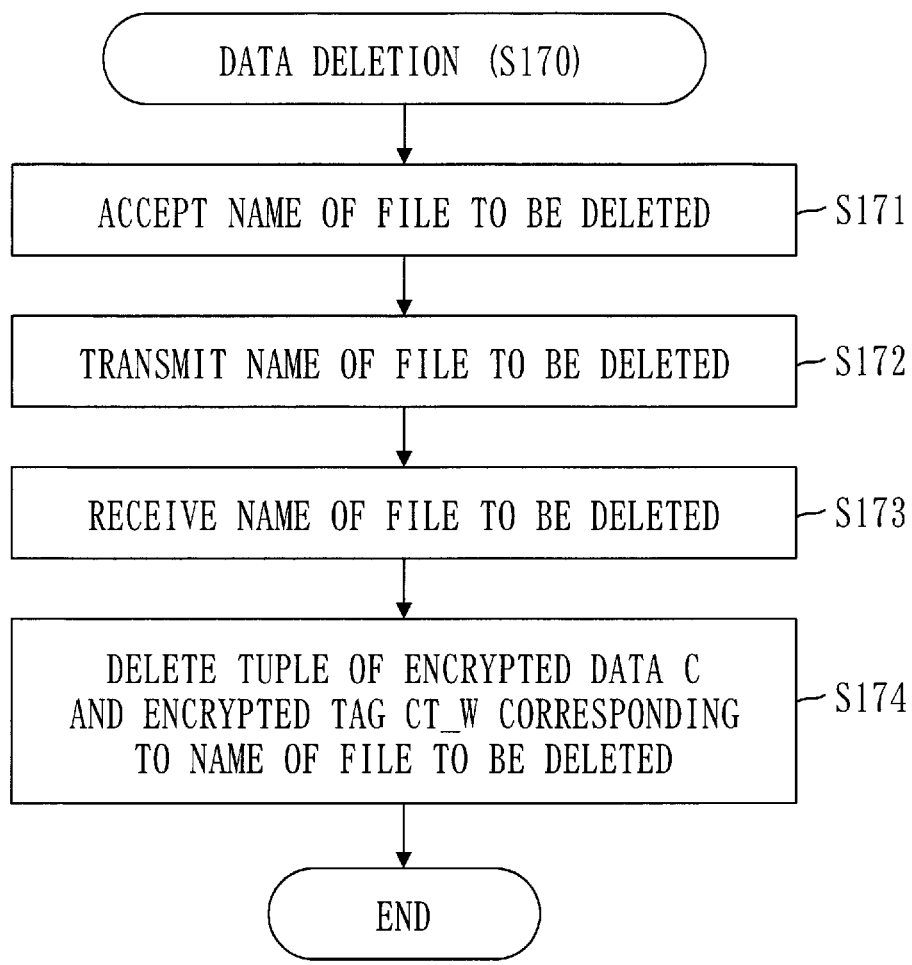
FIG. 20 is a flowchart of data deletion (S170) according to Embodiment 1.

Data deletion (S170) is as explained in Embodiment 1 (see FIG. 20).

In data deletion (S170), the data management apparatus 700 deletes a tuple of encrypted data C and an encrypted tag CT_W corresponding to a name of file to be deleted.

Effect of Embodiment 2

According to Embodiment 2, if a search keyword is included in a registered keyword, in other words, if the search keyword is a partial match to the registered keyword, a search is hit.

Embodiment 3

Based on FIG. 25 to FIG. 30, as to a multi-user common key scheme that allows a range search, an explanation will be given mainly on differences from Embodiment 1 and Embodiment 2.

A range search is a search to find a registered numerical value included in a search range.

For example, if the search range is [78, 111], range search is performed to find a registered numerical value X that satisfies 78≤X≤111.

Description of Configuration

Figure 25:
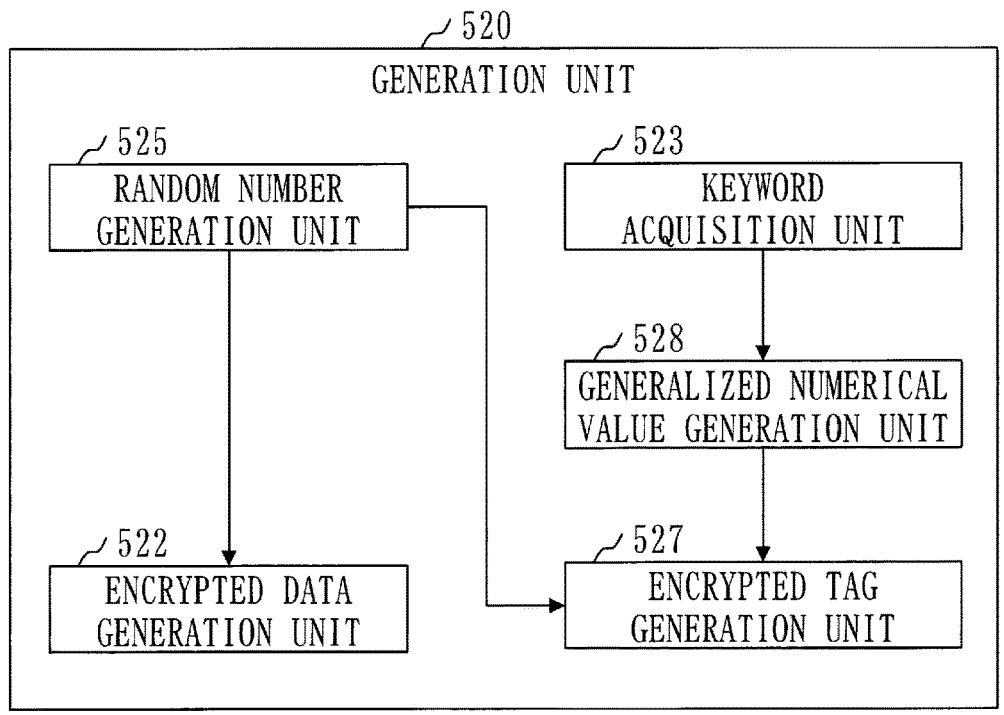
FIG. 25 is a configuration diagram of a generation unit 520 according to Embodiment 3.

Based on FIG. 25, an explanation will be given on a configuration of a generation unit 520.

The generation unit 520 is provided with a random number generation unit 525, an encrypted data generation unit 522, a keyword acquisition unit 523, a generalized numerical value generation unit 528, and an encrypted tag generation unit 527.

Figure 26:
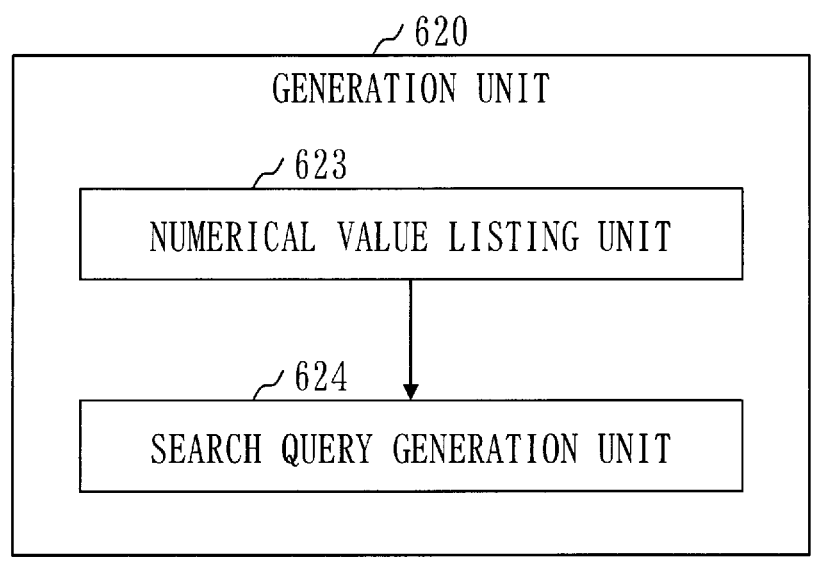
FIG. 26 is a configuration diagram of a generation unit 620 according to Embodiment 3.

Based on FIG. 26, an explanation will be given on a configuration of a generation unit 620.

The generation unit 620 is provided with a numerical value listing unit 623 and a search query generation unit 624.

Figure 27:
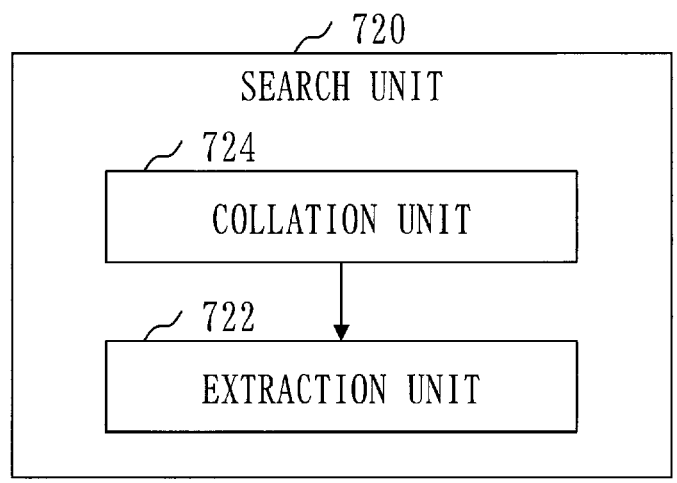
FIG. 27 is a configuration diagram of a search unit 720 according to Embodiment 3.

Based on FIG. 27, an explanation will be given on a configuration of a search unit 720.

The search unit 720 is provided with a collation unit 724 and an extraction unit 722.

Description of Operation

Master key generation (S110) is as explained in Embodiment 1 (see FIG. 12).

In master key generation (S110), a master key apparatus 200 generates master key data MSK(i).

The master key data MSK(i) is a tuple of a master key MK(i) and a generation number i.

Registration key generation (S120) is as explained in Embodiment 1 (see FIG. 13).

In registration key generation (S120), a registration key apparatus 300 generates a registration key EK(i).

The registration key EK(i) is a tuple of a generation number i, a data key DK(i), and a tag key TK(i).

The data key DK(i) is generated with using a master key MK(i) included in master key data MSK(i).

The tag key TK(i) is generated with using the master key MK(i) included in the master key data MSK(i).

User key generation (S130) is as explained in Embodiment 1 (see FIG. 14).

In user key generation (S130), a user key apparatus 400 generates a user key UK(i).

The user key UK(i) is a tuple of a generation number i, data attribute key data DAK(i), and tag attribute key data TAK(i).

The data attribute key data DAK(i) is generated with using attribute information A and a data key DK(i) which is included in a registration key EK(i).

The tag attribute key data TAK(i) is generated with using the attribute information A and a tag key TK(i) which is included in the registration key EK(i).

Figure 28:
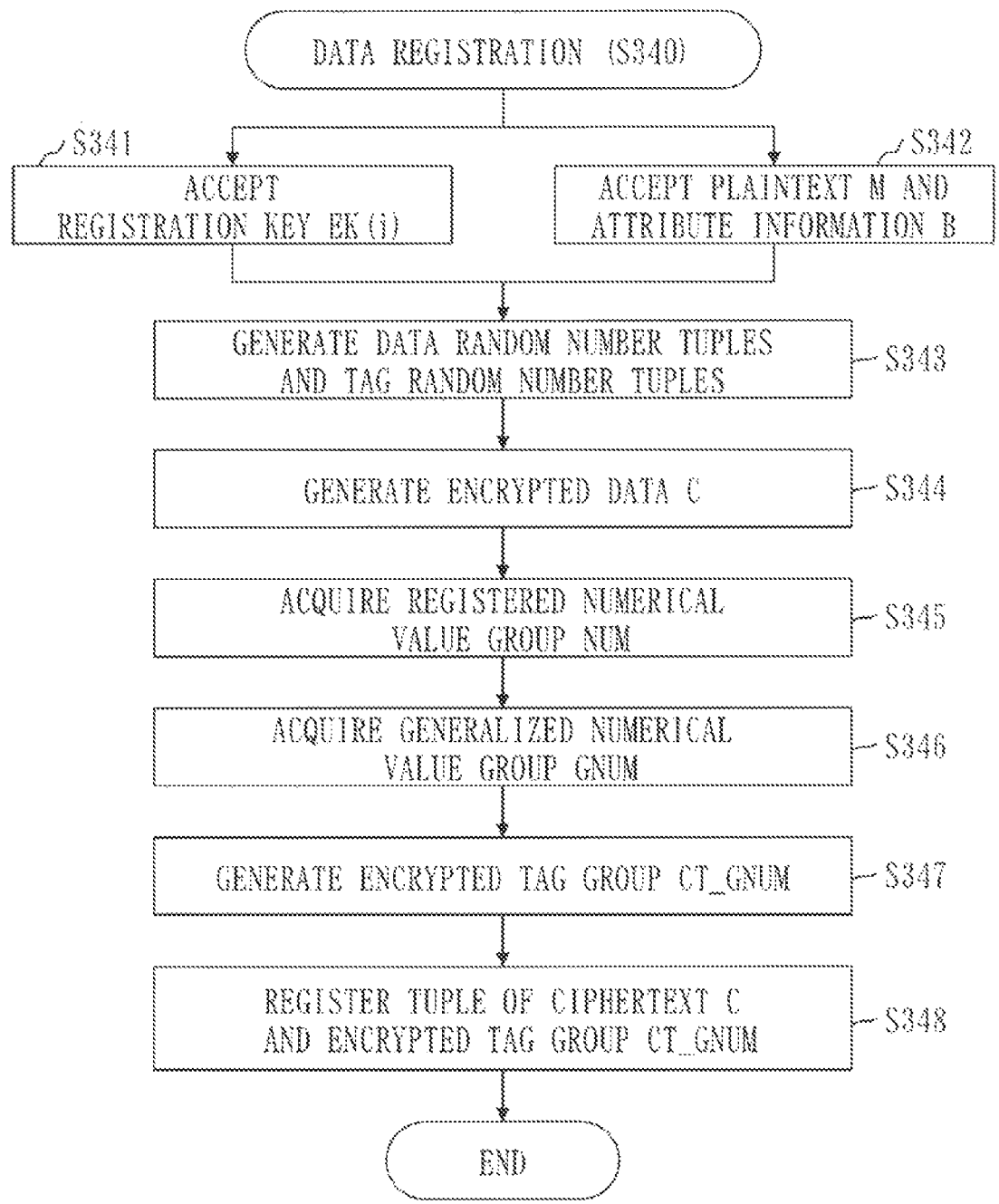
FIG. 28 is a flowchart of data registration (S340) according to Embodiment 3.

Based on FIG. 28, an explanation will be given on data registration (S340).

In data registration (S340), a registration apparatus 500 registers a tuple of a ciphertext C and an encrypted tag group CT_GNUM in a data management apparatus 700.

In step S341, an acceptance unit 510 accepts a registration key EK(i).

Step S341 is the same as step S141 in Embodiment 1 (see FIG. 16).

In step S342, the acceptance unit 510 accepts a plaintext M and attribute information B.

Step S342 is the same as step S142 in Embodiment 1 (see FIG. 16).

In step S343, the random number generation unit 525 generates three data random number tuples (R, s, S), one tag random number tuple R', and one tag random number S'.

Figure 23:
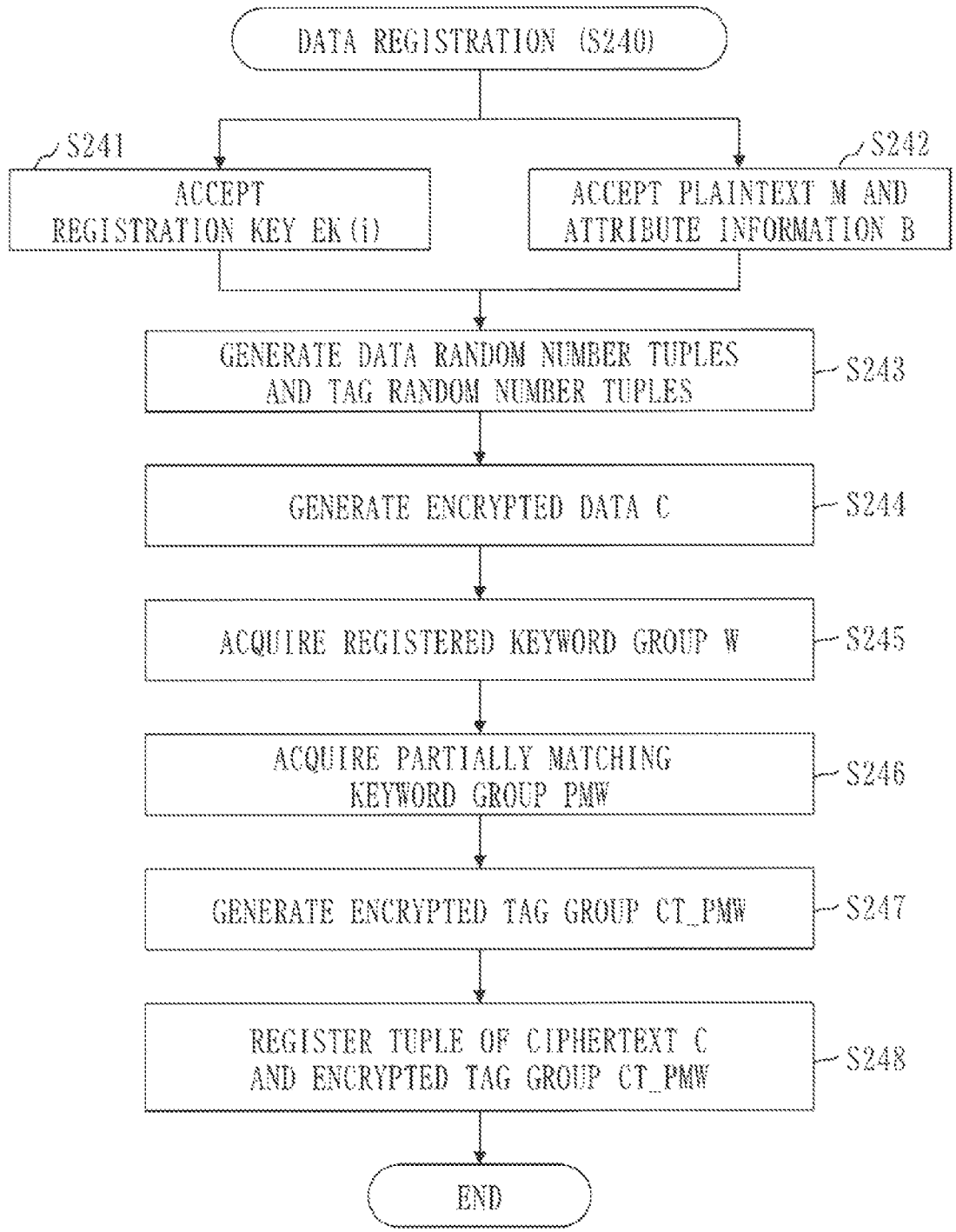
FIG. 23 is a flowchart of data registration (S240) according to Embodiment 2.

Step S343 is the same as step S243 in Embodiment 2 (see FIG. 23).

The tag random number tuple R' consists of random numbers whose quantity is the same as a level quantity L of an attribute. In other words, the tag random number tuple R' consists of L of random numbers. Each of the random numbers is generated uniform-randomly.

The tag random number tuple R' can be expressed as below:

$$R'=(R'\_1, \ldots, R'\_L)$$

The tag random number S' is one random number that is generated uniform-randomly.

In step S344, the encrypted data generation unit 522 generates encrypted data C using a data key DK(i), the plaintext M, the attribute information B, and the three data random number tuples (R, s, S).

Step S344 is the same as step S144 in Embodiment 1 (see FIG. 16).

In step S345, the keyword acquisition unit 523 acquires a registered numerical value group NUM.

The registered numerical value group NUM consists of 1 or more registered numerical values. The registered numerical value group NUM is equivalent to a registered keyword group W. The registered numerical value is equivalent to a registered keyword.

The registered numerical value group NUM can be expressed as below. Note that N is an integer of 1 or more:

$$NUM=(W\_1, \ldots, W\_N)$$

In step S346, the generalized numerical value generation unit 528 generates a generalized numerical value group GNUM corresponding to the registered numerical value group NUM.

The generalized numerical value group GNUM can be expressed as below:

$$GNUM=(GNUM(W\_1), \ldots, GNUM(W\_N))$$

The generalized numerical value generation unit 528, by regarding a registered numerical value W_n as a character string and listing all keywords that forward-match the registered numerical value W_n, generates the generalized numerical value group GNUM. Note that n is an integer of 1 or more and N or less.

If a registered numerical value W_n is "87", the generalized numerical value generation unit 528 lists "87" and "8?". Note that "?" represents a wildcard of one character, and here means representing all numbers from 0 to 9.

If a registered numerical value W_n is "999", the generalized numerical value generation unit 528 lists "999", "99?", and "9??".

A generalized numerical value GNUM(W_n) can be expressed as below. Note that K is an integer of 1 or more:

$$GNUM(W\_n)=(GNUM(W\_n)[1], \ldots, GNUM(W\_n)[K])$$

For example, if a registered numerical value W_n is "87", a quantity K of elements of the generalized numerical value GNUM(W_n) is "2".

$$GNUM(W\_n)[1]=87$$

$$GNUM(W\_n)[2]=8?$$

A length of the generalized numerical value GNUM(W_n), that is, the quantity K of elements of the generalized numerical value GNUM(W_n) matches a quantity of digits of the registered numerical value W_n.

If the quantity of digits of the registered numerical value W_n is "2", the quantity K of elements of the generalized numerical value GNUM(W_n) is "2".

If the quantity of digits of the registered numerical value W_n is "3", the quantity K of elements of the generalized numerical value GNUM(W_n) is "3".

In step S347, the encrypted tag generation unit 527, using a tag key TK(i), the attribute information B, the tag random number tuple R', the tag random number S', and the generalized numerical value group GNUM, generates an encrypted tag group CT_GNUM.

The encrypted tag group CT_GNUM is a plurality of encrypted tags CT_{GNUM(W_n)}. Note that n is an integer of 1 or more and N or less, and represents a number of the registered numerical value W_n.

The encrypted tag CT_{GNUM(W_n)} includes a random number element CT_{0, GNUM(W_n)}.

The encrypted tag generation unit 527 sets the tag random number S' to the random number element CT_{0, GNUM (W_n)}.

The encrypted tag CT_{GNUM(W_n)} further includes an attribute element CT_{j, 0, GNUM(W_n)}. Note that j is an integer of 1 or more and L or less.

The attribute element CT_{j, 0, GNUM(W_n)} can be expressed as below:

$$CT\_\{j,0,GNUM(W\_n)\}=(CT\{j,0,GNUM(W\_n)[1]\},\ldots,CT\_\{j,0,GNUM(W\_n)[K]\})$$

The encrypted tag generation unit 527 calculates the attribute element CT_{j, 0, GNUM(W_n)} as below. Note that k is an integer of 1 or more and K or less:

First, the encrypted tag generation unit 527 concatenates an attribute value B_j and a number j. A value represented by an obtained bit string is called a concatenated value (B_j).

Next, the encrypted tag generation unit 527 executes the function F_2 by taking as input a value of the tag key TK(i) and the concatenated value (B_j). An obtained value is called a function value (B_j^).

Next, the encrypted tag generation unit 527 executes the function F_5 by taking as input the function value (B_j^) and a generalized numerical value GNUM(W_n)[k]. An obtained value is called a function value (B_jGNUM(W_n) [k]^^).

Next, the encrypted tag generation unit 527 executes the function F_6 by taking as input the function value (B_jG-NUM(W_n)[k]^^) and the random number element CT_{0, GNUM(W_n)}. An obtained value is called a function value (B_jGNUM(W_n)[k]^^^).

Then, the encrypted tag generation unit 527 calculates an exclusive-or of the function value (B_jGNUM(W_n)[k]^^^) and the tag random number R'_j. An obtained value is the attribute element CT_{j, 0, GNUM(W_n)[k]}.

Each of the function F_5 and the function F_6 is a pseudo random function, a hash function, or a function under a common key encryption scheme, as the function F_1, the function F_2, and the function F_3 are.

The encrypted tag CT_{GNUM(W_n)} includes a wildcard element CT_{j, 1, GNUM(W_n)}.

The wildcard element CT_{j, 1, GNUM(W_n)} can be expressed as below:

$$CT\_\{j,1,GNUM(W\_n)\}=(CT\{j,1,GNUM(W\_n)[1]\},\ldots,CT\_\{j,1,GNUM(W\_n)[K]\})$$

The encrypted tag generation unit 527 calculates the wildcard element CT_{j, 1, GNUM(W_n)} as below. Note that k is an integer of 1 or more and K or less:

First, the encrypted tag generation unit 527 concatenates a wildcard "*" and a number j. A value represented by an obtained bit string is called a concatenated value (*_j).

Next, the encrypted tag generation unit 527 executes the function F_2 by taking as input a value of the tag key TK(i) and the concatenated value (*_j). An obtained value is called a function value (*_j^).

Next, the encrypted tag generation unit 527 executes the function F_5 by taking as input the function value (*_j^) and the generalized numerical value GNUM(W_n)[k]. An obtained value is called a function value (*_jGNUM(W_n) [k]^^).

Next, the encrypted tag generation unit 527 executes the function F_6 by taking as input the function value (*_jG-NUM(W_n)[k]^^) and the random number element CT_{0, GNUM(W_n)}. An obtained value is called a function value (*_jGNUM(W_n)[k]^^^).

Then, the encrypted tag generation unit 527 calculates an exclusive-or of the function value (*_jGNUM(W_n)[k]^^^) and the tag random number R'_j. An obtained value is the wildcard element CT_{j, 1, GNUM(W_n)[k]}.

The encrypted tag CT_{GNUM(W_n)} further includes a determination element CT_{L+1, GNUM(W_n)}.

The encrypted tag generation unit 527 calculates the determination element CT_{L+1, GNUM(W_n)} as below:

First, the encrypted tag generation unit 527 calculates an exclusive-or of L of random numbers of the tag random number tuple R'. An obtained value is called a computation value (R'+).

Then, the encrypted tag generation unit 527 executes the function F_7 by taking as input the computation value (R'+). An obtained value is the determination element CT_{L+1, GNUM(W_n)}.

An example of the function F_7 is a hash function such as SHA-1.

The encrypted tag group CT_GNUM can be expressed as below:

$$CT\_GNUM=\{CT\_\{GNUM(W\_1)\},\ldots,CT\_\{GNUM(W\_N)\}\}$$

$$CT\_\{GNUM(W\_n)\}=(CT\_\{0,GNUM(W\_n)\},CT\_\{1,0,GNUM(W\_n)[1]\},\ldots,CT\_\{L,0,GNUM(W\_n)[1]\},\ldots,CT\_\{1,0,GNUM(W\_n)[K]\},\ldots,CT\_\{L,0,GNUM(W\_n)[K]\},CT\_\{1,1,GNUM(W\_n)[1]\},\ldots,CT\_\{L,1,GNUM(W\_n)[1]\},\ldots,CT\_\{1,1,GNUM(W\_n)[K]\},\ldots,CT\_\{L,1,GNUM(W\_n)[K]\},CT\_\{L+1,GNUM(W\_n)\})$$

where n is an integer of 1 or more and N or less.

$$CT\_\{0,GNUM(W\_n)\}=S'$$

$$CT\_\{j,0,GNUM(W\_n)[k]\}=F\_6(F\_5(F\_2(TK(i),B\_j\|j),GNUM(W\_n)[k]),S')+R'\_j$$

$$CT\_\{j,1,GNUM(W\_n)[k]\}=F\_6(F\_5(F\_2(TK(i),*\|j),PM(W\_n)[k]),S')+R'\_j$$

where j is an integer of 1 or more and L or less, and k is an integer of 1 or more and K or less.

$$R'+=R'\_1+\ldots+R'\_L$$

$$CT\_\{L+1,GNUM(W\_n)\}=F\_7(R'+)$$

If a registered keyword W_n is not specified, "GNUM (W_n)" is omitted. In such case, an encrypted tag CT_{GNUM(W_n)} is described as an encrypted tag CT.

In step S348, a registration unit 530 registers a tuple of the encrypted data C and the encrypted tag group CT_GNUM in the data management apparatus 700.

Specifically, the registration unit 530 transmits the tuple of the encrypted data C and the encrypted tag group CT_G-NUM to the data management apparatus 700. In the data management apparatus 700, an acceptance unit 710 receives the tuple of the encrypted data C and the encrypted tag group CT_GNUM, and stores the received tuple in a storage unit 791. In other words, the acceptance unit 710 stores in the storage unit 791 the encrypted data C and the encrypted tag group CT_GNUM being associated with each other. Then, the tuple of the encrypted data C and the encrypted tag group CT_GNUM is saved in the storage unit 791.

Figure 29:
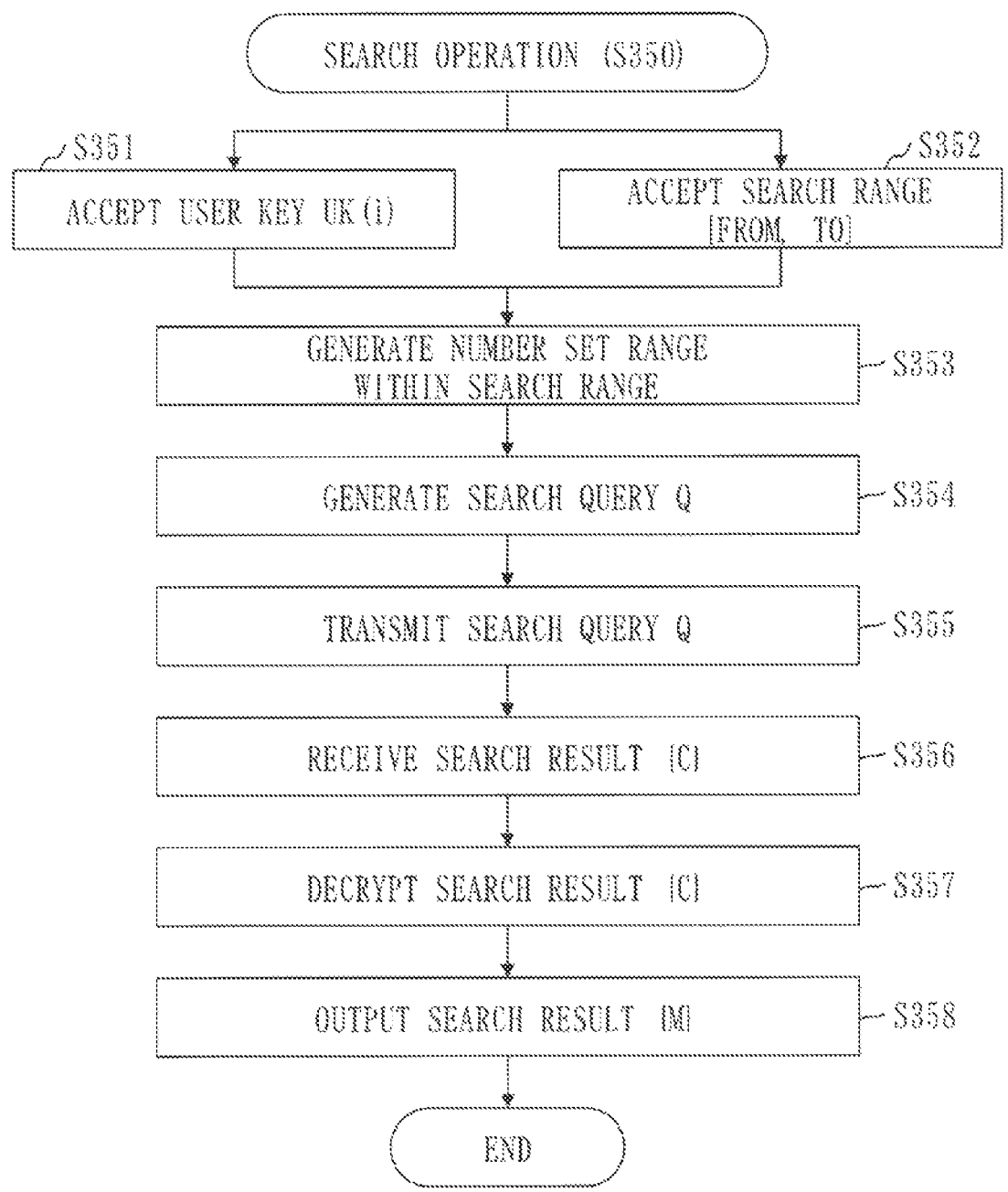
FIG. 29 is a flowchart of search operation (S350) according to Embodiment 3.

Based on FIG. 29, an explanation will be given on search operation (S350).

In search operation (S350), a search operation apparatus 600 accepts a user key UK(i) and a search range [FROM, TO], and outputs a search result {M}.

In step S351, an acceptance unit 610 accepts a user key UK(i).

Step S351 is the same as step S151 in Embodiment 1 (see FIG. 18).

In step S352, the acceptance unit 610 accepts a search range [FROM, TO].

"FROM" means a lower-limit value in a search range.

"TO" means an upper-limit value in the search range.

[FROM, TO] means a numerical value of "FROM" or more and "TO" or less.

Specifically, the acceptance unit 610 accepts via an input/output interface 604, a search range [FROM, TO] inputted in the search operation apparatus 600. The acceptance unit 610 may accept the search range [FROM, TO] from an application program.

In step S353, the numerical value listing unit 623 generates a number set RANGE corresponding to the search range [FROM, TO].

The number set RANGE is a set that includes all numerical values from "FROM" to "TO".

First, the numerical value listing unit 623 lists all numerical values included in [FROM, TO].

Then, the numerical value listing unit 623 generalizes the listed numerical values.

Specifically, listed numerical values are integers.

If the search range is [78, 111], the numerical value listing unit 623 lists 34 of integers from 78 to 111. Then, the numerical value listing unit 623 replaces integers from 80 to 89 by "8?", replaces integers from 90 to 99 by "9?", and replaces integers from 100 to 109 by "10?". As a result, seven generalized numerical values of "78", "79", "8?", "9?", "10?", "110", and "111" are obtained.

The number set RANGE can be expressed as below. Note that Y is an integer of 1 or more:

RANGE=(RANGE[1], . . . ,RANGE[$Y$])

If the search range is [78, 111], a generalized numerical value RANGE[y] is as below. Note that y is an integer of 1 or more and Y or less:

RANGE[1]=78

RANGE[2]=79

RANGE[3]=8?

RANGE[4]=9?

RANGE[5]=10?

RANGE[6]=110

RANGE[7]=111

The listed numerical values may include a decimal. In such case, it is advisable to determine in advance up to how many decimal places to enumerate in each listed numerical value.

In step S354, the search query generation unit 624, using a tag attribute key data TAK(i) and the number set RANGE, generates a search query Q.

The search query Q includes a flag element Qb_j.

The search query generation unit 624 calculates the flag element Qb_j as below:

First, the search query generation unit 624 extracts a flag value Tb_j from the tag attribute key data TAK(i).

Then, the search query generation unit 624 sets the flag value Tb_j to the flag element Qb_j. In other words, the flag element Qb_j is the same as the flag value Tb_j.

The search query Q further includes an attribute keyword element Q_j[y].

The attribute keyword element Q_j[y] can be expressed as below. Note that y is an integer of 1 or more and Y or less:

$Q\_j=(Q\_j[1], \ldots, Q\_j[Y])$

The search query generation unit 624 calculates the attribute keyword element Q_j[y] as below:

First, the search query generation unit 624 extracts a tag attribute key TAK_j from the tag attribute key data TAK(i).

Then, the search query generation unit 624 executes the function F_5 by taking as input the tag attribute key TAK_j and the generalized numerical value RANGE[y]. An obtained value is the attribute keyword element Q_j[y].

The search query Q can be expressed as below. Note that y is an integer of 1 or more and Y or less:

$Q=((Qb\_1,Q\_1[1], \ldots, Q\_1[Y]), \ldots,$
$(Qb\_L,Q\_L[1], \ldots, Q\_L[Y]))$ $Qb\_j=Tb\_j$ $Q\_j[y]=F\_5(TAK\_j,RANGE[y])$ In step S355, a request unit 630 transmits the search query Q to the data management apparatus 700.

Step S355 is the same as step S154 in Embodiment 1 (see FIG. 18).

In step S356, the request unit 630 receives a search result {C} from the data management apparatus 700. The search result {C} is a set of encrypted data C having hit a search.

Step S356 is the same as step S155 in Embodiment 1.

In step S357, a decryption unit 640, using the data attribute key data DAK(i), decrypts each encrypted data C into a plaintext M. A set of the plaintexts M is called a search result {M}.

Step S357 is the same as step S156 in Embodiment 1.

In step S358, an output unit 650 outputs the search result {M}.

Step S358 is the same as step S157 in Embodiment 1.

Figure 30:
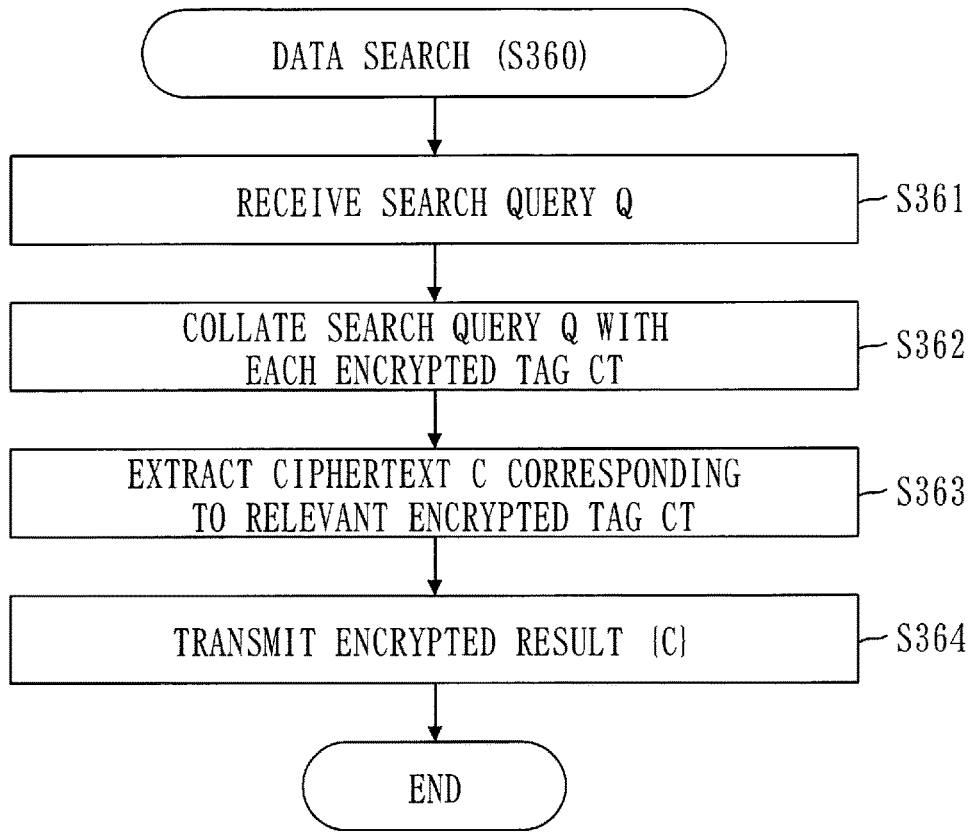
FIG. 30 is a flowchart of data search (S360) according to Embodiment 3.

Based on FIG. 30, an explanation will be given on data search (S360).

In data search (S360), the data management apparatus 700 receives a search query Q and transmits an encryption result {C}.

In step S361, the acceptance unit 710 receives a search query Q from the search operation apparatus 600.

Step S361 is the same as step S161 in Embodiment 1 (see FIG. 19).

In step S362, the collation unit 724 selects an encrypted tag CT that agrees with the search query Q by collating the search query Q with each encrypted tag CT.

As to the encrypted tag CT, a symbol {GNUM(W_n)} of a registered keyword is omitted.

Specifically, the collation unit 724 collates a search query Q with each encrypted tag CT as below. Note that y is an integer of 1 or more and Y or less, and k is an integer of 1 or more and K or less:

First, the collation unit 724 calculates a computation value V_1[y, k]. The computation value V_1[y, k] will be described later.

Next, the collation unit 724 executes the function F_7 by taking as input the computation value V_1[y, k]. An obtained value is called a collation value V_2[y, k].

Then, the collation unit 724 compares the collation value V_2[y, k] with a determination element CT_{L+1}.

If the collation value V_2[y, k] matches the determination element CT_{L+1}, the encrypted tag CT agrees with the search query Q. In other words, a registered numerical value corresponding to the encrypted tag CT is included in the search range.

The collation unit 724 calculates the computation value V_1[y, k] as below:

First, the collation unit 724 extracts a flag element Qb_j from the search query Q. Note that j is an integer of 1 or more and L or less.

Next, the collation unit 724, based on the extracted flag element Qb_j, selects a tuple CTj0 of attribute elements or a tuple CTj1 of wildcard elements from the encrypted tag CT.

The tuple CTj0 of attribute elements and the tuple CTj1 of wildcard elements can be expressed as below:

$$CTj0=(CT\_\{j,0,[1]\}, \ldots ,CT\_\{j,0,[K]\})$$

$$CTj1=(CT\_\{j,1,[1]\},CT\_\{j,1,[K]\})$$

The collation unit 724 selects the tuple CTj0 of attribute elements or the tuple CTj1 of wildcard elements as below:

If the flag element Qb_j is "0", the collation unit 724 selects the tuple CRj0 of attribute elements. If the flag element Qb_j is "1", the collation unit 724 selects the tuple CRj1 of wildcard elements.

A tuple to be selected is called a selected element CTj.

Next, the collation unit 724 extracts an attribute keyword element Q_j from the search query Q.

Next, the collation unit 724 executes the function F_6 by taking as input the attribute keyword element Q_j[y] and a random number element CT_0. An obtained value is called a function value (CTj[y]^).

Next, the collation unit 724 calculates an exclusive-or of each function value (CTj[y]^) and the selected element (CTj[k]). An obtained value is called an extracted random number (R'j[y, k]^).

Then, collation unit 724 calculates an exclusive-or of the extracted random numbers (R'j[y, k]^) of all levels. An obtained value is the computation value V_1[y, k].

The computation value V_1[y, k] and the collation value V_2[y, k] can be expressed as below:

$$V\_1[y,k]=(F\_6(Q\_1[y],CT\_\{0\})+CT\_\{1,Qb\_1,[k]\})+ \ldots +(F\_6(Q\_L[y],CT\_\{0\})+CT\_\{L,Qb\_L,[k]\})$$

$$V\_2[y,k]=F\_7(V\_1[y,k])$$

If B≥A is satisfied, and also a registered numerical value W_n is included in a search range [FROM, TO], there exists a certain tuple (y, k) of integers that satisfies a following computation value V_1[y, k]:

$$V\_1[y,k]=R'\_1+ \ldots +R'\_L$$

As a result, the following equation is held for that tuple (y, k) of integers:

$$V\_2[y,k]=F\_7(V\_1[y,k])=F\_7(R'\_1+ \ldots +R'\_L)=CT\_\{L+1\}$$

If a numerical value used for registration is "87" and the search range is [78, 111], an integer y is "3", and an integer k is "2".

If B≥A is satisfied, and the registered numerical value W_n is not included in the search range [FROM, TO], a random number R'_j cannot be decrypted correctly, and thereby the computation value V_1[y, k] cannot be obtained.

If B≥A is not satisfied, and the registered numerical value W_n is included in the search range [FROM, TO], the random number R' j cannot be decrypted correctly, and thereby the computation value V_1[y, k] cannot be obtained.

Therefore, with any tuple (y, k) of integers, a probability that a collation value V_2[y, k] (=F_7(V_1[y, k])) matches a determination element C_{L+1} (=F_7(R'_1+ ... +R'_L)) is very low.

The encrypted tag CT selected in step S362, in other words, the encrypted tag CT that agrees with the search query Q is called a relevant encrypted tag CT.

In step S363, the extraction unit 722 extracts encrypted data C corresponding to the relevant encrypted tag CT. The extracted encrypted data C is called relevant encrypted data C.

Step S363 is the same as step S163 in Embodiment 1 (see FIG. 19).

In step S364, an output unit 730 transmits an encryption result {C} to the search operation apparatus 600. The encryption result {C} is a set of the relevant encrypted data C.

Step S364 is the same as step S164 in Embodiment 1 (see FIG. 19).

Data deletion (S170) is as explained in Embodiment 1 (see FIG. 20).

In data deletion (S170), the data management apparatus 700 deletes a tuple of encrypted data C and an encrypted tag CT_W corresponding to a name of file to be deleted.

Effect of Embodiment 3

According to Embodiment 3, if a registered numerical value is included in a search range, a search is hit.

By using a generalized numerical value, a size of a search query is reduced.

Summary of Embodiments

Embodiment 1 enables multi-user searchable encryption available for an exact match search.

Embodiment 2 enables multi-user searchable encryption available for a partial match search.

Embodiment 3 enables multi-user searchable encryption available for a range search.

Supplementation to Embodiments

Figure 31:
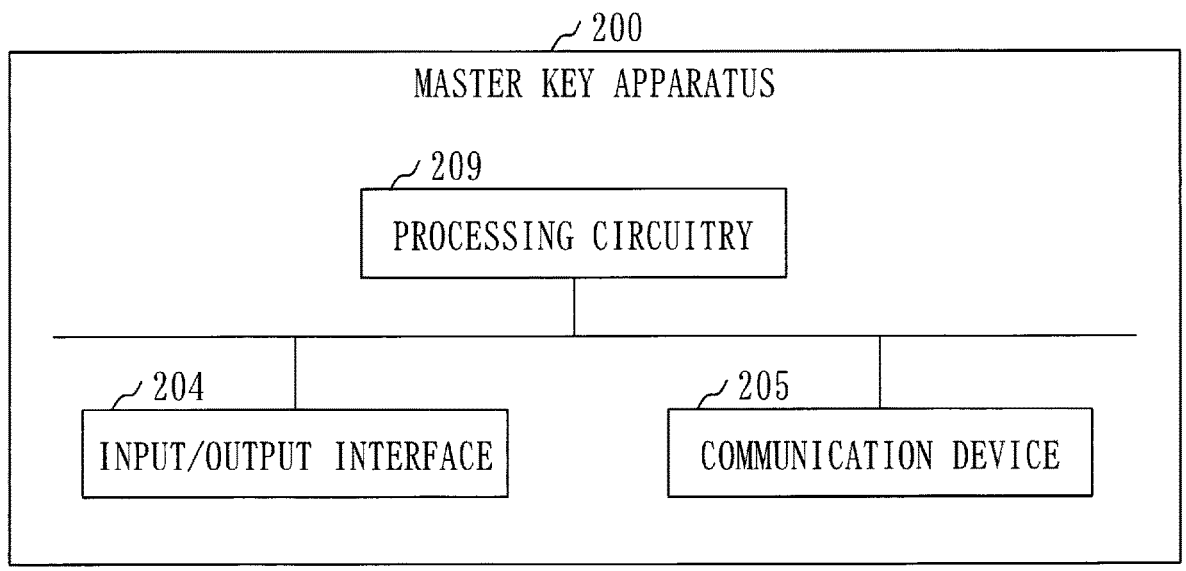
FIG. 31 is a hardware configuration diagram of a master key apparatus 200 according to Embodiments.

Based on FIG. 31, an explanation will be given on a hardware configuration of the master key apparatus 200.

The master key apparatus 200 includes processing circuitry 209.

The processing circuitry 209 is hardware to realize the acceptance unit 210, the generation unit 220, the output unit 230, and the storage unit 291.

The processing circuitry 209 may be dedicated hardware, or may be the processor 201 to execute a program that is stored in the memory 202.

If the processing circuitry 209 is dedicated hardware, the processing circuitry 209 is, for example, a single circuit, a composite circuit, a programmed processor, a parallel-programmed processor, an ASIC, or an FPGA; or a combination of them.

ASIC is an abbreviation for Application Specific Integrated Circuit, and FPGA is an abbreviation for Field Programmable Gate Array.

The master key apparatus 200 may be provided with a plurality of processing circuits that substitute for the processing circuitry 209. The plurality of processing circuits divide a role of the processing circuitry 209 among themselves.

In the master key apparatus 200, some functions may be implemented by the dedicated hardware, and remaining functions may be implemented by software or firmware.

In this manner, the processing circuitry 209 can be implemented by hardware, software, or firmware; or a combination of them.

Figure 32:
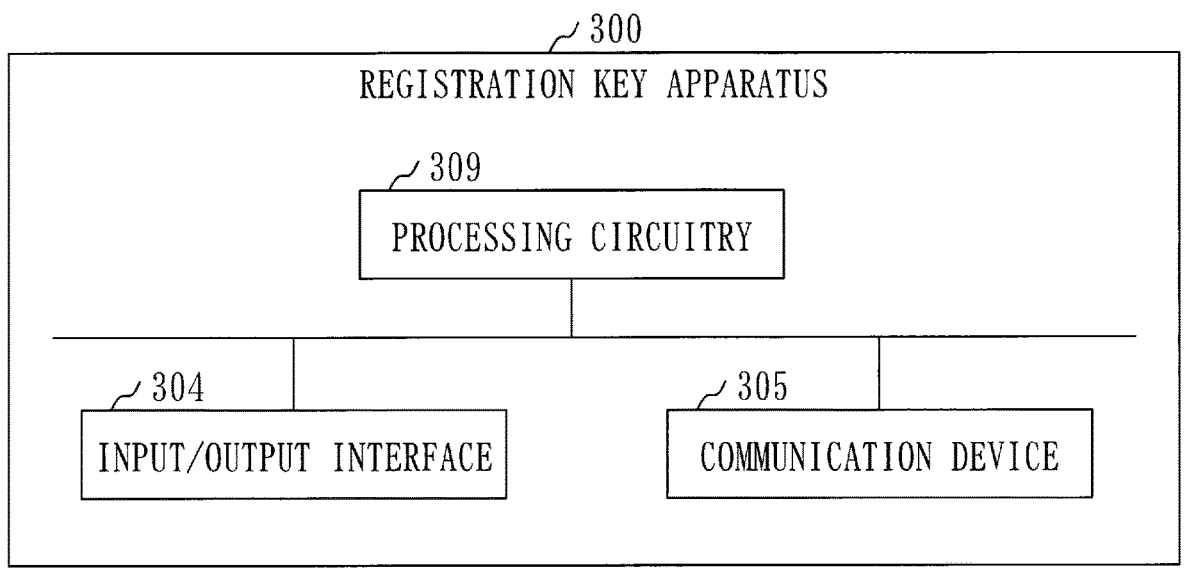
FIG. 32 is a hardware configuration diagram of a registration key apparatus 300 according to Embodiments.

Based on FIG. 32, an explanation will be given on a hardware configuration of the registration key apparatus 300.

The registration key apparatus 300 is provided with processing circuitry 309.

The processing circuitry 309 is hardware to implement the acceptance unit 310, the generation unit 320, the output unit 330, and the storage unit 391.

The processing circuitry 309 may be dedicated hardware, or may be the processor 301 to execute a program that is stored in the memory 302.

If the processing circuitry 309 is the dedicated hardware, the processing circuitry 309 is, for example, a single circuit, a composite circuit, a programmed processor, a parallel-programmed processor, an ASIC, or an FPGA; or a combination of them.

The registration key apparatus 300 may be provided with a plurality of processing circuits that substitute for the processing circuitry 309. The plurality of processing circuits divide a role of the processing circuitry 309 among themselves.

In the registration key apparatus 300, some functions may be implemented by dedicated hardware, and remaining functions may be implemented by software or firmware.

In this manner, the processing circuitry 309 can be implemented by hardware, software, or firmware; or a combination of them.

Figure 33:
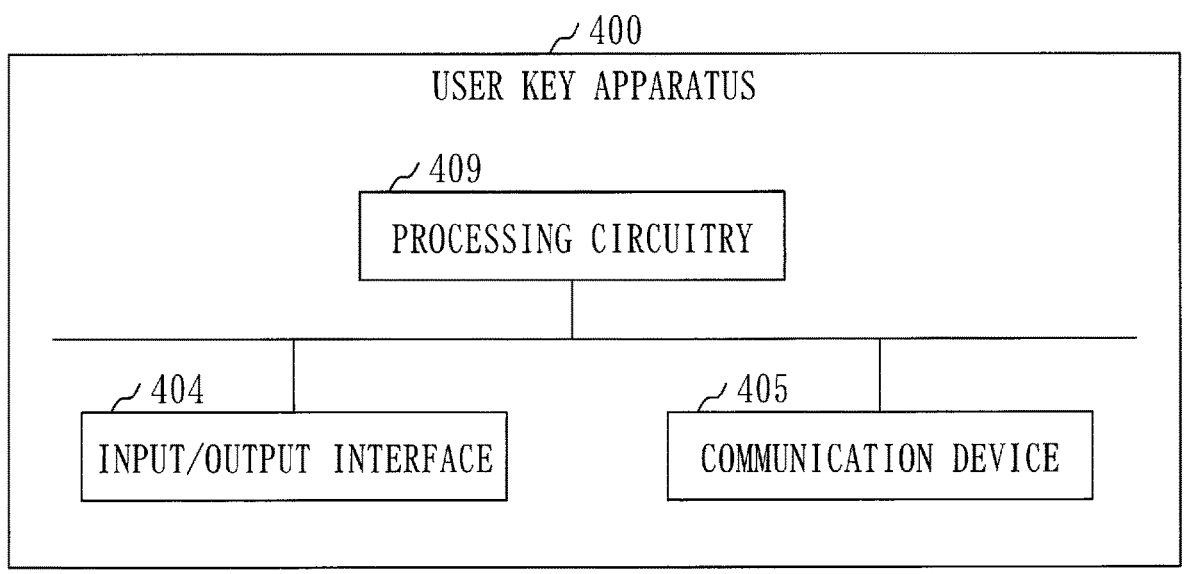
FIG. 33 is a hardware configuration diagram of a user key apparatus 400 according to Embodiments.

Based on FIG. 33, an explanation will be given on a hardware configuration of the user key apparatus 400.

The user key apparatus 400 may be provided with processing circuitry 409.

The processing circuitry 409 is hardware to implement the acceptance unit 410, the generation unit 420, the output unit 430, and the storage unit 491.

The processing circuitry 409 may be dedicated hardware, or may be the processor 401 to execute a program that is stored in the memory 402.

If the processing circuitry 409 is dedicated hardware, the processing circuitry 409 is, for example, a single circuit, a composite circuit, a programmed processor, a parallel-programmed processor, an ASIC, or an FPGA; or a combination of. them The user key apparatus 400 may be provided with a plurality of processing circuits that substitute for the processing circuitry 409. The plurality of processing circuits divide a role of the processing circuitry 409 among themselves.

In the user key apparatus 400, some functions may be implemented by dedicated hardware, and remaining functions may be implemented by software or firmware.

In this manner, the processing circuitry 409 can be implemented by hardware, software, or firmware; or a combination of them.

Figure 34:
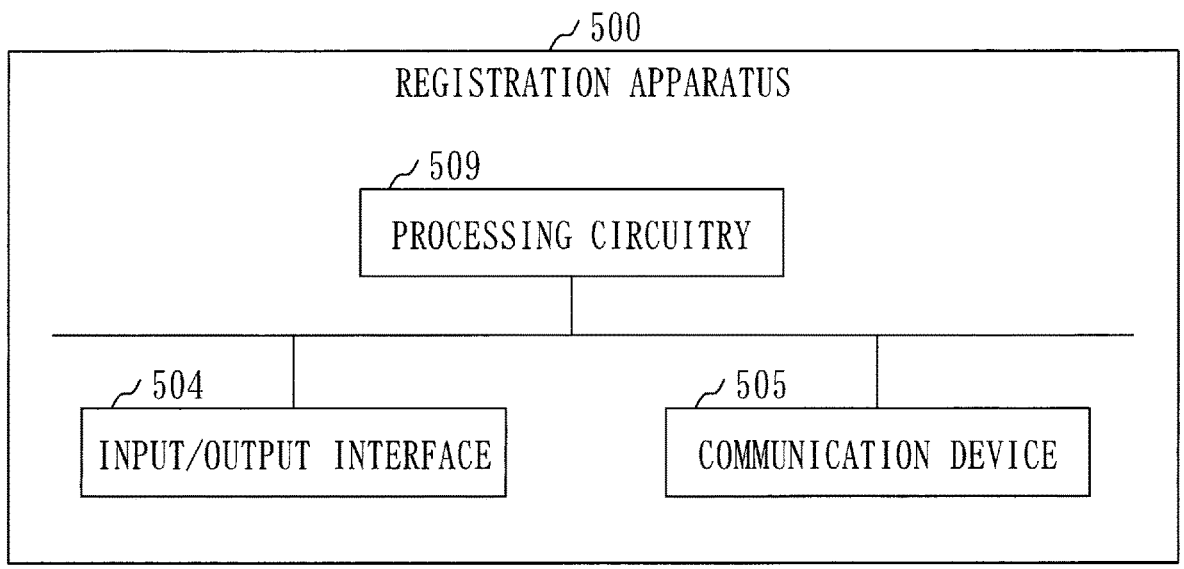
FIG. 34 is a hardware configuration diagram of a registration apparatus 500 according to Embodiments.

Based on FIG. 34, an explanation will be given on a hardware configuration of the registration apparatus 500.

The registration apparatus 500 is provided with processing circuitry 509.

The processing circuitry 509 is hardware to implement the acceptance unit 510, the generation unit 520, the registration unit 530, and the storage unit 591.

The processing circuitry 509 may be dedicated hardware, or may be the processor 501 to execute a program that is stored in the memory 502.

If the processing circuitry 509 is dedicated hardware, the processing circuitry 509 is, for example, a single circuit, a composite circuit, a programmed processor, a parallel-programmed processor, an ASIC, or an FPGA; or a combination of them.

The registration apparatus 500 may be provided with a plurality of processing circuits that substitute for the processing circuitry 509. The plurality of processing circuits divide a role of the processing circuitry 509 among themselves.

In the registration apparatus 500, some functions may be implemented by dedicated hardware, and remaining functions may be implemented by software or firmware.

In this manner, the processing circuitry 509 can be implemented by hardware, software, or firmware; or a combination of them.

Figure 35:
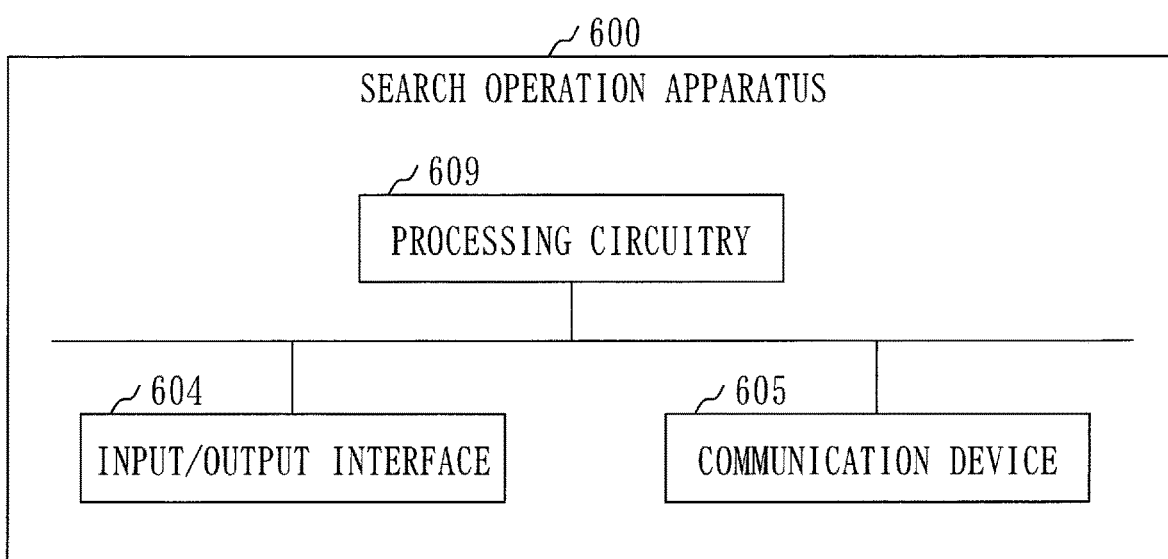
FIG. 35 is a hardware configuration diagram of a search operation apparatus 600 according to Embodiments.

Based on FIG. 35, an explanation will be given on a hardware configuration of the search operation apparatus 600.

The search operation apparatus 600 is provided with processing circuitry 609.

The processing circuitry 609 is hardware to implement the acceptance unit 610, the generation unit 620, the request unit 630, the decryption unit 640, the output unit 650, and the storage unit 691.

The processing circuitry 609 may be dedicated hardware, or may be the processor 601 to execute a program that is stored in the memory 602.

If the processing circuitry 609 is dedicated hardware, the processing circuitry 609 is, for example, a single circuit, a composite circuit, a programmed processor, a parallel-programmed processor, an ASIC, or an FPGA; or a combination of them.

The search operation apparatus 600 may be provided with a plurality of processing circuits that substitute for the processing circuitry 609. The plurality of processing circuits divide a role of the processing circuitry 609 among themselves.

In the search operation apparatus 600, some functions may be implemented by the dedicated hardware, and remaining functions may be implemented by software or firmware.

In this manner, the processing circuitry 609 can be implemented by hardware, software, or firmware; or a combination of them.

Figure 36:
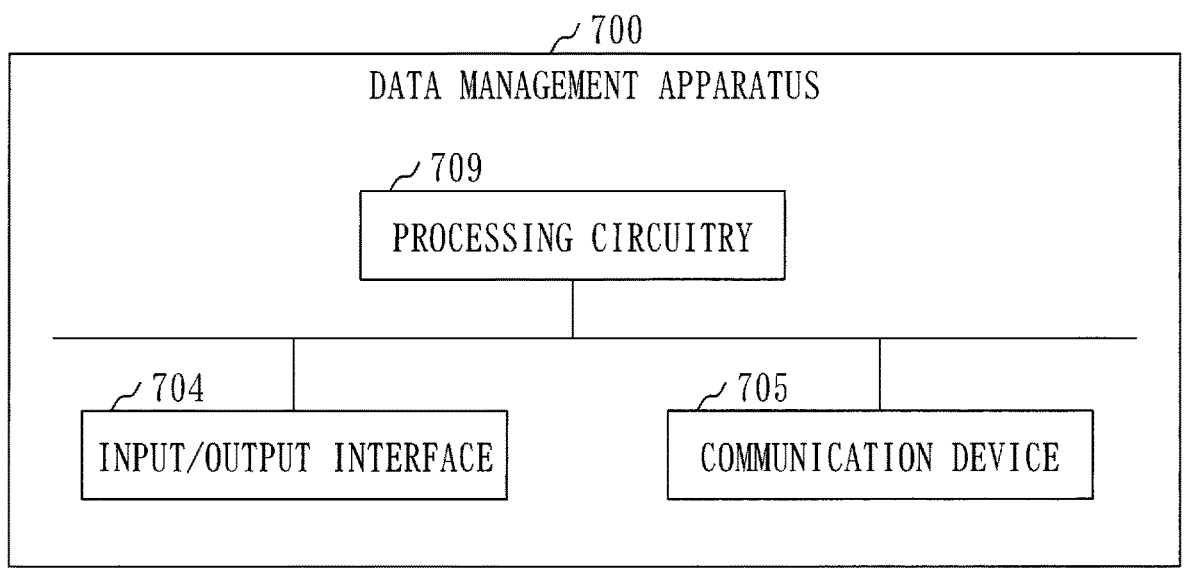
FIG. 36 is a hardware configuration diagram of a data management apparatus 700 according to Embodiments.

Based on FIG. 36, an explanation will be given on a hardware configuration of the data management apparatus 700.

The data management apparatus 700 is provided with processing circuitry 709.

The processing circuitry 709 is hardware to implement the acceptance unit 710, the search unit 720, the output unit 730, and the storage unit 791.

The processing circuitry 709 may be dedicated hardware, or may be the processor 701 to execute a program that is stored in the memory 702.

If the processing circuitry 709 is dedicated hardware, the processing circuitry 709 is, for example, a single circuit, a composite circuit, a programmed processor, a parallel-programmed processor, an ASIC, or an FPGA; or a combination of them.

The data management apparatus 700 may include a plurality of processing circuits that substitute for the processing circuitry 709. The plurality of processing circuits divide a role of the processing circuitry 709 among themselves.

In the data management apparatus 700, some functions may be implemented by the dedicated hardware, and remaining functions may be implemented by software or firmware.

In this manner, the processing circuitry 709 can be implemented by hardware, software, or firmware; or a combination of them.

The embodiments are exemplifications of preferable embodiments, and are not intended to limit a technical scope of the present invention. Each embodiment may be practiced partially, or in combination with other embodiment(s). The procedures explained herein using flowcharts and the like may be changed according to circumstances.

REFERENCE SIGNS LIST

100: searchable encryption system; 101: network; 200: master key apparatus; 201: processor; 202: memory; 203: auxiliary storage device; 204: input/output interface; 205: communication device; 209: processing circuitry; 210: acceptance unit; 220: generation unit; 230: output unit; 291: storage unit; 300: registration key apparatus; 301: processor; 302: memory; 303: auxiliary storage device; 304: input/output interface; 305: communication device; 309: processing circuitry; 310: acceptance unit; 320: generation unit; 330: output unit; 391: storage unit; 400: user key apparatus; 401: processor; 402: memory; 403: auxiliary storage device; 404: input/output interface; 405: communication device; 409: processing circuitry; 410: acceptance unit; 420: generation unit; 422: attribute key generation unit; 430: output unit; 491: storage unit; 500: registration apparatus; 501: processor; 502: memory; 503: auxiliary storage device; 504: input/output interface; 505: communication device; 509: processing circuitry; 510: acceptance unit; 520: generation unit; 521: random number generation unit; 522: encrypted data generation unit; 523: keyword acquisition unit; 524: encrypted tag generation unit; 525: random number generation unit; 526: partially matching keyword generation unit; 527: encrypted tag generation unit; 528: generalized numerical value generation unit; 530: registration unit; 591: storage unit; 600: search operation apparatus; 601: processor; 602: memory; 603: auxiliary storage device; 604: input/output interface; 605: communication device; 609: processing circuitry; 610: acceptance unit; 620: generation unit; 622: search query generation unit; 623: numerical value listing unit; 624: search query generation unit; 630: request unit; 640: decryption unit; 650: output unit; 691: storage unit; 700: data management apparatus; 701: processor; 702: memory; 703: auxiliary storage device; 704: input/output interface; 705: communication device; 709: processing circuitry; 710: acceptance unit; 720: search unit; 721: collation unit; 722: extraction unit; 723: collation unit; 724: collation unit; 730: output unit; 791: storage unit; 792: registration database

The invention claimed is:

1. A registration apparatus comprising:
processing circuitry
to generate a data random number tuple R that is a tuple of random numbers whose quantity is the same as a level quantity L of a hierarchy that a user attribute forms, and that is also a tuple of uniformly random numbers, and a tag random number tuple R' that is a tuple of random numbers whose quantity is the same as the level quantity L, and that is also a tuple of uniformly random numbers,
to accept a plaintext M and attribute information B that indicates an attribute value by level of a user who is allowed to refer to the plaintext M,
to execute a function F_2 by taking as input a concatenated value of an attribute value of each level j in the attribute information B and a number of each level j, to execute a function F_3 by taking as input a function value of the function F_2, to calculate an attribute element C_{j, 0, 0} that is an exclusive-or of a function value of the function F_3 and a jth random number of the data random number tuple R, to execute a function F_4 by taking as input the plaintext M and an exclusive-or of the data random number tuple R, and to generate encrypted data C that includes the attribute element C_{j, 0, 0} and a ciphertext C_{L+1} which is a function value of the function F_4,
to execute the function F_2 by taking as input a concatenated value of an attribute value of each level j in the attribute information B and a number of each level j, to execute a function F_5 by taking as input a function value of the function F_2 and a registered keyword, to execute a function F_6 by taking as input a function value of the function F_5, to calculate an attribute element CT_{j, 0, 0} that is an exclusive-or of a function value of the function F_6 and a jth random number of the tag random number tuple R', to execute a function F_7 by taking as input an exclusive-or of the tag random number tuple R', and to generate an encrypted tag CT_{W_n} that includes the attribute element CT{j, 0, 0} and a determination element CT_{L+1} which is a function value of the function F_7, and
to register a tuple of the encrypted data C and the encrypted tag CT_{W_n} in a data management apparatus.

2. The registration apparatus according to claim 1,
wherein each of the function F_2 and the function F_3 is a pseudo random function, a hash function, or a function under a common key encryption scheme, and the function F_4 is the function under the common key encryption scheme.

3. The registration apparatus according to claim 1,
wherein each of the function F_5 and the function F_6 is a pseudo random function, a hash function, or a function under a common key encryption scheme, and the function F_7 is a hash function.

4. The registration apparatus according to claim 1,
wherein the processing circuitry generates a partially matching keyword that is part of a registered keyword,
for a partial match search, executes the function F_2 by taking as input a concatenated value of an attribute value of each level j in the attribute information B and a number of each level j, executes a function F_5 by taking as input a function value of the function F_2 and the partially matching keyword, executes a function F_6 by taking as input a function value of the function F_5 and a starting position number that indicates a starting position of the partially matching keyword in the registered keyword, calculates an attribute element CT_{j, 0, PM} that is an exclusive-or of a function value of the function F_6 and a jth random number of the tag random number tuple R', executes a function F_7 by taking as input an exclusive-or of the tag random number tuple R', and generates an encrypted tag CT_{PM(W_n)} that includes the attribute element CT_{j, 0, PM} and a determination element CT_{L+1, PM} which is a function value of the function F_7, and registers a tuple of the encrypted data C and the encrypted tag CT_{PM(W_n)} in the data management apparatus.

5. The registration apparatus according to claim 1, wherein the processing circuitry generalizes a registered numerical value and thereby generates a generalized numerical value,
executes the function F_2 by taking as input a concatenated value of an attribute value of each level j in the attribute information B and a number of each level j, executes a function F_5 by taking as input a function value of the function F_2 and the generalized numerical value, executes a function F_6 by taking as input a function value of the function F_5, calculates an attribute element CT_{j, 0, GNUM} that is an exclusive-or of a function value of the function F_6 and a jth random number of the tag random number tuple R', executes a function F_7 by taking as input an exclusive-or of the tag random number tuple R', and generates an encrypted tag CT_{GNUM(W_n)} that includes the attribute element CT_{j, 0, GNUM} and a determination element CT_{L+1, GNUM} which is a function value of the function F_7, and
registers a tuple of the encrypted data C and the encrypted tag CT_{GNUM(W_n)} in the data management apparatus.

6. A search operation apparatus comprising
processing circuitry
to calculate an attribute keyword element Q_j that is a value obtained by executing a function F_5 by taking as input a search keyword w, and to generate a search query Q that includes the attribute keyword element Q_j,
to transmit the search query Q to a data management apparatus and to receive encrypted data C from the data management apparatus, and
to perform decryption into a plaintext M by executing a decryption function of a function F_4 by taking as input a ciphertext C_{L+1} included in the encrypted data C,
wherein the data management apparatus comprises:
a storage unit in which a tuple of the encrypted data C and an encrypted tag CT_{W_n} is registered by a registration apparatus;
an acceptance unit to receive the search query Q from the search operation apparatus;
a collation unit to execute a function F_6 by taking as input the attribute keyword element Q_j included in the search query Q, to execute a function F_7 by taking as input a computation value V_1 which is based on a function value of the function F_6, and to compare a collation value V_2 that is a value obtained by executing the function F_7, with a determination element CT_{L+1} included in the encrypted tag CT_{W_n}; and
an output unit to transmit the encrypted data C to the search operation apparatus if the collation value V_2 matches the determination element CT_{L+1}, and
wherein the registration apparatus comprises:
a random number generation unit to generate a data random number tuple R and a tag random number tuple R' that are each a tuple of random numbers whose quantity is the same as a level quantity L of a hierarchy that a user attribute forms, and that are also each a tuple of uniformly random numbers;
an acceptance unit to accept the plaintext M and attribute information B that indicates an attribute value by level of a user who is allowed to refer to the plaintext M;
an encrypted data generation unit to execute a function F_2 by taking as input a concatenated value of an attribute value of each level j in the attribute information B and a number of each level j, to execute a function F_3 by taking as input a function value of the function F_2, to calculate an attribute element C_{j, 0, 0} that is an exclusive-or of a function value of the function F_3 and a jth random number of the data random number tuple R, to execute the function F_4 by taking as input the plaintext M and an exclusive-or of the data random number tuple R, and to generate the encrypted data C that includes the attribute element C_{j, 0, 0} and the ciphertext C_{L+1} which is a function value of the function F_4;
an encrypted tag generation unit to execute the function F_2 by taking as input a concatenated value of an attribute value of each level j in the attribute information B and a number of each level j, to execute the function F_5 by taking as input a function value of the function F_2 and a registered keyword, to execute the function F_6 by taking as input a function value of the function F_5, to calculate an attribute element CT{j, 0, 0} that is an exclusive-or of a function value of the function F_6 and a jth random number of the tag random number tuple R', to execute the function F_7 by taking as input an exclusive-or of the tag random number tuple R', and to generate the encrypted tag CT_{W_n} that includes the attribute element CT_{j, 0, 0} and the determination element CT_{L+1} which is a function value of the function F_7; and
a registration unit to register a tuple of the encrypted data C and the encrypted tag CT_{W_n} in the data management apparatus.

7. The search operation apparatus according to claim 6, wherein in the storage unit, a tuple of the encrypted data C and an encrypted tag CT_{PM(W_n)} is registered by a registration apparatus, wherein the collation unit executes a function F_6 by taking as input the attribute keyword element Q_j included in the search query Q, executes a function F_7 by taking as input a computation value V_1 which is based on a function value of the function F_6, and compares a collation value V_2 that is a value obtained by executing the function F_7, with a determination element CT_{L+1, PM} included in the encrypted tag CT_{PM(W_n)}, and
wherein the output unit, if the collation value V_2 matches the determination element CT_{L+1, PM}, transmits the encrypted data C to the search operation apparatus, wherein the registration apparatus comprises: a partially matching keyword generation unit to generate a partially matching keyword that is part of a registered keyword;

an encrypted tag generation unit to execute the function $F\_2$ by taking as input a concatenated value of an attribute value of each level j in the attribute information B and a number of each level j, to execute the function $F\_5$ by taking as input a function value of the function $F\_2$ and the partially matching keyword, to execute the function $F\_6$ by taking as input a function value of the function $F\_5$ and a starting position number that indicates a starting position of the partially matching keyword in the registered keyword, to calculate an attribute element $CT\_\{j, 0, PM\}$ that is an exclusive-or of a function value of the function $F\_6$ and a jth random number of the tag random number tuple R', to execute the function $F\_7$ by taking as input an exclusive-or of the tag random number tuple R', and to generate the encrypted tag $CT\_\{PM(W\_n)\}$ that includes the attribute element $CT\_\{j, 0, PM\}$ and the determination element $CT\_\{L+1, PM\}$ which is a function value of the function $F\_7$; and a registration unit to register a tuple of the encrypted data C and the encrypted tag $CT\_\{PM(W\_n)\}$ in the data management apparatus.

8. The search operation apparatus according to claim 6, wherein the processing circuitry generalizes a numerical value of a search range and to thereby generate a generalized numerical value, and calculates an attribute keyword element $Q\_j$ that is a value obtained by executing a function $F\_5$ by taking as input the generalized numerical value, and to generate a search query Q that includes the attribute keyword element $Q\_j$, wherein in the storage unit, a tuple of the encrypted data C and an encrypted tag $CT\_\{GNUM(W\_n)\}$ is registered by a registration apparatus, wherein the collation unit executes a function $F\_6$ by taking as input the attribute keyword element $Q\_j$ included in the search query Q, executes a function $F\_7$ by taking as input a computation value $V\_1$ which is based on a function value of the function $F\_6$, and compares a collation value $V\_2$ that is a value obtained by executing the function $F\_7$, with a determination element $CT\_\{L+1, GNUM\}$ included in the encrypted tag $CT\_\{GNUM(W\_n)\}$, wherein the output unit transmits the encrypted data C to the search operation apparatus if the collation value $V\_2$ matches the determination element $CT\_\{L+1, GNUM\}$, wherein the registration apparatus comprises: a generalized numerical value generation unit to generalize a registered numerical value and to thereby generate a generalized numerical value;

an encrypted tag generation unit to execute the function $F\_2$ by taking as input a concatenated value of an attribute value of each level j in the attribute information B and a number of each level j, to execute the function $F\_5$ by taking as input a function value of the function $F\_2$ and the generalized numerical value, to execute the function $F\_6$ by taking as input a function value of the function $F\_5$, to calculate an attribute element $CT\{j, 0, GNUM\}$ that is an exclusive-or of a function value of the function $F\_6$ and a jth random number of the tag random number tuple R', to execute the function $F\_7$ by taking as input an exclusive-or of the tag random number tuple R', and to generate the encrypted tag $CT\_\{GNUM(W\_n)\}$ that includes the attribute element $CT\_\{j, 0, GNUM\}$ and the determination element $CT\_\{L+1, GNUM\}$ which is a function value of the function $F\_7$; and a registration unit to register a tuple of the encrypted data C and the encrypted tag $CT\_\{GNUM(W\_n)\}$ in the data management apparatus.

9. A data management apparatus comprising:

processing circuitry, in which a tuple of encrypted data C and an encrypted tag $CT\_\{W\_n\}$ is registered by a registration apparatus, to receive a search query Q from a search operation apparatus, to execute a function $F\_6$ by taking as input an attribute keyword element $Q\_j$ included in the search query Q, to execute a function $F\_7$ by taking as input a computation value $V\_1$ which is based on a function value of the function $F\_6$, and to compare a collation value $V\_2$ that is a value obtained by executing the function $F\_7$, with a determination element $CT\_\{L+1\}$ included in the encrypted tag $CT\_\{W\_n\}$, and to transmit the encrypted data C to the search operation apparatus if the collation value $V\_2$ matches the determination element $CT\_\{L+1\}$, wherein the search operation apparatus comprises:

a search query generation unit to calculate the attribute keyword element $Q\_j$ that is a value obtained by executing a function $F\_5$ by taking as input a search keyword w and to generate the search query Q that includes the attribute keyword element $Q\_j$;

a request unit to transmit the search query Q to the data management apparatus and to receive the encrypted data C from the data management apparatus; and a decryption unit to perform decryption into a plaintext M by executing a decryption function of a function $F\_4$ by taking as input a ciphertext $C\_\{L+1\}$ included in the encrypted data C, and wherein the registration apparatus comprises:

a random number generation unit to generate a data random number tuple R and a tag random number tuple R' that are each a tuple of random numbers whose quantity is the same as a level quantity L of a hierarchy that a user attribute forms, and that are also each a tuple of uniformly random numbers;

an acceptance unit to accept the plaintext M and attribute information B that indicates an attribute value of by level of a user who is allowed to refer to the plaintext M;

an encrypted data generation unit to execute a function $F\_2$ by taking as input a concatenated value of an attribute value of each level j in the attribute information B and a number of each level j, to execute a function $F\_3$ by taking as input a function value of the function $F\_2$, to calculate an attribute element $C\_\{j, 0, 0\}$ that is an exclusive-or of a function value of the function $F\_3$ and a jth random number of the data random number tuple R, to execute the function $F\_4$ by taking as input the plaintext M and an exclusive-or of the data random number tuple R, and to generate the encrypted data C that includes the attribute element $C\_\{j, 0, 0\}$ and the ciphertext $C\_\{L+1\}$ which is a function value of the function $F\_4$;

an encrypted tag generation unit to execute the function $F\_2$ by taking as input a concatenated value of an attribute value of each level j in the attribute information B and a number of each level j, to execute the function $F\_5$ by taking as input a function value of the function F_2 and a registered keyword, to execute the function F_6 by taking as input a function value of the function F_5, to calculate an attribute element CT_{j, 0, 0} that is an exclusive-or of a function value of the function F_6 and a jth random number of the tag random number tuple R', to execute the function F_7 by taking as input an exclusive-or of the tag random number tuple R', and to generate the encrypted tag CT_{W_n} that includes the attribute element CT_{j, 0, 0} and the determination element CT_{L+1} which is a function value of the function F_7; and a registration unit to register a tuple of the encrypted data C and the encrypted tag CT_{W_n} in the data management apparatus.

10. The data management apparatus according to claim 9, wherein in the processing circuitry, a tuple of encrypted data C and an encrypted tag CT_{PM(W_n)} is registered by a registration apparatus, wherein the processing circuitry executes a function F_6 by taking as input an attribute keyword element Q_j included in the search query Q, executes a function F_7 by taking as input a computation value V_1 which is based on a function value of the function F_6, and compares a collation value V_2 that is a value obtained by executing the function F_7, with a determination element CT_{L+1, PM} included in the encrypted tag CT_{PM(W_n)}, and wherein the processing circuitry, if the collation value V_2 matches the determination element CT_{L+1, PM}, transmits the encrypted data C to the search operation apparatus, wherein the registration apparatus comprises a partially matching keyword generation unit to generate a partially matching keyword that is part of a registered keyword;

an encrypted tag generation unit to execute the function F_2 by taking as input a concatenated value of an attribute value of each level j in the attribute information B and a number of each level j, to execute the function F_5 by taking as input a function value of the function F_2 and the partially matching keyword, to execute the function F_6 by taking as input a function value of the function F_5 and a starting position number that indicates a starting position of the partially matching keyword in the registered keyword, to calculate an attribute element CT_{j, 0, PM} that is an exclusive-or of a function value of the function F_6 and a jth random number of the tag random number tuple R', to execute the function F_7 by taking as input an exclusive-or of the tag random number tuple R', and to generate the encrypted tag CT_{PM(W_n)} that includes the attribute element CT_{j, 0, PM} and the determination element CT_{L+1, PM} which is a function value of the function F_7; and a registration unit to register a tuple of the encrypted data C and the encrypted tag CT_{PM(W_n)} in the data management apparatus.

11. The data management apparatus according to claim 9, wherein in the processing circuitry, a tuple of encrypted data C and an encrypted tag CT_{GNUM(W_n)} is registered by a registration apparatus, wherein the processing circuitry executes a function F_6 by taking as input an attribute keyword element Q_j included in the search query Q, executes a function F_7 by taking as input a computation value V_1 which is based on a function value of the function F_6, and compares a collation value V_2 that is a value obtained by executing the function F_7, with a determination element CT_{L+1, GNUM} included in the encrypted tag CT_{GNUM(W_n)}, and transmits the encrypted data C to the search operation apparatus if the collation value V_2 matches the determination element CT_{L+1, GNUM}, wherein the search operation apparatus comprises:

a numerical value listing unit to generalize a numerical value of a search range and to thereby generate a generalized numerical value; and a search query generation unit to calculate the attribute keyword element Q_j that is a value obtained by executing the function F_5 by taking as input the generalized numerical value, and to generate the search query Q that includes the attribute keyword element Q_j, wherein the registration apparatus comprises:

a generalized numerical value generation unit to generalize a registered numerical value and to thereby generate a generalized numerical value;

an encrypted tag generation unit to execute the function F_2 by taking as input a concatenated value of an attribute value of each level j in the attribute information B and a number of each level j, to execute the function F_5 by taking as input a function value of the function F_2 and the generalized numerical value, to execute the function F_6 by taking as input a function value of the function F_5, to calculate an attribute element CT_{j, 0, GNUM} that is an exclusive-or of a function value of the function F_6 and a jth random number of the tag random number tuple R', to execute the function F_7 by taking as input an exclusive-or of the tag random number tuple R', and to generate the encrypted tag CT_{GNUM(W_n)} that includes the attribute element CT_{j, 0, GNUM} and the determination element CT_{L+1, GNUM} which is a function value of the function F_7; and a registration unit to register a tuple of the encrypted data C and the encrypted tag CT_{GNUM(W_n)} in the data management apparatus.

* * * * *